(12) United States Patent
Chai et al.

(10) Patent No.: US 10,805,661 B2
(45) Date of Patent: Oct. 13, 2020

(54) SYSTEMS AND METHODS FOR ENABLING TRANSITIONS BETWEEN ITEMS OF CONTENT

(71) Applicant: OpenTV, Inc., San Francisco, CA (US)

(72) Inventors: Crx Chai, Oakland, CA (US); Alex Fishman, San Francisco, CA (US); Laurent Demesmaeker, San Anselmo, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

(21) Appl. No.: 15/979,908

(22) Filed: May 15, 2018

(65) Prior Publication Data

US 2018/0262812 A1    Sep. 13, 2018

Related U.S. Application Data

(63) Continuation of application No. 14/986,491, filed on Dec. 31, 2015, now abandoned.

(51) Int. Cl.
*H04N 21/422* (2011.01)
*H04N 21/482* (2011.01)
(Continued)

(52) U.S. Cl.
CPC ... *H04N 21/42224* (2013.01); *G06F 3/04817* (2013.01); *G06F 3/04845* (2013.01);
(Continued)

(58) Field of Classification Search
None
See application file for complete search history.

(56) References Cited

U.S. PATENT DOCUMENTS 9,003,445 B1    4/2015  Rowe
9,113,193 B1    8/2015  Gardes et al.
(Continued)

FOREIGN PATENT DOCUMENTS

EP    1783586 A1    5/2007
EP    2736236 A1    5/2014
WO   2014199893 A1  12/2014

OTHER PUBLICATIONS

International Search Report and Written Opinion for PCT App No. PCT/US2016/068553 dated Apr. 26, 2017, 14 pgs.
(Continued)

*Primary Examiner* — Jason K Lin
(74) *Attorney, Agent, or Firm* — Polsinelli LLP

(57) ABSTRACT

Example implementation are directed to systems and methods for enabling transitions between items of content with a companion device to remotely control a main display. In an example implementation, a system includes a touch screen comprising a top surface, a display viewable through the top surface, and one or more interactive element on a portion of the top surface of the touch screen; and a processor coupled to the memory configured to execute one or more methods. In an example implementation, a method receives user input associated with the one or more interactive elements of the touch screen; determines event data based on the user input; provide feedback via the companion device based on the event data; and transmits the event data to control the main display.

20 Claims, 39 Drawing Sheets

(51) Int. Cl.
*G06F 3/0488* (2013.01)
*H04N 21/472* (2011.01)
*H04N 21/462* (2011.01)
*H04N 21/431* (2011.01)
*H04N 21/438* (2011.01)
*G06F 3/0484* (2013.01)
*G06F 3/0481* (2013.01)

(52) U.S. Cl.
CPC ...... *G06F 3/04883* (2013.01); *G06F 3/04886* (2013.01); *H04N 21/4316* (2013.01); *H04N 21/4383* (2013.01); *H04N 21/4622* (2013.01); *H04N 21/47205* (2013.01); *H04N 21/4821* (2013.01)

(56) References Cited

U.S. PATENT DOCUMENTS

| | | | |
|---|---|---|---|
| 9,117,180 | B1 | 8/2015 | Chiu |
| 2007/0229465 | A1* | 10/2007 | Sakai ............... G08C 17/00 345/173 |
| 2009/0109183 | A1 | 4/2009 | Carvajal |
| 2009/0244385 | A1 | 10/2009 | Wakayama et al. |
| 2010/0083316 | A1 | 4/2010 | Togashi |
| 2010/0107067 | A1* | 4/2010 | Vaisanen ............ G06F 3/0486 715/702 |
| 2010/0129053 | A1 | 5/2010 | Ito |
| 2011/0090407 | A1 | 4/2011 | Friedman |
| 2011/0296351 | A1 | 12/2011 | Ewing, Jr. et al. |
| 2012/0030624 | A1 | 2/2012 | Migos |
| 2012/0032901 | A1* | 2/2012 | Kwon ............... G06F 3/04883 345/173 |
| 2012/0054803 | A1 | 3/2012 | Lee et al. |
| 2012/0117599 | A1 | 5/2012 | Jin |
| 2012/0137216 | A1 | 5/2012 | Choi |
| 2013/0055170 | A1 | 2/2013 | Langlois et al. |
| 2013/0088450 | A1* | 4/2013 | Takase ................ G06F 3/041 345/173 |
| 2013/0117689 | A1 | 5/2013 | Lessing et al. |
| 2013/0135357 | A1 | 5/2013 | Rhee |
| 2013/0145295 | A1 | 6/2013 | Bocking et al. |
| 2013/0152135 | A1 | 6/2013 | Hong et al. |
| 2013/0159941 | A1 | 6/2013 | Langlois et al. |
| 2014/0022192 | A1 | 1/2014 | Hatanaka |
| 2014/0068494 | A1 | 3/2014 | Petersen et al. |
| 2014/0071351 | A1 | 3/2014 | Vanderhoff et al. |
| 2014/0204279 | A1 | 7/2014 | Kwon |
| 2014/0253815 | A1* | 9/2014 | Lee .................. G06F 3/04883 348/734 |
| 2014/0258903 | A1* | 9/2014 | Kanbara ............. G06F 3/0488 715/765 |
| 2014/0325567 | A1 | 10/2014 | Mangat |
| 2014/0365895 | A1 | 12/2014 | Magahern et al. |
| 2014/0368734 | A1 | 12/2014 | Hoffert et al. |
| 2015/0002438 | A1* | 1/2015 | Vartanian ................ G06F 3/016 345/173 |
| 2015/0095855 | A1 | 4/2015 | Bai |
| 2015/0100885 | A1 | 4/2015 | Riley et al. |
| 2015/0128179 | A1 | 5/2015 | Cornican |
| 2015/0185856 | A1* | 7/2015 | Liu .................... H04N 21/4126 345/173 |
| 2015/0185950 | A1* | 7/2015 | Watanabe ............. G06F 3/0416 345/173 |
| 2015/0201249 | A1 | 7/2015 | Ryu |
| 2015/0206349 | A1* | 7/2015 | Rosenthal ........ H04N 21/41407 345/633 |
| 2015/0256763 | A1 | 9/2015 | Niemi |
| 2015/0268844 | A1* | 9/2015 | Kim ....................... G06F 3/038 715/822 |
| 2015/0339006 | A1 | 11/2015 | Chaland |
| 2015/0371536 | A1 | 12/2015 | Skokna et al. |
| 2016/0077702 | A1 | 3/2016 | Nomachi et al. |
| 2016/0117542 | A1 | 4/2016 | Klappert |
| 2016/0134937 | A1 | 5/2016 | Detty |
| 2016/0261903 | A1 | 9/2016 | Epstein et al. |
| 2016/0291848 | A1 | 10/2016 | Hall |
| 2016/0349962 | A1 | 12/2016 | Chen et al. |
| 2017/0155946 | A1* | 6/2017 | Coenen ............ H04N 21/42224 |

OTHER PUBLICATIONS

International Search Report and Written Opinion for PCT App No. PCT/US2016/068555 dated Apr. 3, 2017, 15 pgs.
Sony Singapore "One-Flick Touchpad TV Remote." Retrieved on Feb. 12, 2018 from http://www.sony.com.sg/electronics/televisions-remotes-selectors-cameras/rmf-tx100e#pdp_slideshow_default.
International Search Report and Written Opinion for PCT App No. PCT/US2016/068559 dated Mar. 23, 2017, 13 pgs.

* cited by examiner

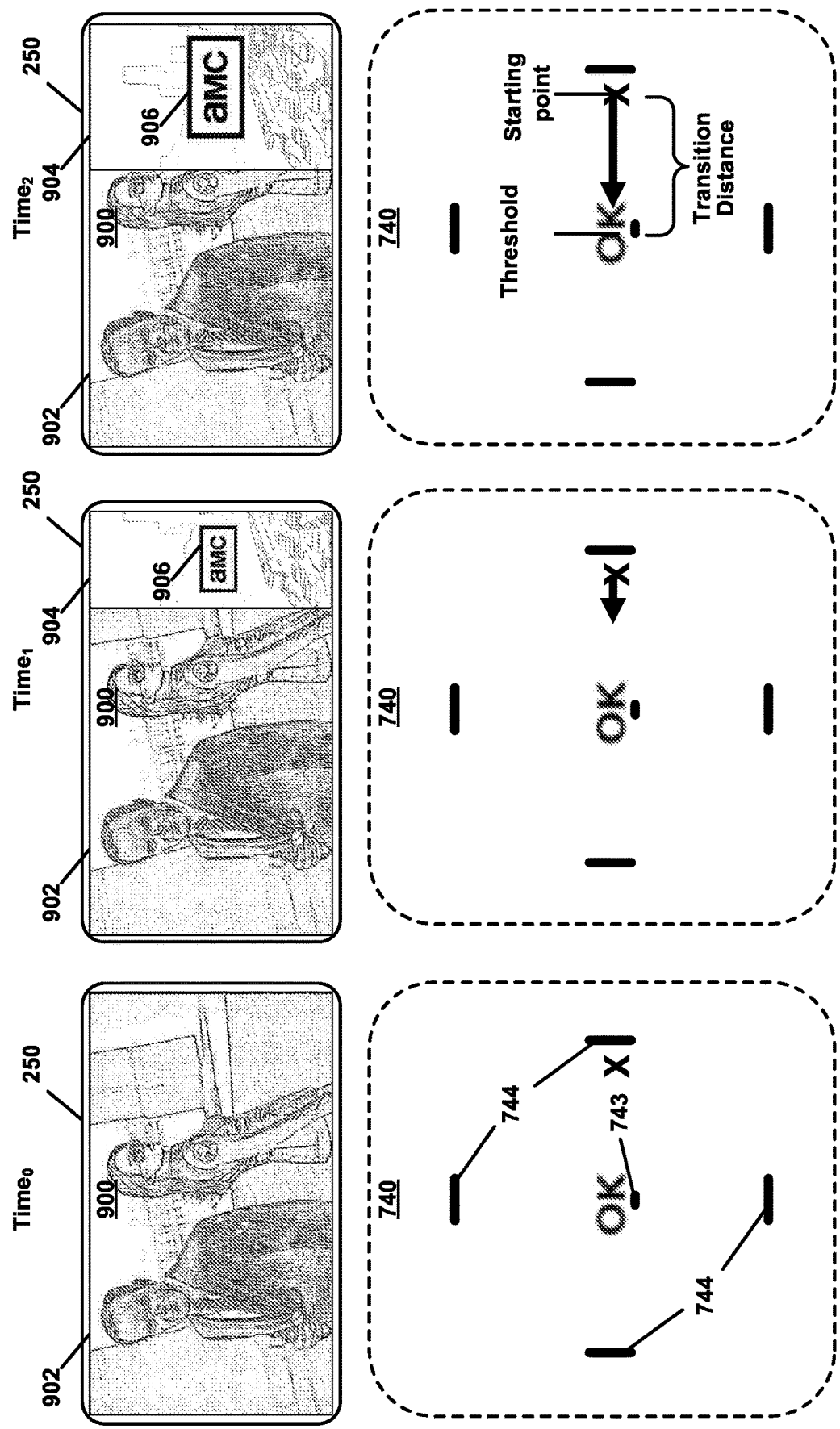

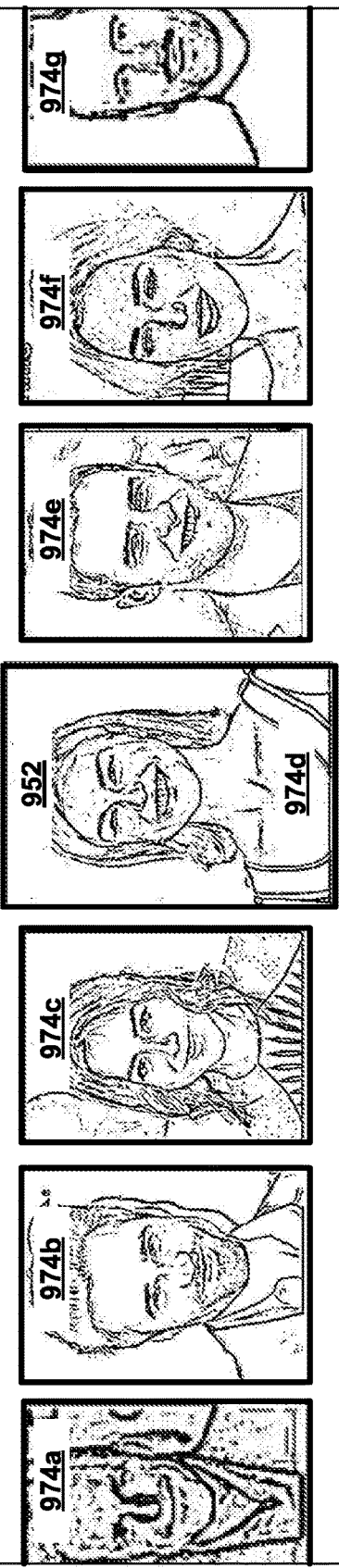
FIG. 16F

SYSTEMS AND METHODS FOR ENABLING TRANSITIONS BETWEEN ITEMS OF CONTENT

CROSS REFERENCE TO RELATED APPLICATION

This application is a continuation of U.S. Utility application Ser. No. 14/986,491, filed Dec. 31, 2015, entitled "SYSTEMS AND METHODS FOR ENABLING TRANSITIONS BETWEEN ITEMS OF CONTENT," the contents of which are hereby incorporated by reference in its entirety.

TECHNICAL FIELD

The present disclosure relates to the field of interactive digital media and graphical user interfaces.

BACKGROUND

Digital media playback capabilities may be incorporated into a wide range of devices, including digital televisions, including so-called "smart" televisions, set-top boxes, laptop or desktop computers, tablet computers, e-book readers, digital recording devices, digital media players, video gaming devices, digital cameras, cellular phones, including so-called "smart" phones, and dedicated video streaming devices. Digital media content may originate from a plurality of sources including, for example, local storage devices, over-the-air television providers, satellite television providers, cable television providers, and online media services, including, online media streaming and downloading services. Further, devices with digital media playback capabilities may provide a user with interfaces, including graphical user interfaces (GUIs), that enable the user to select an item of content to access.

Due to the wide range of content users may access on devices with digital media playback capabilities, traditional interfaces and techniques for organizing, sorting, and displaying available items of content may be less than ideal.

SUMMARY

The following brief summary is not intended to include all features and aspects of the present invention, nor does it imply that the invention must include all features and aspects discussed in this summary. The present disclosure relates to techniques for enabling users to access digital media content and more specifically describes techniques and tools for enabling a user to efficiently access items of content. It should be noted that as used herein the term item of content may at least include individual items of digital content (e.g., video files, music files, and digital images), and collections of individual items of digital content (e.g., a collection of video files, including, for example, a television series, an album including music files, and an album of digital images). Further, in some examples, items of content may refer to applications that, upon execution, enable a user to access digital content through execution of the application. In some examples, the techniques described herein may be implemented in a device with digital media playback capabilities, including, for example, set-top boxes, televisions, laptop or desktop computers, gaming consoles, dedicated streaming devices, and/or an associated companion device, including, for example, remote controllers, tablet computers, and smart phones. It should be noted that in some instances the techniques described herein may generally be applicable to devices capable of displaying graphical user interfaces and causing digital content to be rendered on a display device.

According to one example of the disclosure, a method of facilitating access to items of content comprises causing a video presentation for a selected item of content to be rendered on a display, determining whether touch event data corresponds to a particular gesture, causing a guide to be presented on the display, upon determining that the touch event data corresponds to a vertical swipe gesture, and causing a transition from the selected item of content to another item of content, upon determining that the touch event data corresponds to a horizontal swipe gesture.

According to another example of the disclosure, a device for facilitating access to items of content comprises one or more processors configured to cause a video presentation for a selected item of content to be rendered on a display, determine whether touch event data corresponds to a particular gesture, cause a guide to be presented on the display, upon determining that the touch event data corresponds to a vertical swipe gesture, and cause a transition from the selected item of content to another item of content, upon determining that the touch event data corresponds to a horizontal swipe gesture.

According to another example of the disclosure, an apparatus for facilitating access to items of content comprises means for causing a video presentation for a selected item of content to be rendered on a display, means for determining whether touch event data corresponds to a particular gesture, means for causing a guide to be presented on the display, upon determining that the touch event data corresponds to a vertical swipe gesture, and means for causing a transition from the selected item of content to another item of content, upon determining that the touch event data corresponds to a horizontal swipe gesture.

According to another example of the disclosure, a non-transitory computer-readable storage medium has instructions stored thereon that upon execution cause one or more processors of a device to cause a video presentation for a selected item of content to be rendered on a display, determine whether touch event data corresponds to a particular gesture, cause a guide to be presented on the display, upon determining that the touch event data corresponds to a vertical swipe gesture, and cause a transition from the selected item of content to another item of content, upon determining that the touch event data corresponds to a horizontal swipe gesture.

The details of one or more examples are set forth in the accompanying drawings and the description below. Other features, objects, and advantages will be apparent from the description and drawings, and from the claims.

BRIEF DESCRIPTION OF DRAWINGS

FIG. 10 is a conceptual diagram illustrating an example of a transition on a display device in response to user input that may be received by an example user interface according to one or more techniques of this disclosure.

FIGS. 14A-14C are conceptual diagrams illustrating an example graphical user interface that may implement one or more techniques of this disclosure.

FIGS. 16A-16F are conceptual diagrams illustrating an example graphical user interface that may implement one or more techniques of this disclosure.

DETAILED DESCRIPTION

Figure 1:
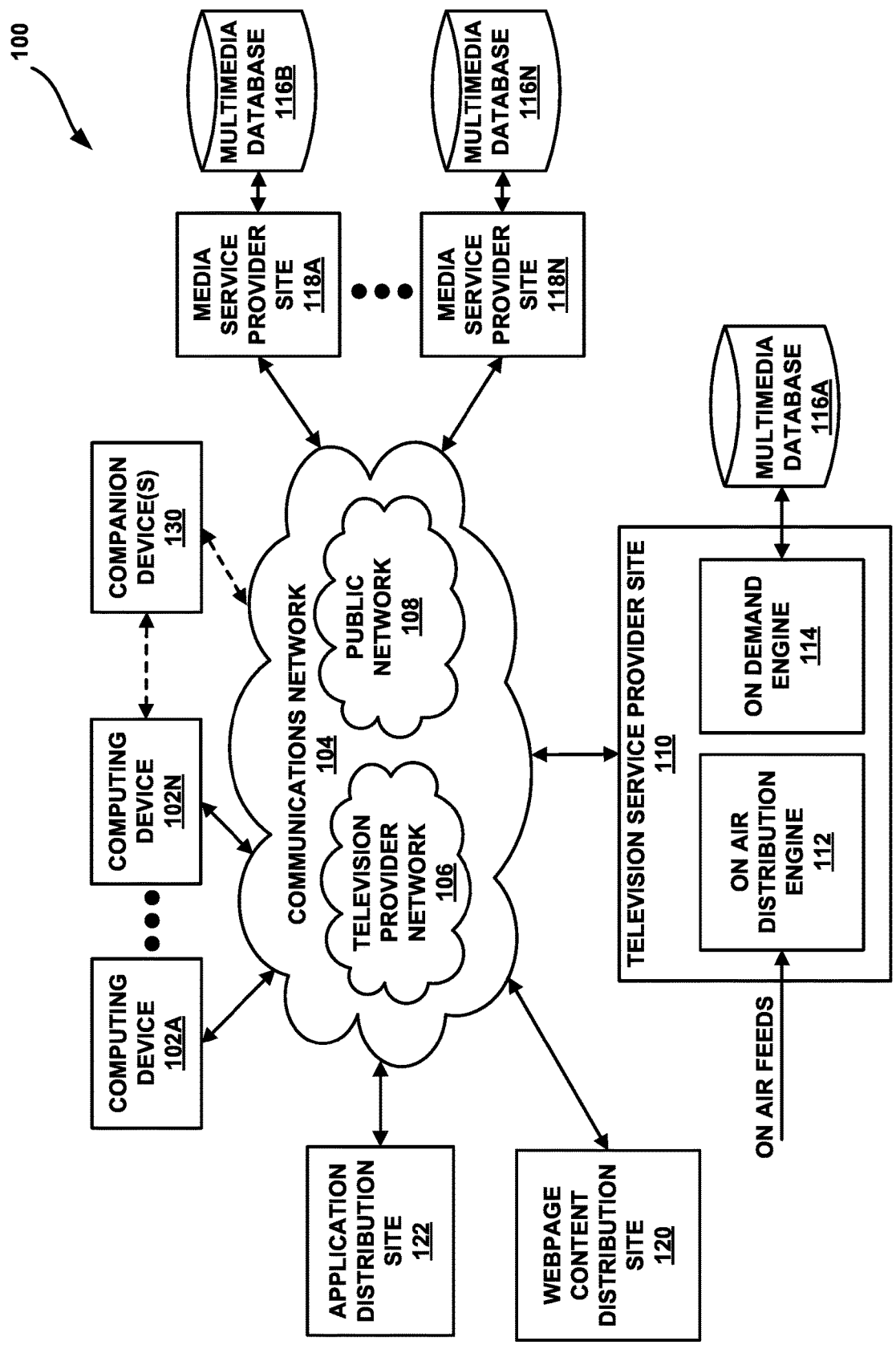
FIG. 1 is block diagram illustrating an example of a system that may implement one or more techniques of this disclosure.

Described herein are systems and methods for enabling a user to access items of content. Some embodiments extend to a machine-readable medium embodying instructions which, when executed by a machine, cause the machine to perform any one or more of the methodologies described herein. Other features will be apparent from the accompanying drawings and from the detailed description that follows. Examples merely typify possible variations. Unless explicitly stated otherwise, components and functions are optional and may be combined or subdivided, and operations may vary in sequence or may be combined or subdivided. In the following description, for purposes of explanation, numerous specific details are set forth to provide a thorough understanding of example embodiments. It will be evident to one skilled in the art, however, that the present subject matter may be practiced without these specific details.

Devices with digital media playback capabilities may enable a user to access items of content from diverse sources. For example, devices with digital media playback capabilities, including, for example, televisions, set-top boxes, laptop or desktop computers, tablet computers, video gaming devices, smart phones, and dedicated video streaming devices may enable a user thereof to access digital media content through one or more digital media content services. Examples of digital media content services include streaming services, television services, and combinations thereof. Current commercial examples of streaming services include streaming services available from Hulu®, LLC and Netflix®, Inc. Current commercial examples of combinations of television and streaming services include services available from the Comcast® Corporation, DirecTV®, LLC and Home Box Office®, Inc.

Devices with digital media playback capabilities, including, for example, televisions, set-top boxes, and dedicated video streaming devices may include a push-button remote controller. Push-button remote controllers enable a user to select an item of content by activating a sequence of buttons, for example, keying a number associated with a television channel. Further, devices with digital media playback capabilities may be configured to provide users thereof with graphical user interfaces that enable the selection of content. For example, a set-top box may be configured to provide a user with an electronic programming guide (EPG), where the electronic programming guide displays items of content in a grid. That is, an EPG may display items of content in a grid according to television networks and time slots. A push-button remote controller may enable a user to select a particular item of content from within a grid for viewing. Further, some devices with digital media playback capabilities may enable a user to select items of content using a secondary computing device (e.g., a smart phone, tablet, etc.) in communication with the device. As used herein, a companion device may refer to any device configured to communicate with a computing device and may include, in some examples, a device including a user interface (e.g., push buttons, a touch screen, etc.) in communication with a device with digital media presentation capabilities.

Devices with digital media playback capabilities may enable a user to access items of content from diverse sources. For example, a single device with digital media capabilities may enable a user to access digital media from a television service, through a tuner, as well as from an online media streaming service, through a network interface, thereby increasing the types and number of items of content available to a user. Conventional user interfaces, including traditional graphical user interfaces and/or traditional push-button remote controllers may be less than ideal.

FIG. 1 is block diagram illustrating an example of a system that may implement one or more techniques described in this disclosure. System 100 may be configured to enable a user to access items of content in accordance with the techniques described herein. In the example illustrated in FIG. 1, system 100 includes one or more computing devices 102A-102N, communications network 104, television service provider site 110, one or more media service provider sites 118A-118N, webpage content distribution site 120, application distribution site 122, and companion device(s) 130. System 100 may include software modules operating on one or more servers. Software modules may be stored in a memory and executed a processor. Servers may include one or more processors and a plurality of internal and/or external memory devices. Examples of memory devices include file servers, file transfer protocol (FTP) servers, network attached storage (NAS) devices, local disk drives, or any other type of device or storage medium capable of storing data. Storage media may include optical discs, including, e.g., Blu-ray discs, DVDs, and CD-ROMs, flash memory, or any other suitable digital storage media. When the techniques described herein are implemented partially in software, a device may store instructions for the software in a suitable, non-transitory computer-readable medium and execute the instructions in hardware using one or more processors.

System 100 represents an example of a system that may be configured to allow digital content, such as, for example, music, videos, including movies and television programming, images, webpages, messages, voice communications, and applications, to be distributed to and accessed by a plurality of computing devices, such as computing devices 102A-102N. In the example illustrated in FIG. 1, computing devices 102A-102N may include any device configured to transmit data to and/or receive data from communication network 104. For example, computing devices 102A-102N may be equipped for wired and/or wireless communications and may include set-top boxes, digital video recorders, televisions, desktop, laptop, or tablet computers, gaming consoles, mobile devices, including, for example, "smart" phones, cellular telephones, and personal gaming devices. It should be noted that although example system 100 is illustrated as having distinct sites, such an illustration is for descriptive purposes and does not limit system 100 to a particular physical architecture. Functions of system 100 and sites included therein may be realized using any combination of hardware, firmware and/or software implementations.

Communications network 104 may comprise any combination of wireless and/or wired communication media. Communications network 104 may include coaxial cables, fiber optic cables, twisted pair cables, wireless transmitters and receivers, routers, switches, repeaters, base stations, or any other equipment that may be useful to facilitate communications between various devices and sites. Communications network 104 may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, including the so-called ATSC 3.0 suite of standards currently under development, Integrated Services Digital Broadcasting (ISDB) standards, Digital Terrestrial Multimedia Broadcast (DTMB), Digital Multimedia Broadcasting (DMB), Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and IEEE standards, such as, for example, one or more of standards included in the IEEE 802 family of standards.

As illustrated in FIG. 1, networks of different types may be defined within communications network 104. Networks may be defined according to physical and/or logical aspects. For example, networks that share the same physical infrastructure (e.g., coaxial cables) may be distinguished based on a primary service type (e.g., webpage access or television service) or communications protocols (e.g., IP/TCP or MPEG-TS). In the example illustrated in FIG. 1, communications network 104 includes television provider network 106 and public network 108. It should be noted that although television provider network 106 and public network 108 are illustrated as distinct, television provider network 106 and public network 108 may share physical and/or logical aspects.

Television provider network 106 is an example of a network configured to provide a user with television services. For example, television provider network 106 may include public over-the-air television networks, public or subscription-based satellite television service provider networks, and public or subscription-based cable television provider networks. It should be noted that although in some examples television provider network 106 may primarily be used to provide television services, television provider network 106 may also provide other types of data and services according to any combination of the telecommunication protocols described herein.

Public network 108 is an example of a packet-based network, such as, a local area network, a wide-area network, or a global network, such as the Internet, configured to provide a user with World Wide Web based services. Public network 108 may be configured to operate according to Internet Protocol (IP) standards. It should be noted that although in some examples public network 108 may primarily be used to provide access to hypertext web pages, public network 108 may also provide other types of media content according to any combination of the telecommunication protocol described herein.

Referring again to FIG. 1, television service provider site 110 may be configured to provide computing devices 102A-102N with television service. For example, television service provider site 110 may include a public broadcast station, a cable television provider, or a satellite television provider and may be configured to provide television services to analog and/or digital televisions and set-top boxes. In the example illustrated in FIG. 1, television service provider site 110 includes on air distribution engine 112 and on demand engine 114. On air distribution engine 112 may be configured to receive a plurality of on air feeds and distribute the feeds to computing devices 102A-102N through television provider network 106. For example, on air distribution engine 112 may be configured to receive one or more over-the-air television events via a satellite uplink/downlink and distribute the over-the-air television events to one or more users of a subscription-based cable television service.

On demand engine 114 may be configured to access a library of multimedia content and distribute multimedia content to one or more of computing devices 102A-102N through television provider network 106. For example, on demand engine 114 may access multimedia content (e.g., music, movies, and TV shows) stored in multimedia database 116A and provide a subscriber of a cable television service with movies on a pay per view (PPV) basis. For example, a user may purchase access to an item of content for a limited period (e.g., 24 hour access to a movie for $4.99). Multimedia database 116A may include storage devices configured to store multimedia content. It should be noted that multimedia content accessed through on demand engine 114 may also be located at various sites within system 100 (e.g., peer-to-peer distribution may be supported).

Media service provider sites 118A-118N represent examples of multimedia service providers. Media service provider sites 118A-118N may be configured to access a library of multimedia content and distribute multimedia content to one or more of computing devices 102A-102N through public network 108. For example, media service provider sites 118A-118N may access multimedia (e.g., music, movies, and TV shows) stored in multimedia databases 116B-116N and provide a user of a media service with multimedia. Multimedia databases 116B-116N may include storage devices configured to store multimedia content. In one example, a media service provider site may be configured to provide content to one or more of computing devices 102A-102N using the Internet protocol suite. In some examples, a media service may be referred to as a streaming service. Commercial examples of streaming services are described above. As described above, television provider network 106 and public network 108 may share physical and logical aspects. Thus, content accessed by one or more of computing devices 102A-102N from a media service provider site 118A-118N may be transmitted through physical components of television provider network 106. For example, a user of one of computing devices 102A-102N may access the Internet and multimedia content provided by a media service through a cable modem connected to a coaxial network maintained by a cable television provider.

Webpage content distribution site 120 represents an example of a webpage service provider. Webpage content distribution site 120 may be configured to provide hypertext based content to one or more of computing devices 102A-102N through public network 108. It should be noted that hypertext based content may include audio and video content. Hypertext content may be defined according to programming languages, such as, for example, Hypertext Markup Language (HTML), Dynamic HTML, and Extensible Markup Language (XML). Examples of webpage content distribution sites include the United States Patent and Trademark Office website. In some examples, digital media services may be associated with a website enabling a user to search for items of content accessible through that particular service. Further, in some examples websites may provide information with respect to items of content (e.g., plot summaries, user reviews, etc.).

Application distribution site 122 represents an example of an application distribution service. Application distribution site 122 may be configured to distribute developed software applications to one or more of computing devices 102A-102N. In one example, software applications may include games and programs operable on computing devices. In other examples, software applications may be configured to allow a computing device to access content provided by a webpage content distribution site in manner specific to the computing device. For example, software applications may be configured to provide enhanced or reduced functionality of a webpage to a mobile device or a set-top box. In one example, a software application may enable a user to access a media service on a particular device. For example, a software application may enable a user to access a streaming service using a gaming console. Further, software applications may be provided to a computing device to enable the computing device to perform one or more of the techniques described herein.

Software applications may be developed using a programming language. Examples of programming languages include, Java™, Jini™, C, C++, Perl, UNIX Shell, Visual Basic, and Visual Basic Script. In some examples, developers may write software applications using a software development kit (SDK) provided by a device manufacturer or a service provider. In the example where one or more of computing devices 102A-102N are mobile devices, application distribution site 122 may be maintained by a mobile device manufacturer, a service provider, and/or a mobile device operating system provider. In the example where one or more of computing devices 102A-102N are set-top boxes, application distribution site 122 may be maintained by a set-top box manufacturer, a service provider, and/or an operating system provider. In some examples, an application distribution site may be referred to as an app store. Examples of current commercial application distribution sites include sites maintained by Google®, Inc. and Apple®, Inc.

Referring again to FIG. 1, in addition to being configured to receive digital media content from communications network 104, computing devices 102A-102N may be configured to communicate with companion device(s) 130 either directly or through communications network 104. As used herein, a companion device may refer to any device configured to communicate with a computing device. Companion device(s) 130 may be equipped for wired and/or wireless communications and may include, for example, a desktop, a laptop, or a tablet computer, a smartphone, personal gaming device, remote controllers, etc. In the example illustrated in FIG. 1, companion device(s) 130 may be configured to communicate directly with computing devices 102A-102N (e.g., using a short range or near field communication protocols), communicate with computing devices 102A-102N via a local area network (e.g., through a Wi-Fi router), and/or communicate with a wide area network (e.g., a cellular network). Further, in some examples, companion device(s) 130 may act as a client device for one of computing devices 102A-102N. For example, companion device(s) 130 may be configured to act as a Universal Plug and Play (UPnP) client or a multicast Domain Name System (mDNS) client. In one example, companion device(s) 130 may be registered with one (or more) of computing devices 102A-102N using its media access control (MAC) address or a unique device identifier and/or a user's subscriber identifier. In one example, companion device(s) 130 may execute applications in conjunction with computing devices 102A-102N. As described in detail below, companion device(s) 130 may be configured to provide user interfaces that enable users to provide input. For example, upon selection through a user interface of a companion device, an item of content may be presented on one of computing devices 102A-102N. It should be noted that although a single companion device is illustrated in the example of FIG. 1, each computing device 102A-102N may be associated with one or more companion device(s) 130. For example, each member of a household may have a companion device (e.g., a smartphone) associated with a computing device (e.g., a set-top box).

Figure 2:
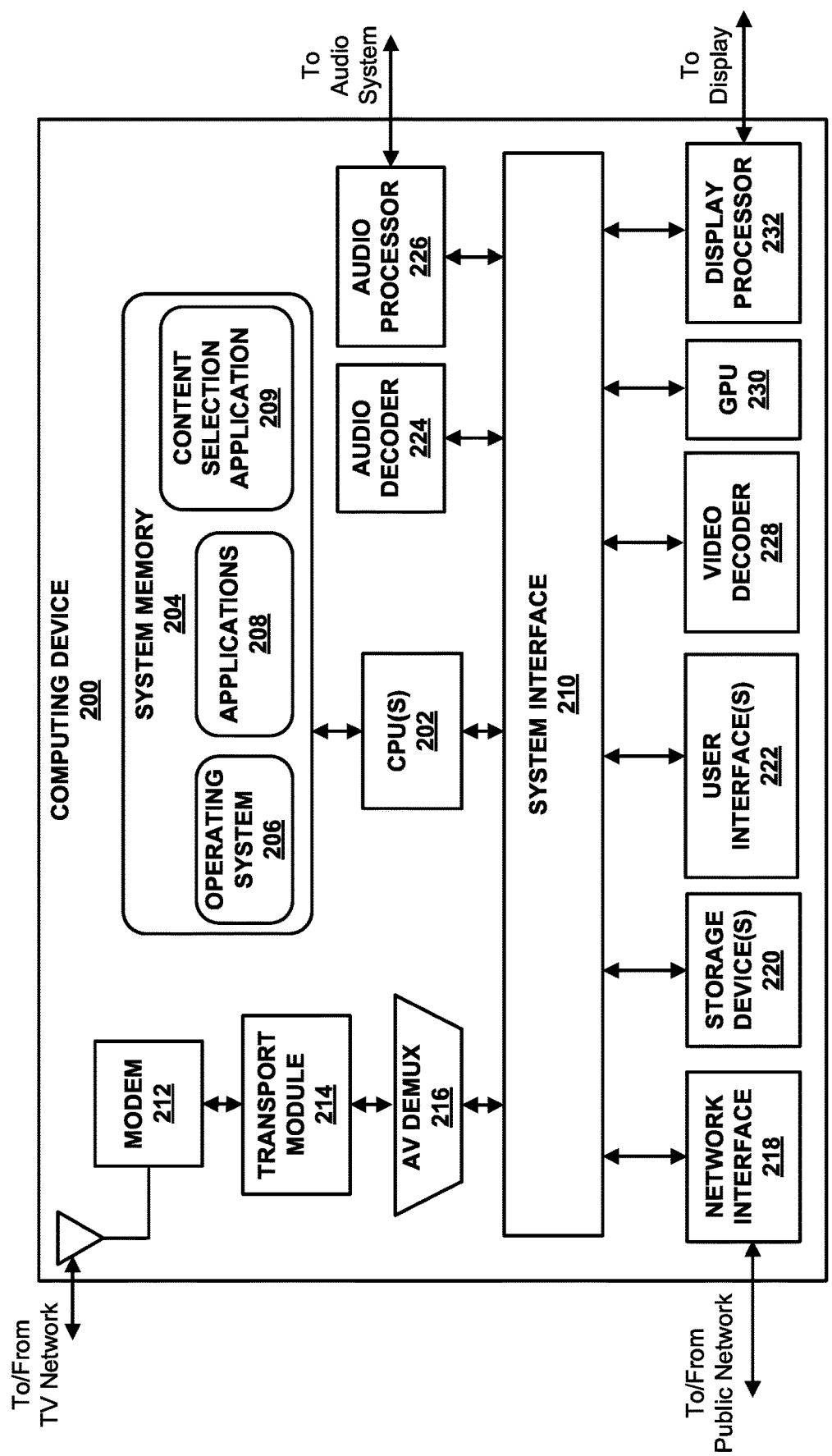
FIG. 2 is a block diagram illustrating an example of a computing device that may implement one or more techniques of this disclosure.

FIG. 2 is a block diagram illustrating an example of a computing device that may implement one or more techniques of this disclosure. Computing device 200 is an example of a computing device that may be configured to transmit data to and receive data from a communications network, allow a user to access multimedia content, and execute one or more applications. Computing device 200 may include or be part of a stationary computing device (e.g., a desktop computer, a television, a set-top box, a gaming console, a dedicated multimedia streaming device, a digital video recorder, etc.), a portable computing device (e.g., a mobile phone, a laptop, a personal data assistant (PDA), a tablet device, a portable gaming device, etc.) or another type of computing device. In the example illustrated in FIG. 2, computing device 200 is configured to send and receive data via a television network, such as, for example, television network 106 described above and send and receive data via a public network, such as, for example, public network 108. It should be noted that in other examples, computing device 200 may be configured to send and receive data through one of television network 106 or public network 108. The techniques described herein may be utilized by devices configured to communicate using any and all combinations of communications networks.

As illustrated in FIG. 2, computing device 200 includes central processing unit(s) 202, system memory 204, system interface 210, modem 212, transport module 214, audio-video de-multiplexer (AV demux) 216, network interface 218, storage device(s) 220, user interface(s) 222, audio decoder 224, audio processor 226, video decoder 228, graphics processing unit 230, and display processor 232. As illustrated in FIG. 2, system memory 204 includes operating system 206, applications 208, and content selection application 209. Each of central processing units(s) 202, system memory 204, system interface 210, modem 212, transport module 214, AV demux 216, network interface 218, storage device(s) 220, user interface(s) 222, audio decoder 224, audio processor 226, video decoder 228, graphics processing unit 230, and display processor 232 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although example computing device 200 is illustrated as having distinct functional blocks, such an illustration is for descriptive purposes and does not limit computing device 200 to a particular hardware architecture. Functions of computing device 200 may be realized using any combination of hardware, firmware and/or software implementations. In some examples, functionality of computing device 200 may be implemented using one or more so-called systems on a chip (SOC). For example, computing device 200 may include a set-top box including a SOC. One example of a commercially available SOC that may be included in a set-top box is the Broadcom® BCM7252 Ultra HD SoC.

Central processing unit(s) 202 may be configured to implement functionality and/or process instructions for execution in computing device 200. Central processing unit(s) 202 may be capable of retrieving and processing instructions, code, and/or data structures for implementing one or more of the techniques described herein. Instructions may be stored on a computer readable medium, such as system memory 204 or storage device(s) 220. Central processing unit(s) 202 may include multi-core central processing units. As described in detail below, the techniques described herein may be used to optimize CPU usage. For example, one or more background processing techniques may be used to reduce the delay (or lag) experienced by a user interacting with one of the graphical user interfaces described below.

System memory 204 may be described as a non-transitory or tangible computer-readable storage medium. In some examples, system memory 204 may provide temporary and/or long-term storage. In some examples, system memory 204 or portions thereof may be described as non-volatile memory and in other examples portions of system memory 204 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories.

System memory 204 may be configured to store information that may be used by computing device 200 during operation. System memory 204 may be used to store program instructions for execution by central processing unit(s) 202 and may be used by software or applications running on computing device 200 to temporarily store information during program execution. For example, system memory 204 may store instructions associated with operating system 206, applications 208, and content selection application 209. System memory 204 may include one or more distinct memory devices, where each memory device may include a distinct type of memory interface. For example, system memory 204 may include an internal hard disk or solid state drive, a random access memory module, an embedded MultiMediaCard (eMMC) memory device, and/or one or more caches (e.g., CPU caches and/or GPU caches). As described in detail below, images associated with a graphical user interface may be loaded from a portion of system memory 204 to another portion of system memory 204 in order to reduce the time required to render the images on a display based on received user inputs. For example, a subset of images associated with a graphical user interface may be loaded into a cache based on user behavior. It should be noted that the techniques described herein may be generally applicable to any memory architecture.

Applications 208 and content selection application 209 may include applications implemented within or executed by computing device 200 and may be implemented or contained within, operable by, executed by, and/or be operatively/communicatively coupled to components of computing device 200. Applications 208 and content selection application 209 may include instructions that may cause central processing unit(s) 202 of computing device 200 to perform particular functions. Applications 208 and content selection application 209 may include algorithms which are expressed in computer programming statements, such as, for-loops, while-loops, if-statements, do-loops, etc. Applications 208 and content selection application 209 may be distributed to computing device 200 through an application distribution site, for example, application distribution site 122. In one example, applications 208 and content selection application 209 may cause computing device 200 to perform functions associated with the example techniques described herein that enable a user to access items of content. Applications 208 and content selection application 209 may cause one or more graphical user interfaces to be presented that enable a user to provide data for use by an application. In one example, applications 208 may include one or more dedicated applications enabling a user to access a digital media service. It should be noted that as used herein a dedicated application enabling a user to access a digital media service may be high integrated with an application or operating system of a computing device. For example, a set-top box supported by a cable television provider may enable a user to access items of content from a television service, an on demand media service maintained by the cable television service provider, and/or a third party media streaming service. In some cases, each distinct graphical user interface enabling a user to select items of content to access may be referred to as a dedicated application, a source, and/or a portal. In one example, content selection application 209 may be provided to a computing device and cause a computing device to enable a user to select items of content according to one or more of the techniques described herein. As described in detail below content selection application 209 may operate in conjunction with an application running on a companion device.

As further illustrated in FIG. 2, applications 208 and content selection application 209 may execute in conjunction with operating system 206. That is, operating system 206 may be configured to facilitate the interaction of applications 208 and content selection application 209 with central processing unit(s) 202, and other hardware components of computing device 200. It should be noted that in some examples, components of operating system 206 and components acting in conjunction with operating system 206 may be referred to as middleware. Further, in some examples, content selection application 209 may include an application programming interface (API). The techniques described herein may be utilized by devices configured to operate using any and all combinations of software architectures. Operating system 206 may be an operating system designed to be installed on laptops, desktops, smartphones, tablets, set-top boxes, digital video recorders, televisions and/or gaming devices. In one example, operating system 206 may include one or more of operating systems or middleware components developed by OpenTV®, Windows® operating systems, Linux operation systems, Mac OS®, Android® operating systems, and any and all combinations thereof.

System interface 210 may be configured to enable communications between components of computing device 200. In one example, system interface 210 comprises structures that enable data to be transferred from one peer device to another peer device or to a storage medium. For example, system interface 210 may include a chipset supporting Accelerated Graphics Port (AGP) based protocols, Peripheral Component Interconnect (PCI) bus based protocols, such as, for example, the PCI Express™ (PCIe) bus specification, which is maintained by the Peripheral Component Interconnect Special Interest Group, or any other form of structure that may be used to interconnect peer devices.

Storage device(s) 220 represent memory of computing device 200 that may be configured to store relatively larger amounts of information for relatively longer periods of time than system memory 204. For example, in the example where computing device 200 is included as part of a digital video recorder, storage device(s) 220 may include a hard disk drive configured to store numerous video files. Similar to system memory 204, storage device(s) 220 may also include one or more non-transitory or tangible computer-readable storage media. Storage device(s) 220 may include internal and/or external memory devices and in some examples may include volatile and non-volatile storage elements.

User interface(s) 222 may include devices configured to receive input from a user during operation of computing device 200. For example, user interface(s) 222 may include buttons and switches, motion sensors (e.g., accelerometers), touch-sensitive sensors, a track pad, a mouse, a keyboard, a microphone, a video camera, or any other type of device configured to receive user input. User interface(s) 222 may be integrated into computing device 200. For example, in the case where computing device 200 includes a television, user interface(s) 222 may include push buttons located on the television. Further, user interface(s) 222 may be integrated into devices external to computing device 200. For example, user interface(s) 222 may be integrated into a companion device, such as, for example, companion device 300 and companion device 400 described in detail below. In some examples, an external device including user interfaces(s) 222 may be operatively coupled to computing device 200 using a standardized communication protocol, such as for example, Universal Serial Bus protocol (USB), Bluetooth, ZigBee or a proprietary communications protocol, such as, for example, a proprietary infrared communications protocol. It should be noted that techniques described herein may be generally applicable regardless of the type of device including a user interface and regardless of the manner in which the device communicates with computing device 200. As described in detail below, user interface(s) 222 may include a display configured to display the graphical users interfaces described herein. For example, in the case where computing device 200 includes a television, a companion device (e.g., a smart phone or a dedicated remote controller) in communication with a television may include a user interface including a touch-sensitive display presenting a graphical user interface described herein. Further, as described in detail below, a user may provide commands to computing device 200 by activating portions of a touch-sensitive display.

Referring again to FIG. 2, computing device 200 is configured to send and receive data via a television network, such as, for example, television network 106 described above and send and receive data via a public network, such as, for example, public network 108. A communications network may be described based on a model including layers that define communication properties, such as, for example, physical signaling, addressing, channel access control, packet properties, and data processing in a communications system. In the example illustrated in FIG. 2, modem 212, transport module 214, and AV demux 216 may be configured to perform lower layer processing associated with television network 106 and network interface 218 may be configured to perform lower layer processing associated with public network 108.

In one example, modem 212 may be configured to perform physical signaling, addressing, and channel access control according to the physical and MAC layers utilized in a television provider network, such as, for example, television provider network 106. In one example, modem 212 may configured to receive signals from a coaxial cable and/or an over-the-air signal and perform low level signal processing (e.g., demodulation). In one example, modem 212 may be configured to extract transport streams from signals received from a coaxial cable. In one example, a transport stream may be based on a transport stream defined by the Moving Pictures Experts Group (MPEG). In one example, a transport stream may include a plurality of program streams where each program stream respectively corresponds to a program available from a television network. Further, a transport stream may include a plurality of data streams (e.g., Program Map Table and EPG data).

Transport module 214 may be configured to receive data from modem 212 and process received data. For example, transport module 214 may be configured to receive a transport stream including a plurality of program streams and extract individual program streams from a received transport stream. In one example, a program stream may include a video stream, an audio stream, and a data stream. AV demux 216 may be configured to receive data from transport module 214 and process received data. For example, AV demux 216 may be configured to receive a program stream from transport module 214 and extract audio packets, video packets, and data packets. That is, AV demux 216 may apply demultiplexing techniques to extract video streams, audio streams, and data streams from a program stream. In one example, AV demux 216 may be configured to decapsulate packetized elementary video and audio streams from a transport stream defined according to MPEG-2 Part 1. It should be noted that although modem 212, transport module 214, and AV demux 216 are illustrated as distinct functional blocks, the functions performed by modem 212, transport module 214, and AV demux 216 may be highly integrated and realized using any combination of hardware, firmware and/or software implementations. Further, it should be noted that the example lower layer processing described with respect to modem 212, transport module 214, and AV demux 216 should not be constructed to limit the type of television services computing device 200 may be configured to receive. That is, computing device 200 may be configured to receive television services according to any number of communication protocols (e.g., ATSC, DVB, ISDB, etc.), including those currently under development (e.g., the ATSC 3.0 suite of standards).

Network interface 218 may be configured to enable computing device 200 to send and receive data via a public network. As described above, data sent or received via a public network may include data associated digital content, such as, for example, music, videos, images, webpages, messages, voice communications, and applications. Network interface 218 may include a network interface card, such as an Ethernet card, an optical transceiver, a radio frequency transceiver, or any other type of device configured to send and receive information. Network interface 218 may be configured to perform physical signaling, addressing, and channel access control according to the physical and MAC layers utilized in a public network, such as, for example, public network 108. Further, in a manner similar to that described above with respect to transport module 214 and AV demux 216, network interface 218 may be configured to extract audio packets, video packets, and data packets from a data stream, or similar fragments from a similar data structure. For example, network interface 218 may be configured to extract video packets, audio packets, and data packets according to one or more streaming protocols including internet protocol (IP), transport control protocol (TCP), real time streaming protocol (RTSP), user datagram protocol (UDP), real time protocol (RTP), MPEG transport streaming protocols, IPTV protocols, and the so-called HTTP Live Stream (HLS) Protocol developed by Apple, Inc. It should be noted, that the techniques described herein are generally applicable to any and all methods of digital content distribution and are not limited to particular communications network implementations. For example, the techniques described herein may be applicable to digital content originating from one or more of a broadcast, a multicast, a unicast, an over-the-top content source, a personal video recorder (PVR), and a peer-to-peer content source.

In some cases, streaming protocols may utilize media segments and index (or manifest) files. That is, an event (e.g., a stream corresponding to an over-the-air television broadcast or the like) may be segmented into a plurality of media files, which may be referred to as segments or fragments. An index file may provide a location (e.g., a universal resource locator (URL) or universal resource identifier (URI)) for each segment included in an event and timing information associated with each segment (e.g., the length of each segment in seconds and the playback order of each segment). Typically, to initiate a streaming session a computing device will download an index file, parse the index file, begin downloading a first media segment in a sequence of segments, and upon a sufficient portion of the first media segment being downloaded, begin playback of a of the first media segment. Subsequent media segments included in an event may be downloaded after a previous media segment has been downloaded. Typically, for an event, media segments are approximately 5-10 seconds in length. It should be noted that in some typical cases, a delay with respect to downloading a particular media segment may propagate a throughout the presentation on an event on a computing device. That is, buffering associated with one segment may propagate throughout the presentation of the event. In this manner, the playback of an event on a particular computing device may be delayed with respect to system time (i.e., the current date and time of day).

Referring again to FIG. 2, data associated with digital content, such as, for example, music, videos, images, webpages, messages, voice communications, and applications may be stored in a computer readable medium, such as, for example, system memory 204 and storage device(s) 220. Data stored in a memory device may be retrieved and processed by central processing unit(s) 202, audio decoder 224, audio processor 226, video decoder 228, graphics processing unit 230, and display processor 232. As described above, central processing unit(s) 202 may be capable of retrieving and processing instructions, code, and/or data structures for implementing one or more of the techniques described herein. Each of audio decoder 224, audio processor 226, video decoder 228, graphics processing unit 230, and display processor 232 may also be capable of retrieving and processing instructions, code, and/or data structures for implementing one or more of the techniques described herein.

Audio decoder 224 may be configured to retrieve and process coded audio data. For example, audio decoder 224 may be a combination of hardware and software used to implement aspects of audio codec. Audio data may be coded using multi-channel formats such as those developed by Dolby and Digital Theater Systems. Audio data may be coded using a compressed or uncompressed format. Examples of compressed audio formats include MPEG-1, 2 Audio Layers II and III, AC-3, AAC, and Ogg Vorbis. An example of an uncompressed audio format includes pulse-code modulation (PCM) audio format. Audio processor 226 may be configured to retrieve captured audio samples and may process audio data for output to an audio system (not shown). In some examples, audio processor 226 may include a digital to analog converter. An audio system may comprise any of a variety of audio output devices such as headphones, a single-speaker system, a multi-speaker system, or a surround sound system. Video decoder 228 may be configured to retrieve and process coded video data. For example, video decoder 228 may be a combination of hardware and software used to implement aspects of video codec. In one example, video decoder 228 may be configured to decode video data encoded according to any number of video compression standards, such as ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), VP8, VP9, and High-Efficiency Video Coding (HEVC).

As described above, a device with media playback capabilities may provide a graphical user interface that enables a user to access items of content. A graphical user interface may include images and graphics displayed in conjunction with video content (e.g., playback icons overlaid on a video presentation). Graphics processing unit 230 is an example of a dedicated processing unit that may be configured to generate graphical user interfaces, including the graphical user interfaces described herein. That is, graphics processing unit 230 may be configured to receive commands and content data and output pixel data. Graphic processing unit 230 may operate according to a graphics pipeline process (e.g., input assembler, vertex shader, geometry shader, rasterizer, pixel shader, and output merger). Graphics processing unit 230 may include multiple processing cores and may be configured to operate according to OpenGL (Open Graphic Library, managed by the Khronos Group), Direct3D (managed by Microsoft, Inc.), or the like.

Display processor 232 may be configured to retrieve and process pixel data for display. For example, display processor 232 may receive pixel data from video decoder 228 and/or graphics processing unit 230 and output data for display. Display processor 232 may be coupled to a display, such as display 250 (not shown in FIG. 2) using a standardized communication protocol (e.g., High-Definition Multimedia Interface (HDMI), Digital Visual Interface (DVI), DisplayPort, component video, composite video, and/or Video Graphics Array (VGA)). Display 250 may comprise one of a variety of display devices such as a liquid crystal display (LCD), a plasma display, an organic light emitting diode (OLED) display, or another type of display device capable of presenting video data to a user. Display 250 may include a standard definition television, a high definition television, or an ultra-resolution display as described above. Further, display 250 may include an integrated display of a portable computing device (e.g., a mobile phone, a laptop, a personal data assistant (PDA), or a tablet device). As described above, in some examples a portable computing device may operate as a companion device for a stationary computing device.

Figure 3:
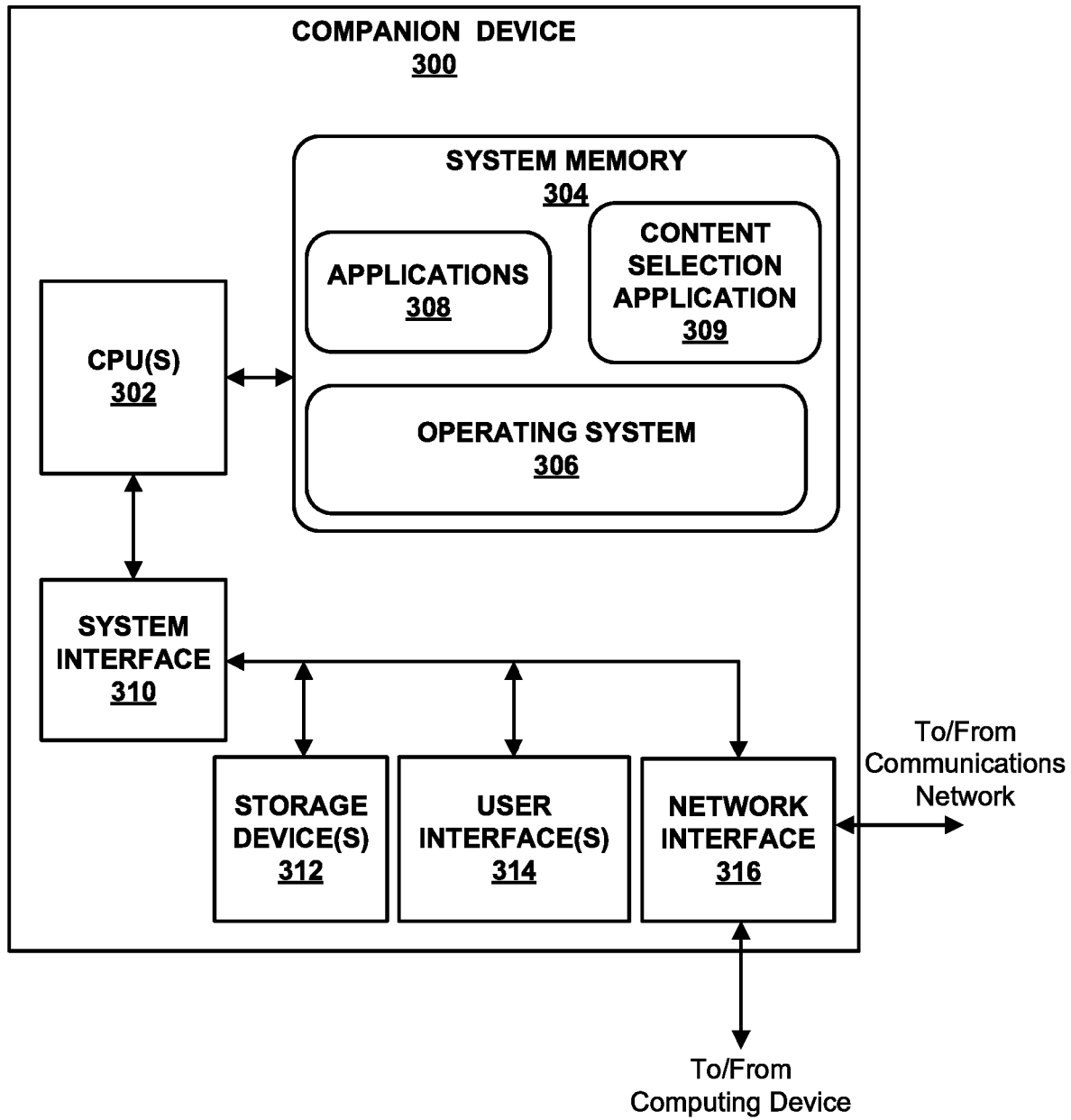
FIG. 3 is a block diagram illustrating an example of a companion device that may implement one or more techniques of this disclosure.

As described above, computing device 200 may be configured to send data to and receive data from a companion device. FIG. 3 is a block diagram illustrating an example of a companion device that may implement one or more techniques of this disclosure. Companion device 300 may be included as part of a portable computing device. As illustrated in FIG. 3, companion device 300 includes central processor unit(s) 302, system memory 304, system interface 310, storage device(s) 312, user interface(s) 314, and network interface 316. As illustrated in FIG. 3, system memory 304 includes operating system 306, applications 308, and content selection application 309. It should be noted that although example companion device 300 is illustrated as having distinct functional blocks, such an illustration is for descriptive purposes and does not limit companion device 300 to a particular hardware or software architecture. For example, in some instances, companion device 300 may include a combination of ASICs and basis circuitry to implement the functions described herein. Further, in some examples, companion device 300 may not include a dedicated central processing unit and an operating system. Functions of companion device 300 may be realized using any combination of hardware, firmware and/or software implementations.

Referring again to FIG. 3, each of central processor unit(s) 302, system memory 304, and system interface 310, may be similar to central processor unit(s) 202, system memory 204, and system interface 210 described above. Storage device(s) 312 represent memory of companion device 300 that may be configured to store larger amounts of data than system memory 304. Storage device(s) 312 may be internal or external memory and in some examples may include non-volatile storage elements. For example, storage device(s) 312 may include memory cards (e.g., a Secure Digital (SD) memory card), and/or an internal solid state drive. User interface(s) 314 may include devices configured to receive input from a user. For example, user interface(s) 314 may be similar to user interface(s) 222 described above, and may include buttons and switches, motion sensors, a touch-sensitive sensors, a track pad, a mouse, a keyboard, a microphone, a video camera, or any other type of device configured to receive user input. In one example, user interface(s) 314 may include a touchscreen display configured to display one or more of the graphical user interfaces described herein. As described above and in further detail below, a user may provide commands to a computing device (e.g., a television or a set-top box) by activating portions of a graphical user interface displayed on a companion device 300.

Network interface 316 may be configured to enable companion device 300 to communicate with external computing devices, such as computing device 200 and other devices or servers. Further, in the example where companion device 300 includes a smartphone, or the like, network interface 316 may be configured to enable companion device 300 to communicate with a cellular network. Network interface 316 may include a network interface card, such as an Ethernet card, an optical transceiver, a radio frequency transceiver, or any other type of device that can send and receive information. Network interface 316 may be configured to operate according to one or more communication protocols such as, for example, a Global System Mobile Communications (GSM) standard, a code division multiple access (CDMA) standard, a 3rd Generation Partnership Project (3GPP) standard, an Internet Protocol (IP) standard, a Wireless Application Protocol (WAP) standard, Bluetooth, ZigBee, and/or an IEEE standard, such as, one or more of the 802.11 standards, as well as various combinations thereof.

As illustrated in FIG. 3, system memory 304 includes operating system 306, applications 308, and content selection application 309 stored thereon. Operating system 306 may be configured to facilitate the interaction of applications 308 and content selection application 309 with central processing unit(s) 302, and other hardware components of companion device 300. Operating system 306 may include any version of any of the example operating systems described above, or any similar operating system. It should be noted that the techniques described herein are not limited to a particular operating system. Applications 308 and content selection application 309 may be any applications implemented within or executed by companion device 300 and may be implemented or contained within, operable by, executed by, and/or be operatively/communicatively coupled to components of companion device 300. Applications 308 and content selection application 309 may include instructions that may cause central processing unit(s) 302 of companion device 300 to perform particular functions. Applications 308 may include algorithms which are expressed in computer programming statements, such as, for loops, while-loops, if-statements, do-loops, etc. In one example, applications 308 may include one or more dedicated applications enabling a user to access a digital media service. In one example, an application distribution site (e.g., application distribution site 122) may provide content selection application 309 to companion device 300.

As described above, content application 209 may operate in conjunction with an application running on a companion device. In one example, content selection application 309 may be configured to receive data from a computing device and parse the data in order to determine a context and/or a sub-context. A context may identify an application currently running on a computing device and a sub-context may identify a particular aspect of an application running on a computing device, e.g., a graphical user interface currently displayed. Content selection application 309 may be configured to provide functionality based on a context and/or a sub-context. For example, as described in detail below, a companion device may include a user interface that displays soft buttons based on an application currently running on a computing device and a companion device enable a user to cause different functionality to occur based on an application currently running on a computing device.

Figure 4:
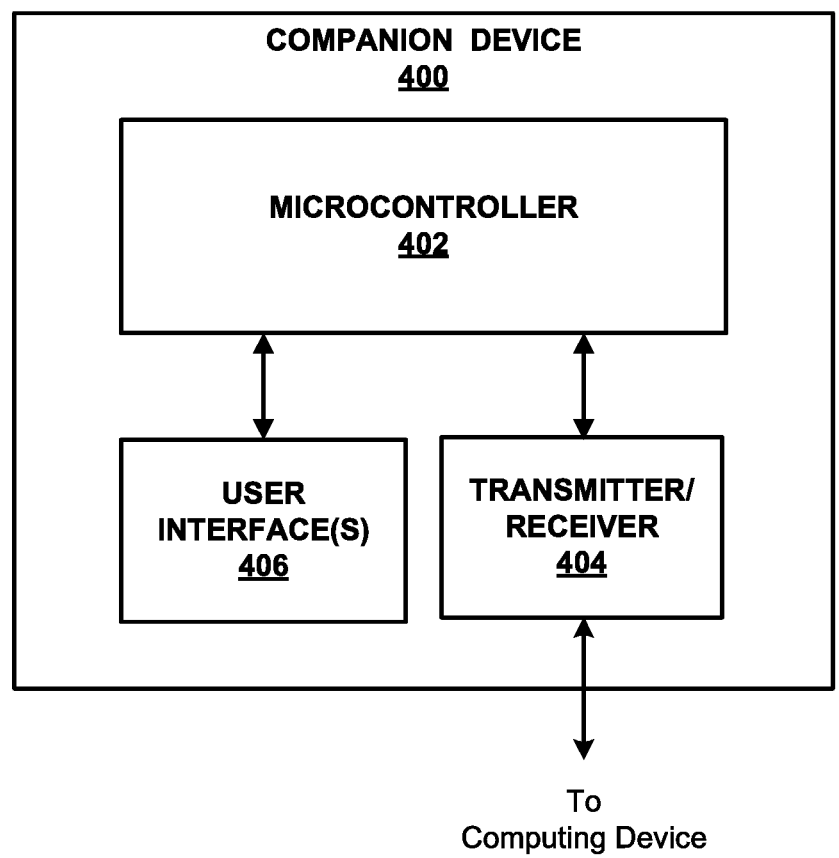
FIG. 4 is a block diagram illustrating an example of a companion device that may implement one or more techniques of this disclosure.

As described above, in some examples, a companion device may not include a dedicated central processing unit and an operating system. FIG. 4 is a block diagram illustrating an example of a companion device that may implement one or more techniques of this disclosure. In one example, companion device 400 may be included as part of a dedicated device remote control. As illustrated in FIG. 4, companion device 400 includes microprocessor 402, transmitter/receiver 404, and user interface(s) 406. Microprocessor 402 may include a microprocessor programmed to execute one or more of the techniques described herein. In one example, microprocessor 402 may enable functional similar to that described above with respect to content selection application 309. Transmitter/receiver 404 may include any combination of transmitter device and receiver device configured to enable communications with a computing device. User interface(s) 406 may include any of the example user interfaces described herein. In one example, user interface(s) 406 may include push-buttons.

As described above, each of computing device 200, companion device 300, and companion device 400 may include user interfaces. FIGS. 5-7A are conceptual diagrams illustrating respective examples of user interfaces that may implement one or more techniques of this disclosure. It should be noted that the techniques described herein are generally applicable regardless of the particular hardware and software implementations of a device including an example user interface described herein. For example, when a user interface described herein is implemented as part of a dedicated remote control device, functions may be implemented using application specific integrated circuits (ASICs) or the like. Further, when a user interface described herein is implemented as part of a mobile computing device, functions may be implemented using applications available from an application distribution site, e.g., application distribution site 122. Further, it should be noted that functionality described below with respect to a user interface of a companion device may be distributed between a companion device and a computing device in communication with the companion device. For example, a companion device may generate electrical signals corresponding to a received user input. In some cases, a companion device may simply communicate the electrical signals to a computing device and the computing device may interpret the electrical signals in order to associate the electrical signals with a particular command. In some cases, a companion device may interpret the electrical signals and communicate a particular command to a computing device. Further, in the case where multiple levels of interpretation are required (e.g., interpretation of touch input to a motion event and interpretation of motion events to a gesture) interpretations may be distributed between a companion device and a computing device. That is, the techniques described herein may be generally applicable regardless of how processing is distributed between a computing device and a companion device.

Figure 5:
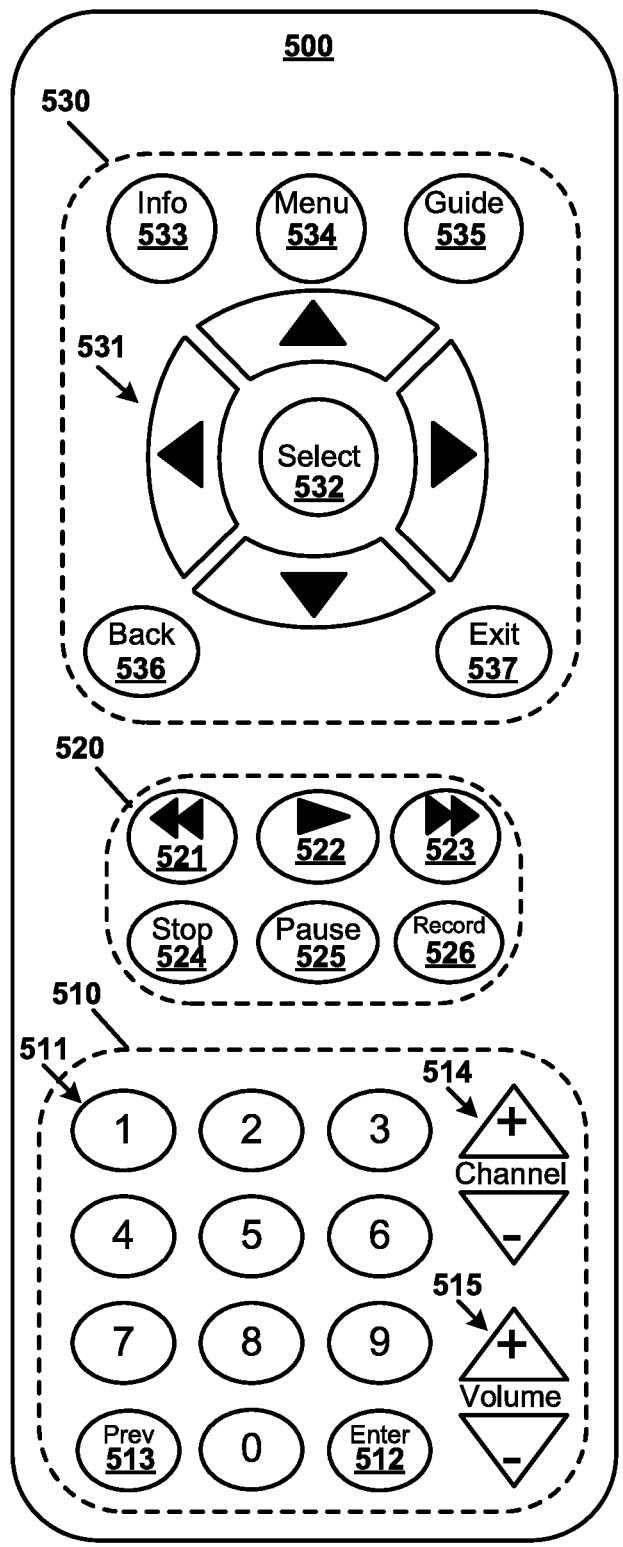
FIG. 5 is a conceptual diagram illustrating an example of a user interface that may implement one or more techniques of this disclosure.

FIG. 5 is a conceptual diagram illustrating an example of a user interface that may implement one or more techniques of this disclosure. User interface 500 may generally correspond to a push-button remote controller user interface. User interface 500 may be included in a companion device that includes a dedicated device remote control. As described in further detail below, the functionality of user interface 500 may be implemented using other types of user interfaces. For example, functions achieved by activation of particular buttons of user interface may be achieved through other types of user inputs. For example, in the case where a user interface includes a touchscreen, gesture recognition, and/or voice recognition, virtual buttons may be presented on the touchscreen and functions achieved by activation of buttons on user interface 500 may be achieved through any and all combinations of virtual button activation, motion gestures, and/or voice commands.

User interface 500 includes basic television controls 510, playback controls 520, and navigational controls 530. Basic television controls 510 may be configured to enable a user to perform basic tuning and volume control functions typically associated with viewing television programming. As illustrated in FIG. 5, basic television controls 510 include numeric keypad 511, enter button 512, previous channel button 513, channel change buttons 514, and volume control buttons 515. Numeric keypad 511, enter button 512, previous channel button 513, and channel change buttons 514 may be configured to enable a user to access a particular service, e.g., to tune to a particular analog and/or digital channel. In the case of a user tuning to a particular channel, upon a user entering a sequence of numbers using numeric keypad 511 and, optionally, additionally activating enter key 512, a tuner may tune to a specified channel Upon activation of previous channel button 513, a tuner may tune to a previously tuned channel. Activation of "+" and "−" channel buttons 514 may respectively cause a tuner to tune to the respective next channel in a sequence of channels. Activation of "+" and "−" volume control buttons 515 may respectively cause the output of an audio system to be increased or decreased. It should be noted that although the basic television controls 510 may be configured to enable a user to perform basic tuning and volume control functions associated with a television, in some examples, basic television controls 510 may be used to perform other functions associated with a computing device.

Playback controls 520 may be configured to enable a user to control the playback of and/or record multimedia content. For example, playback controls 520 may enable a user to control the playback of a video originating from a media service provider site, an on demand engine, and/or a personal video recorder (PVR). As illustrated in FIG. 5, playback controls 520 include reverse playback button 521, normal playback button 522, forward playback button 523, stop playback button 524, pause playback button 525, and record button 526. Reverse playback button 521 may enable to a user to navigate to a previous point in a multimedia sequence. Upon activation, normal playback button 522 may cause normal playback of an item of multimedia content to begin or resume. Forward playback button 523 may enable a user to navigate to a future point in a multimedia sequence. Upon activation, stop playback button 524 may cause the playback of an item of multimedia content to cease. Upon activation, pause playback button 525 may cause the playback of an item of multimedia content to be paused. Record button 526 may enable a user to cause an item of multimedia content to be stored to a storage device. In one example, record button 526 may enable a user to record content to a storage device. It should be noted that although playback controls 520 may be configured to enable a user to control the playback of and/or record multimedia content, in some examples playback controls 520 may be used to perform other functions associated with a computing device.

As described above, devices with digital media playback capabilities, including, for example, televisions, set top boxes, and mobile devices, may be configured to provide users thereof with graphical user interfaces that enable the selection of content. Navigational controls 530 may be configured to enable a user to navigate graphical user interfaces and select content using a graphical user interface. In one example, navigational controls 530 may be configured to enable a user to navigate graphical user interfaces and access items of content according to the techniques described herein.

In the example illustrated in FIG. 5, navigational controls 530 include navigational arrow buttons 531, select button 532, information button 533, menu button 534, guide button 535, back button 536, and exit button 537. Navigational arrow buttons 531 may be configured to move the position of a cursor associated with a graphical user interface and/or change the selection of an item included in a graphical user interface. Select button 532 may enable a user to further select an icon. In one example, consecutive activations of select button 532 may cause respective levels of selection to occur. Information button 533 may be configured to cause additional information associated with an item of content of to be displayed. For example, when an icon representing an item of content is initially selected, activation of information button 533 may cause information associated with the content (e.g., cast and crew information) to be displayed.

Menu button 534, guide button 535, back button 536, and exit button 537 may be configured to enable a user to cause different graphical user interfaces to be presented. Upon activation, menu button 534 may cause a graphical user interface including a high level menu to be displayed. In one example, a high level menu may include a menu that enables a user to change settings associated with the operation of a computing device. In one example, a high-level menu may include a menu that enables a user to select a user profile (e.g., a log-in graphical user interface). Upon activation, guide button 535 may be configured to provide a graphical user interface that enables a user to select content. In one example, upon activation of guide button 535, a graphical user interface including a grid guide may be presented to a user. Back button 536 may be configured to enable a user to return to a previous graphical user interface. Exit button 537 may be configured to enable a user to return to a full screen viewing mode. For example, when a graphical user interface is displayed, upon activation of exit button 537, the graphical user interface may "disappear" and a full screen content viewing mode may be presented to a user.

Figure 6:
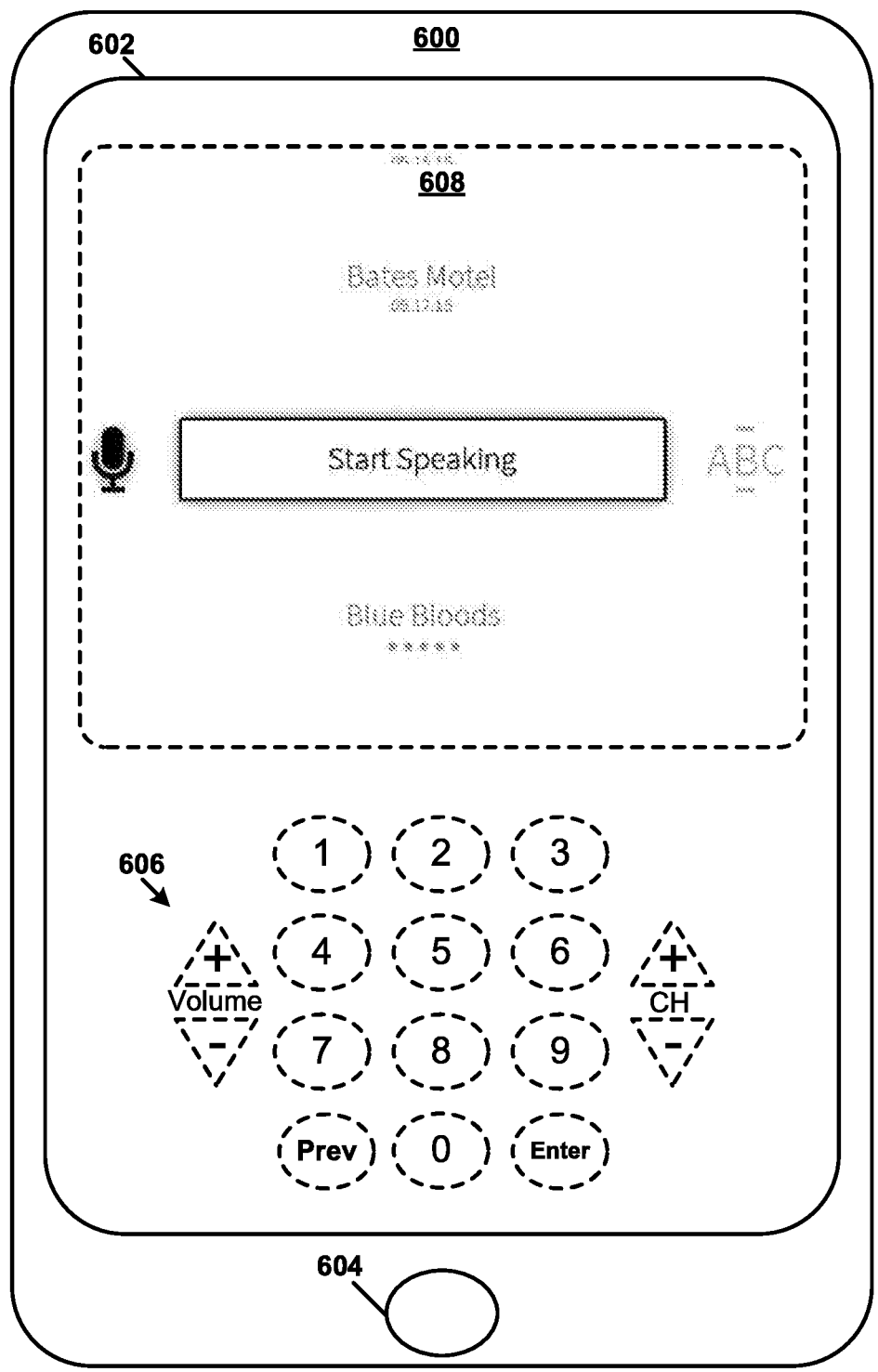
FIG. 6 is a conceptual diagram illustrating an example of a user interface that may implement one or more techniques of this disclosure.

FIG. 6 is a conceptual diagram illustrating an example of a user interface that may implement one or more techniques of this disclosure. User interface 600 may generally correspond to a mobile computing device (e.g., a smartphone or a tablet computing device) user interface. In the example illustrated in FIG. 6, user interface device 600 includes touchscreen display 602 and button 604. It should be noted that in some examples, user interface 600 may include a microphone and/or motion sensors and may be configured to receive voice and motion input. In some examples, button 604 may be referred to as a home button. Touchscreen display 602 may include any display device configured to display graphics and receive a user touch input. For example, touchscreen display 602 may include an LCD display, an OLED display, or any other type of display device capable of presenting visual data to a user, and a capacitive touch sensor device, a resistive touch sensor device, or any other type of device capable of receiving user touch events. Further, it should be noted that touchscreen 602 may be configured to receive user touch events directly or indirectly (e.g., using a stylus). Touchscreen display 602 may be configured to display icons representing items of content. As further described in detail below, touchscreen display 602 may be configured to enable a user to perform multiple types of activations with respect to a region of touchscreen display 602, where a region may correspond to a displayed graphic (e.g., an icon). That is, touchscreen display 602 may be configured to receive one or more of the following user touch inputs: a signal tap, a double-tap, a press of a specified duration (e.g., a long press), a multi-point touch input (e.g., a pinch gesture), and complex touch gestures (e.g., drag and drop gesture, character writing gestures, and swiping gestures). Further, in some examples, touchscreen display 602 may be pressure sensitive and cause different types of activations to occur based on the amount of pressure a user applies to touchscreen display 602 (i.e., how "hard" a user presses). Button 604 may cause difference graphical user interfaces to be displayed on touchscreen display 602. In the example illustrated in FIG. 6, one or more activations of button 604 may cause user touchscreen display 602 to display a home screen. Further, button 604 may have different functionality based on a graphical user interface displayed on touchscreen display 602.

In the example illustrated in FIG. 6, touchscreen display 602 displays virtual buttons 606 and a graphical user interface 608 within respective regions. Virtual buttons 606 may replicate push-buttons, including, for example, one or more of the buttons described above with respect to FIG. 5. A user may activate a virtual button by activating a corresponding area on touchscreen display 602. It should be noted that in some instances virtual buttons may be referred to as soft keys. In the example illustrated in FIG. 6, virtual buttons 606 replicate a numeric keypad, an enter button, a previous channel button buttons, and volume control buttons. Graphical user interface 608 may include one or more components of a graphical user interface described herein. For example, graphical user interface 608 may include icons representing an item of content, as described in detail below. In the example illustrated in FIG. 6, graphical user interface 608 includes a voice activated searching graphical user interface. For example, upon a user saying the name of an actress and graphical user interface 608 may display a list of movies associated with the actress.

Figure 7A:
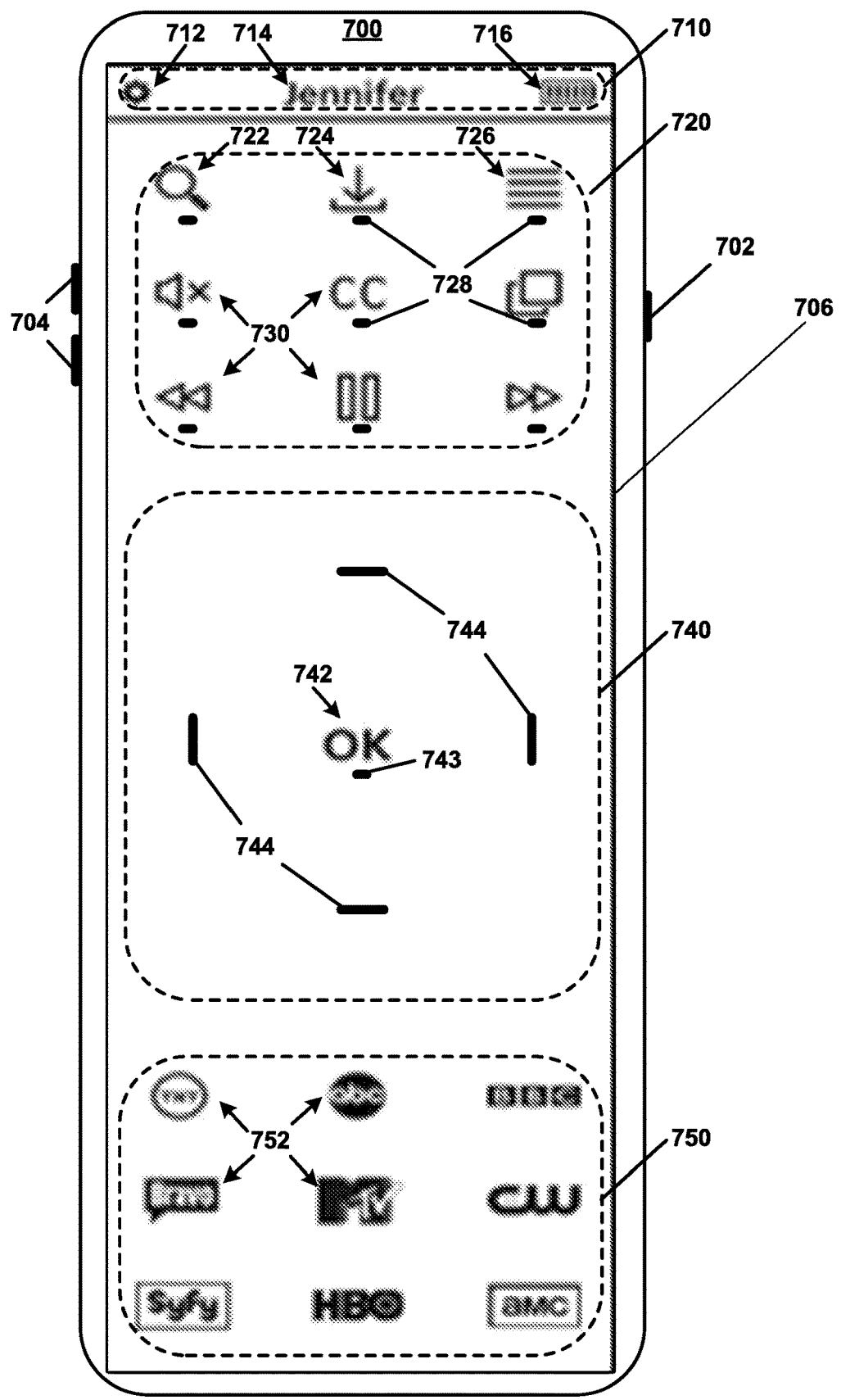
FIG. 7A is a conceptual diagram illustrating an example of a user interface that may implement one or more techniques of this disclosure.

FIG. 7A is a conceptual diagram illustrating an example of a user interface that may implement one or more techniques of this disclosure. In the example illustrated in FIG. 7A, user interface 700 includes stand-by button 702, volume control buttons 704, and touch interface 706. In one example, user interface 700 may be implemented as part of companion device 790 illustrated in FIGS. 7B-7C. Companion device 790 may, in some examples, be referred to as a dynamic remote controller. Stand-by button 702 may be configured such that upon activation, components of a companion device including user interface 700 are powered up and/or powered down. Further, upon activation of stand-by button 702 components of a computing device may be powered up and/or powered down. Volume control buttons 704 upon activation, may respectively cause the output of an audio system to be increased or decreased. Touch interface 706 may include any device and/or combination of devices configured to dynamically display icons, and the like, and receive touch input.

Figure 7B:
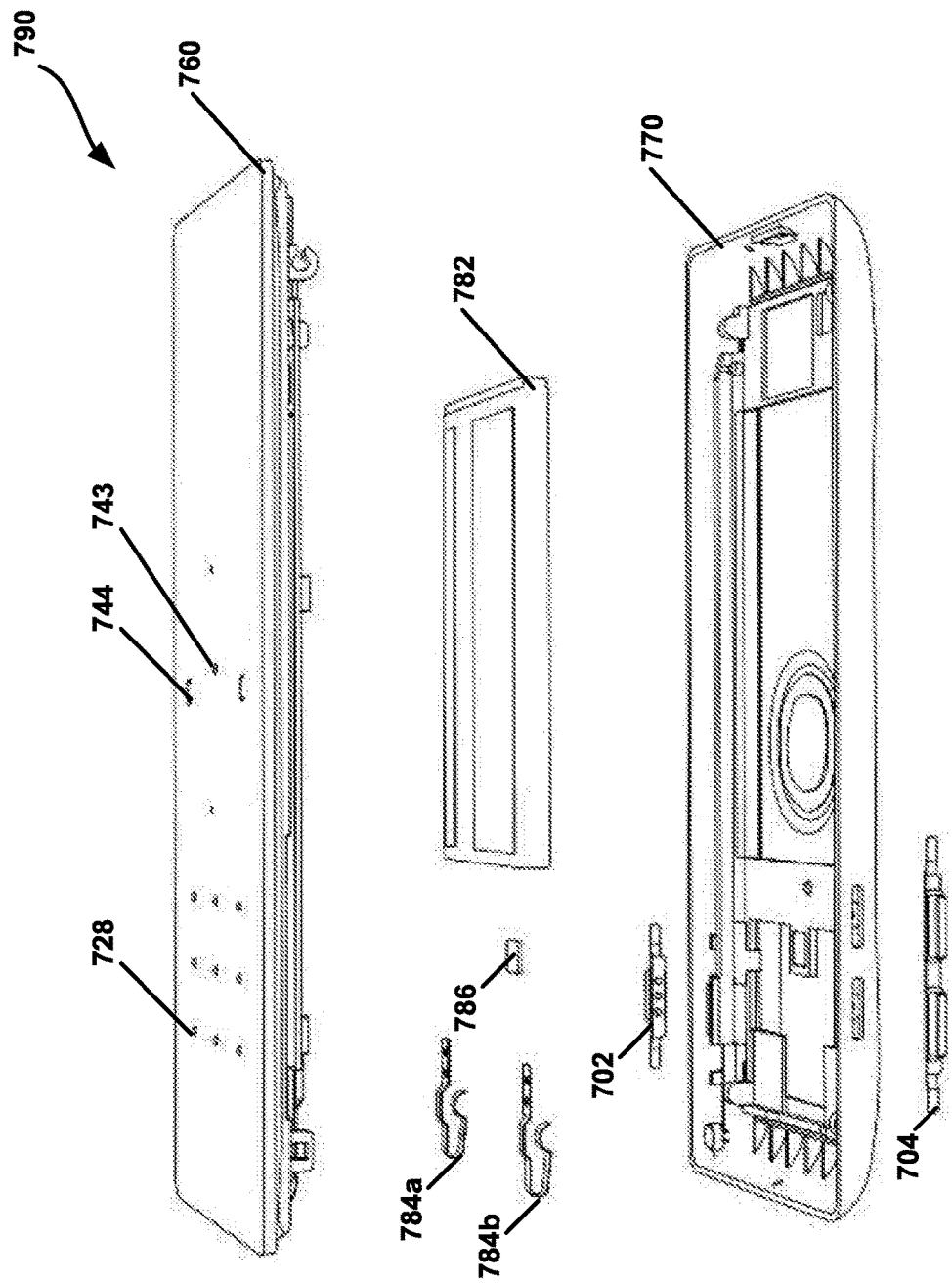
FIG. 7B-7C are conceptual diagrams illustrating exploded views of a mechanical assembly of a companion device that may include the example user interface illustrated in FIG. 7A.
Figure 7C:
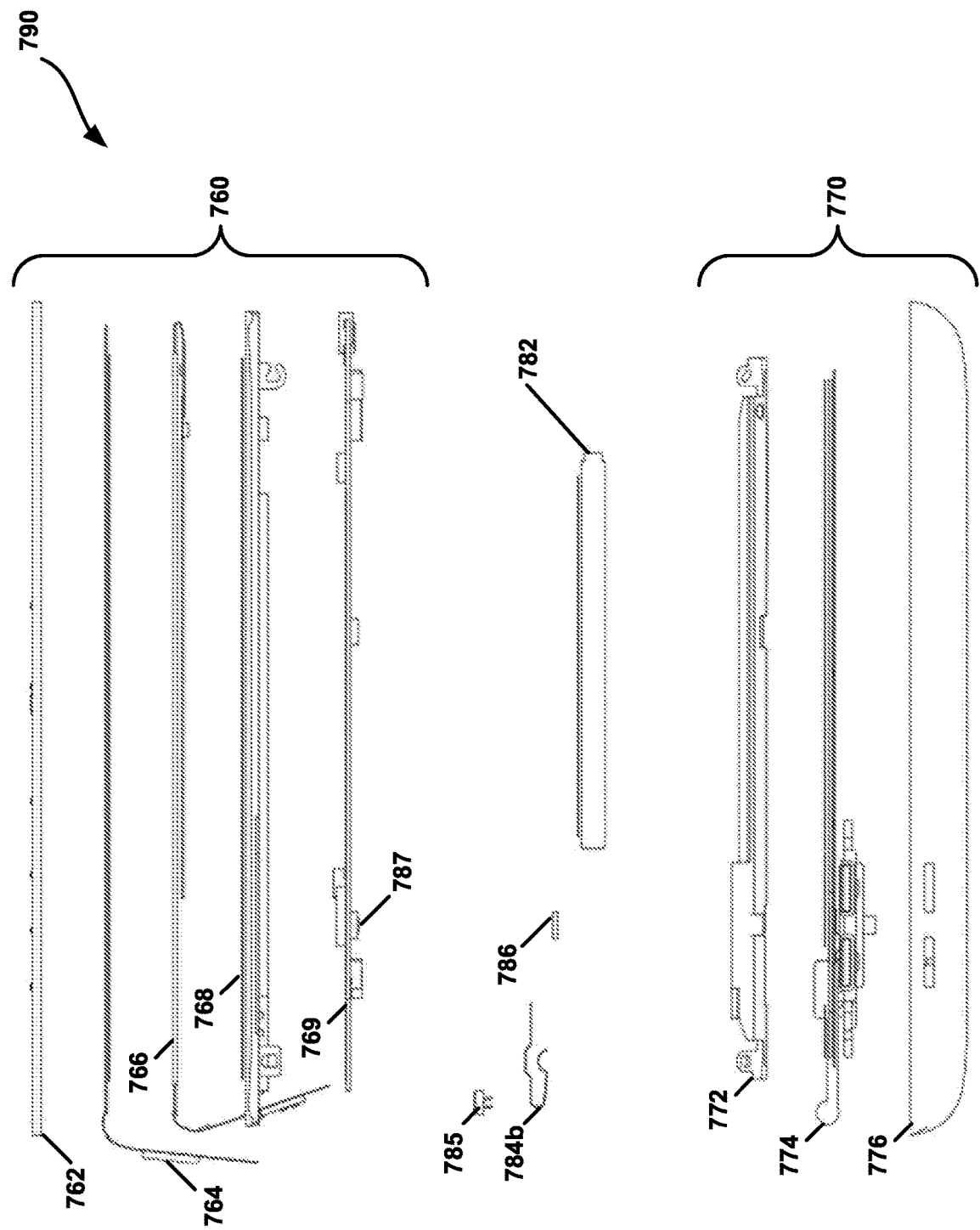

As illustrated in FIGS. 7B-7C, companion device 790 includes top cover assembly 760 and bottom cover assembly 770. In the example illustrated in FIGS. 7B-7C, battery 782, springs 784a-784b, microphone 785, and switch cover 786 are disposed between top cover assembly 760 and bottom cover assembly 770 when companion device 790 is assembled. Companion device 790 is assembled such that top cover assembly 760 is hinged with respect to bottom cover assembly 770, such that, springs 784a-784b may be compressed. That is, a user holding companion device 790 may press top cover assembly 760 and cause springs 784a-784b to become compressed. For example, a user may hold bottom cover assembly 770 in a palm and press on top cover assembly 760 to cause springs 784a-784b to become compressed. Switch cover 786 covers switch 787, included in top cover assembly 760, as illustrated in FIG. 7C, such that the compression of springs 784a-784b may cause switch 787 to be activated by bottom cover assembly 770. Thus, a user may activate switch 787 by pressing top cover assembly 760. Such an activation may be referred to as a click activation and may be accompanied by a mechanical click sound. It should be noted that switch cover 786 may be configured to provide a high quality (e.g., loud and distinct) audible "click" sound.

Referring to FIG. 7A, touch interface 706 dynamically displays icons, and the like. Dynamically displayed icons may be referred to as virtual or soft buttons or keys. Touch interface 706 or regions thereof may include a touchscreen display as described above, e.g., an LCD display, an OLED display, etc. A user may activate a displayed icon button by activating a corresponding area on touch interface 706. In the example where user interface 700 is implemented as part of computing device 790, touch interface 706 may be implemented as part of top cover assembly 760. Referring to FIG. 7C, top cover assembly 760 includes top cover 762, touch panel 764, display 766, upper structure 768, and circuit board 769. Top cover 762 may include a solid translucent material (e.g., a clear plastic, glass, including Gorilla® glass, developed by Corning, Inc., or the like) having zero or more protrusions (e.g., protrusions 728, 743, and 744). As described in further detail below, protrusions may be arranged on the surface of top cover 762 to provide haptic feedback (e.g., enable a user to locate the position of an icon). Touch panel 764 may be any device configured to detect touch events and to generate electric signals in accordance with detected touch events. Touch panel 764 may include a capacitive touch sensor device, a resistive touch sensor device, or any other type of device capable of receiving user touch events. In one example, touch events may include an action down event (e.g., a user touching touch panel 764) and action up event (e.g., a user lifting a finger) and each action down event and action up event may be associated with a set of coordinates indicating a position on touch panel 764. Display 766 may include any display device configured to display graphics. In one example, display 766 may include a flexible display device. In one example, display 766 may include an electrophoretic display (EPD) device, which may be referred to as an electronic paper display or electronic ink device. Display 766 may include a full-color display or a monochromatic display.

Upper structure 768 may support top cover 762, touch panel 764, display 766, and circuit board 769. That is, top cover 762, touch panel 764, display 766, and circuit board 769 may be mounted to upper structure 768. Further, upper structure 768 includes a hinge structure enabling top cover assembly 760 and bottom cover assembly 770 to be hinged as described above. Circuit board 769 may include electronic components of companion device 790. Electronic components may include any combination of logical components, e.g., components described above with respect to FIG. 3 and FIG. 4, configured to enable the functionality described herein.

Referring to FIG. 7C, bottom cover assembly 770 includes middle structure 772, speaker structure 774, and bottom cover 776. Bottom cover 776 and top cover 762 enclose components of companion device 790. Bottom cover 776 may be composed of plastic, metal, or any other suitable material. Middle structure 772 supports springs 784a-784b, microphone 785, battery 782 and speaker structure 774. Microphone 785 may be configured to receive audio input (e.g., user voice commands) In one example, user interface 700 may be configured to receive audio input through microphone 785 upon switch 787 being depressed. That is, a user may press and hold top cover assembly 760 in order to provide a verbal command (e.g., "Search for Walking Dead"). Battery 782 may power companion device 790 and in one example may include a rechargeable battery (e.g., lithium-ion, nickel-cadmium, etc.). Speaker structure 774 includes one or more speakers operably connected to the circuit board. Thus, companion device 790 may be configured to output audio through one or more speakers mounted to speaker structure 774. It should be noted that in some examples, companion device 790 may additionally include motion sensors (e.g., accelerometers) and may be configured to receive motion input in addition to audio input.

In the example illustrated in FIG. 7A, touch interface 706 includes status area 710, dynamic button area 720, navigational area 740, and short-cut icon area 750. Status area 710 may be configured to display status information associated with a companion device and/or a computing device. Further, status area 710 may be configured to enable a user to change a status and/or settings associated with a companion device and/or a computing device. In the example illustrated in FIG. 7A, status area 710 includes settings icon 712, user identifier 714, and power indicator icon 716. Settings icon 712 may be configured to enable a user to change a setting associated with a companion device or a computing device. In one example, upon activation, settings icon 712 may cause a graphical user interface to be presented on a display associated with computing device that enables a user to change settings associated with a computing device (e.g., settings related to a time zone, a language, etc.). Further, in one example, upon activation, settings icon 712 may cause a graphical user interface to be presented on a display associated with computing device or on touch interface 706 that enables a user to change a setting associated with a companion device (e.g., settings related to sensitivity of touch interface 706, etc.).

User identifier 714 may be configured to display a user currently associated with a computing device and/or a companion device. For example, if a computing device is running an application associated with a media streaming service, user identifier 714 may display an identifier associated with a user currently logged-in to the application. Further, in one example, user identifier 714 may display an identifier associated with a user currently operating a computing device through a companion device including user interface 700. For example, a computing device and/or a companion device may support multiple users and may include profiles including information associated with each respective user. In some examples, information included in a profile may include one or more of a user's favorite media services (e.g., television channels, streaming services, etc.), an indication of whether a user is right hand dominant or left hand dominant, and other user customizable settings. Further, in some examples, a profile may include consumption and behavior information. In one example, consumption may include content a user has accessed or is accessing. In one example, behavior may include user usage information such as, for example, how fast the user changes channels, how often the user skips commercials, how frequently a user accesses content through a computing device, how frequently a user accessing a particular graphical user interface, etc.

In some examples, information included in a profile may enable dynamic functionality of user interface 700. For example, as described in detail below, icons displayed in short-cut icon area 750 may be based on a user's preferred media services. Further, as described in detail below, user input gestures with respect to navigational area 740 may be based on whether a user is right hand dominant or left hand dominant. In one example, upon activation, user identifier 714 may cause a graphical user interface to be presented on a display associated with a computing device and/or a display associated with a companion device that enables a user to change a corresponding user identifier (e.g., log-in to an application, a computing device, and/or a companion device as another user). Power indicator icon 716 may be configured to display the remaining energy of batteries powering a companion device (e.g., battery 782). In one example, power indicator icon 716 may provide a visual warning when the remaining energy is at a low level (e.g., blink, flash, etc.). It should be noted that in one example, icons included in status area 710 may remain static regardless of the application running on a computing device.

Dynamic button area 720 may be configured to enable a user to cause functionality associated a computing device to occur and/or cause functions associated with an application currently running on a computing device to be performed. Further, in the example illustrated in FIG. 7A, dynamic button area 720 includes respective protrusions 728 positioned such that each protrusion may correspond to the location of a virtual button. Virtual buttons may enable any number of functions associated with the operation of a computing device and applications running thereon. For example, in the case where a computing device includes a set-top box or a dedicated media streaming device capable of running a plurality of dedicated applications and/or accessing items of content through a plurality of dedicated media services, dynamic button area 720 may display virtual buttons associated with a high-level device menu in order to enable application selection. Further, virtual buttons displayed in dynamic button area 720 may be application specific and may change based on an application currently running on a computing device. Further, it should be noted that the presentation of a particular virtual button displayed in dynamic button area 720 may change based on the operating state of an application running on a computing device. For example, the appearance of a virtual button enabling a function to be toggled (play/pause, mute/unmute, etc.) may change based on the current setting of a function. In this manner, virtual buttons displayed in dynamic button area 720 may change based on a context and/or a sub-context.

In the example illustrated in FIG. 7A, designated button area 720 includes virtual buttons associated with high level computing device functions, search icon 722, save icon 724, and menu icon 726 and virtual buttons 730 associated with a particular application running on a computing device (a media playback application in the example illustrated in FIG. 7A). Search icon 722 may be configured to enable a user to perform a high-level search associated with a computing device. In one example, upon activation, search icon 722 may cause a graphical user interface to be displayed that enables a user to search the availability and accessibility of particular items of content across multiple media service provider sites or services. For example, a graphical user interface may be presented that enables a user to search for available items content associated with a particular actor and may provide aggregated search results from multiple media service provider sites or services (e.g., television service, on demand service, streaming services, etc.). In one example, upon activation, search icon 722 may cause a graphical user interface to be displayed that enables a user to search for applications available through an application distribution site. Graphical user interface 608 described above with respect to FIG. 6 illustrates an example of a graphical user interface enables a user to search the availability and accessibility of particular items of content across multiple media service provider sites or services.

Save icon 724 may be configured to enable a user to cause an item of content to be accessed through a particular graphical user interface at a future point in time. For example, upon activation, save icon 724 may be configured to add items of content to a user's so-called media library. For example, a user may cause a subset of available items of content be accessible through a graphical user interface associated with a PVR menu or the like. The graphical user interface may be referred to as a "My TV" or a "My Recordings" menu. In one example, upon activation, save icon 724 may cause a graphical user interface to be displayed that enables a user to download particular items of content for storage on a local storage device (e.g., saved to a hard disk drive of a PVR). Further, in one example, upon activation, save icon 724 may store a pointer to a server, or the like, to enable a user to access an item of content from a server. For example, if a tile corresponding to a video on demand item of content is active in a graphical user interface when save icon 724 is activated, a pointer to the item of content on a media server may be saved. It should be noted that in some examples, whether an item of content is stored locally or whether a pointer is stored may be transparent to the user. In some cases, segments of an item of content (e.g., the first 10 minutes of a movie) may be stored locally and segments of the item of content (e.g., the subsequent portion of the movie) may be retrieved from a server. Menu icon 726 may be configured to cause a graphical user interface including a high level menu to be displayed. In one example, upon activation, menu icon 726 may be configured to cause graphical user interface 1000 described below with respect to FIG. 12 to be displayed. It should be noted that in some examples, menu icon 726 may have similar functionality as back button 536.

In the example illustrated in FIG. 7A, virtual buttons 730 are associated with media playback control functions and include a mute button (i.e., upon activation, causes volume to be muted/unmuted), a closed-captioning button (i.e., upon activation, causes closed-caption text to be displayed/not displayed), a presentation window button (i.e., upon activation, causes a video presentation window to be displayed in a full-screen mode or restored down to a smaller presentation window), reverse playback and forward playback buttons (i.e., upon activation, causes a video presentation to be reversed or advanced), and play or pause button (i.e., upon activation, causes a video presentation to pause or resume). It should be noted that although virtual buttons 730 are described with respect to a video playback application in the example illustrated in FIG. 7A, virtual buttons 730 may include buttons associated with any type of application. For example, in the case where an application includes an application enabling voice and/or video calls to occur, virtual buttons may include a button that enables a user to cause video to be displayed (e.g., a video camera icon), a button that enables a user to end a call (e.g., a telephone handset icon), and the like. In other examples, other types of buttons may be displayed based on the type of application.

Navigational area 740 may be configured to receive user touch inputs including gestures. Functionality associated with a computing device and/or an application may occur based on received user touch inputs. As described above, user touch inputs may include a single-tap, a double-tap, a press of a specified duration, a multi-point touch input, and complex touch gestures. As further described above, touch panel 764 may be configured to detect touch events (e.g., action down events and action up events) and generate a set of coordinates indicating a position on touch panel 764 corresponding to an action. That is, a touch panel 764 may sample electrical signals that provide information with respect to the location of a user's finger on touch panel 764 (i.e., where touch panel 764 is activated). A touch event handler may be configured to receive one or more touch events during a time period and determine whether the one or more touch events correspond to a particular user touch input. In one example, a touch event handler may receive a plurality of action down events during a time period and determine that a motion event having a particular velocity has occurred and/or determine that the motion event corresponds to a particular gesture. It should be noted that interpreting whether touch events correspond to a motion event and whether motion events correspond to a gesture may be determined by a companion device and/or a computing device. For example, a companion device may send any combination of touch events (e.g., an action, a set of coordinates, and a time), motion events, and/or an indication of a gesture (e.g., a double-tap) to a computing device. As described above, the techniques described herein may be generally applicable regardless of how processing (e.g., touch event handling) is distributed between a computing device and a companion device.

Further, as described above, companion device 790 is configured to receive a click activation, which may include a single or multiple click activations. In the example illustrated in FIG. 7A, navigational area 740 includes visual and haptic feedback that may assist a user in providing gestures. In the example illustrated in FIG. 7A, navigational area 740 includes displayed OK button 742 and corresponding protrusion 743, and protrusions 744. In one example, OK button 742 may, upon activation, provide functionality similar to select button 532 described above with respect to FIG. 5. In one example, OK button 742 may be activated upon a user tapping on a region of navigational area 740 associated with OK button 742 and/or a user performing a click activation while activating touch interface 706 at the region corresponding to OK button 742. As described in detail below, in some examples, activation of OK button 742 based on a tap and activation of OK button 742 based on a click may cause different respective functionality to occur. Protrusions 744 may be configured to provide haptic feedback to a user of user interface 700. That is, a user may be able to feel protrusions 744 to determine the position of the user's finger with respect to navigational area 740. The position of a user's finger (e.g., where a user starts or terminates a gesture) may enable a particular type of gesture to cause distinct functions to occur with respect to a computing device and/or an application running on a computing device. It should be noted that although protrusions are illustrated as dots or lines in the example of FIG. 7A, in some examples, protrusions may include characters and the like. For example, protrusions corresponding to OK button 742 may include a raised O and K. Further, it should be noted that in some examples touch interface 706 may include indentations in addition to or as an alternative to protrusions. Further, it should be noted that in some examples touch interface 706 may include fewer, including none, of the protrusions illustrated in the example illustrated in FIG. 7A.

FIGS. 8A-8D are conceptual diagrams illustrating examples of user inputs that may be received by the example user interface illustrated in FIG. 7A according to one or more techniques of this disclosure. In the examples illustrated in FIG. 8A and FIG. 8B, and other examples described below, the "X" indicates an initial location where a user activates navigational area 740 (e.g., where a user initially presses with a finger or stylus) and the directional arrows indicate movement while navigational area 740 is active (e.g., a user sliding a finger across the surface). It should be noted that in some examples the "X" illustrated with respect to navigational area 740 may indicate an initial touch location that does not include a corresponding click activation. In contrast, the "[X]" illustrated in FIG. 8C and FIG. 8D may indicate a touch location and a corresponding click activation, i.e., a user pressing navigational area 740 and causing switch 787 to be activated.

As described above, a set of touch events may correspond to one or more motion events and one or more motion events may correspond to a gesture. Table 1 provides an example of a set of touch events that correspond to the example user input illustrated in FIG. 8A. In the example illustrated in Table 1, the x-coordinate and y-coordinate have a range of 0 to 100 and the origin (0, 0) is located at the top-left corner.

TABLE 1

| Time | Touch Event | X-coordinate | Y-coordinate |
| --- | --- | --- | --- |
| 0 | Action Down | 75 | 50 |
| $t_1$ | Action Down | 60 | 50 |
| $t_2$ | Action Down | 40 | 50 |
| $t_3$ | Action Up | 25 | 50 |

In the example illustrated in Table 1, a user touches navigational area 740 with a finger at an initial touch location (75,50), slides the finger to the left while maintaining the contact with navigational area 740, and lifts a finger at a final touch location (25,50). The data in Table 1 may be interpreted as a motion event (i.e., a left motion event) having a distance (i.e., 50), and having a speed (i.e., $50/t_3$). It should be noted that the data in Table 1 may, in some cases, be interpreted as two or more motion events. Further, the data in Table 1 may be interpreted as a gesture. For example, a particular gesture may require a minimum distance and a minimum speed. As described above, interpreting whether touch events correspond to a motion event and whether motion events correspond to a gesture may be determined by a companion device and/or a computing device. In one example, a companion device may receive touch events at one sampling rate, filter the touch events (e.g., average coordinate values of multiple samples), and send a reduced set of touch events to a computing device. Thus, with respect to the example illustrated in Table 1, a companion device may send the data in Table 1 to a computing device, and a computing device may interpret motion events and gestures. In some examples, the level of filtering of touch event data that a companion device performs prior to sending touch event data to a computing device may be based on an application currently running on a computer device and/or a graphical user interface currently displayed on a computing device. That is, some applications may be more sensitivity to touch input than others and as such may require more touch event data. Other applications running on a computing device may require less than all of the touch event data that may be generated by a companion device.

Figure 8B:
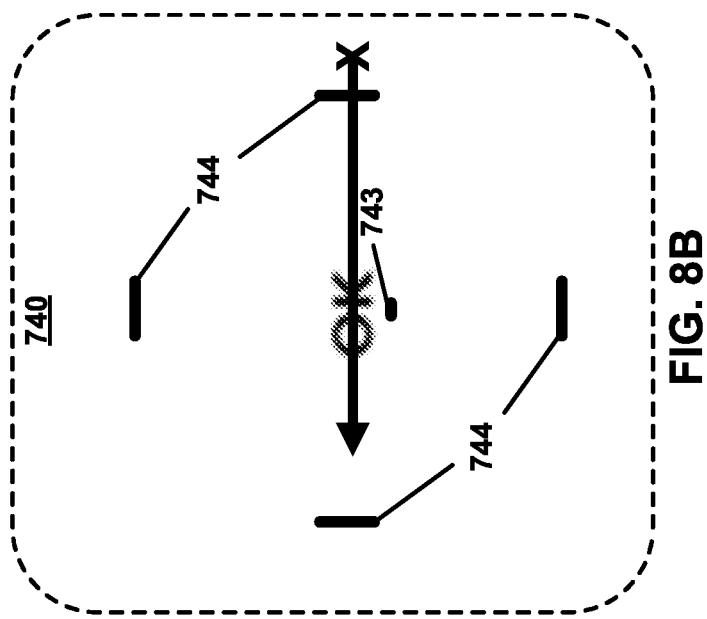
FIGS. 8A-8D are conceptual diagrams illustrating example user inputs that may be received by the example user interface illustrated in FIG. 7A according to one or more techniques of this disclosure.
Figure 8A:
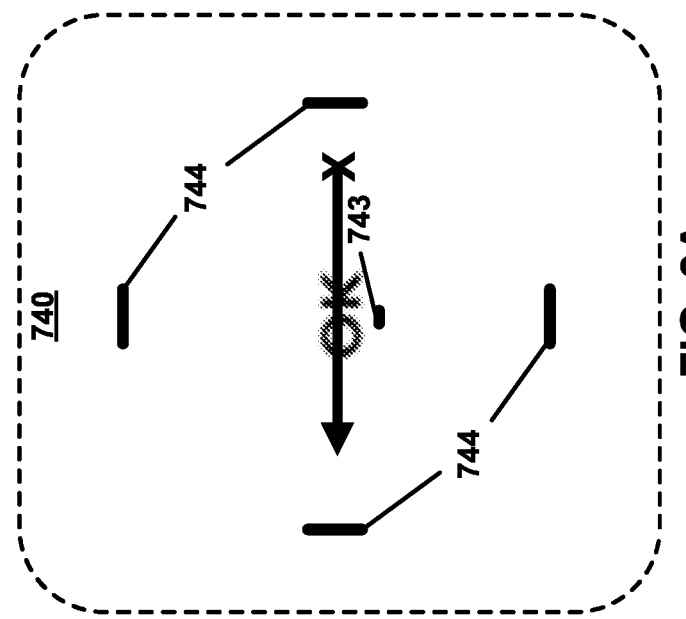

In some examples, the inputs illustrated in FIG. 8A and FIG. 8B may be referred to as a swipe or a slide gesture. In the example illustrated in FIG. 8A, the initial touch location is within the area enclosed by protrusions 744. As such, in some examples, the gesture illustrated in FIG. 8A may be referred to as an inside swipe gesture. In the example illustrated in FIG. 8B, the initial touch location is outside of the area enclosed by protrusions 744. As such, in some examples, the gesture illustrated in FIG. 8B may be referred to as an outside swipe gesture. As described in further detail below, based on whether an inside swipe gesture or an outside swipe gesture occurs, different functionality may occur. It should be noted that although FIG. 8A and FIG. 8B illustrate horizontal swipes moving to the left, inside and outside swipes may be defined for any direction of movement (e.g., vertical, diagonal, etc.). Further, in some examples, inside and outside distinctions of gestures may be defined for gestures including multi-point touch inputs (e.g., inside and outside pinch gestures may be defined). Further, in some examples, inside and outside distinctions of touch points may be defined for both the vertical and horizontal axis (e.g., corner touch points, etc.). In some examples, the gestures illustrated in FIG. 8A and FIG. 8B may more specifically be referred to as horizontal (inside or outside) swipes or as horizontal left (inside or outside) swipes. In this manner, computing device 200 and a companion device including user interface 700 are configured to support multi-level user activations or gestures. It should be noted that in some examples user interface 600 may be configured to support multi-level activations.

Figure 8D:
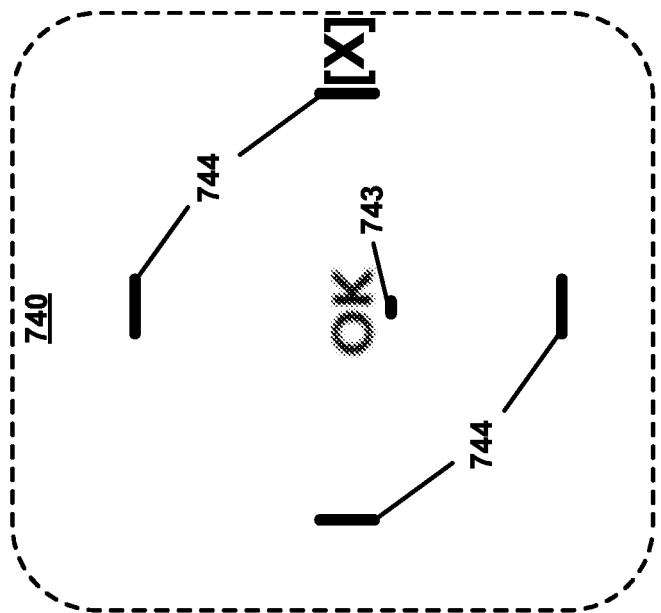
Figure 8C:
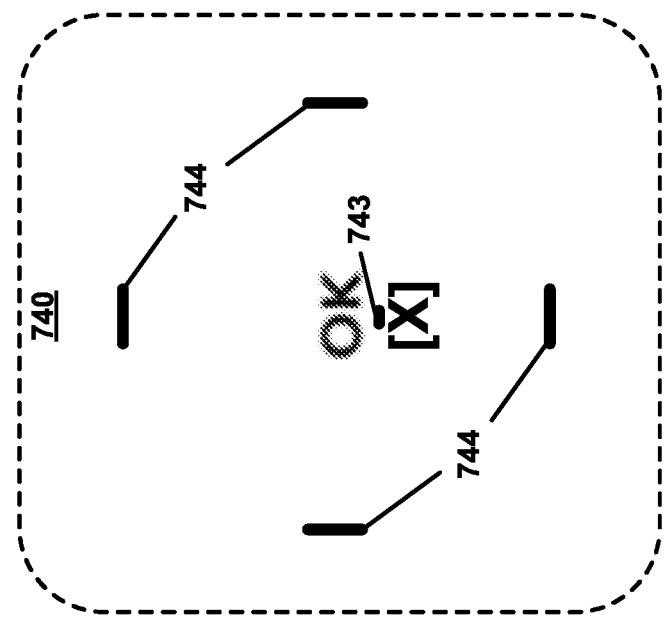

As described above, OK button 742 may be activated upon a user performing a click activation while activating touch interface 706 at the region corresponding to OK button 742. FIG. 8C illustrates an example of a user performing a click activation while activating touch interface 706 at the region corresponding to OK button 742. As described above, such an activation may provide functionality similar to select button 532. In one example, the activation illustrated in FIG. 8C may be referred to as an OK click activation. It should be noted that OK click activations may include multiple click activations (e.g., double-click activations). Further, a user causing switch 787 to be activated while activating navigational area 740 near one of the upper, lower, left, or right protrusion of protrusions 744 may provide functionality similar to navigational arrows 531. In one example, these activations may be referred to as directional click activations. FIG. 8D illustrates an example where a user performs a right directional click activation by activating navigational area 740 near the right most protrusion and causing switch 787 to be activated. In this manner, user interface 700 and navigational area 740 may be configured be enable directional navigation (e.g., directional arrow based navigation) and gesture based navigation.

Referring again to FIG. 7A, short-cut icon area 750 may be configured to facilitate functionality with respect to a particular application currently running on a computing device and/or a particular user currently operating a computing device. In the example illustrated in FIG. 7A, short-cut icon area 750 includes application specific icons 752. It should be noted that in the example illustrated in FIG. 7A, in contrast to dynamic button area 720, short-cut icon area 750 does not include protrusions. In this manner, short-cut icon area 750 may provide increased flexibility with respect to the types of icons that may be displayed. For example, short-cut icon area 750 may display one large icon, which upon activation causes an advertisement to be presented. As described above, in one example, a content selection application of running on a companion device may be configured to receive data from a computing device and parse the data in order to determine a context and/or a sub-context. A context may identify an application currently running on a computing device and a sub-context may identify a particular aspect of an application running on a computing device. Application specific icons 752 may be based on a context and/or a sub-context.

In the example illustrated in FIG. 7A, application specific icons 752 correspond to icons associated with a television service application. In the example illustrated in FIG. 7A, application specific icons 752 represent television channels that, upon activation, may cause a tuner of a computing device to tune to the particular television channel (or cause a computing device to access a particular media stream). It should be noted that in some examples, application specific icons 752 may be activated upon a user providing a tap activation and in some examples application specific icons 752 may be activated upon a user providing a click activation. In the case where application specific icons 752 represent television channels, television channels may correspond to recently viewed channels and/or a set of channels determined by information included in a user's profile. Further, in one example, television channels represented by application specific icons 752 may mirror channels displayed on a graphical user interface. For example, referring to FIG. 14A, channels AMC, FOX, NBC, CBS, BBC, Showtime, and HBO are displayed on the display 250 of a computing device 200 as part of a graphical user interface. In this case, application specific icons 752 may include icons representing AMC, FOX, NBC, CBS, BBC, Showtime, and HBO. In a similar manner, when a graphical user interface associated with an on demand content application is presented on a display, specific icons 752 may represent icons corresponding items of content. For example, application specific icons 752 may represent the movies illustrated in the example of FIG. 18B, when graphical user interface 1100 is presented on a display.

In this manner, user interface 700 is configured to dynamically present icons which may be activated by a user and receive user input, including multi-level activations. Based on received user inputs provided to a companion device, a computing device may cause changes to occur with respect to an item of content and/or graphical user interfaces presented on a display. It should be noted that although user interface 700 is described in the examples above as displaying icons, these examples should not be construed as limiting the functionality of user interface 700. In other examples user interface 700 may display motion based graphics, animations, video, and the like and may enable complex user interactions (e.g., so-called second screen applications). For example, user interface 700 may enable a user to play a game (e.g., a trivia game or a video game) displayed in short-cut icon area 750. Further, user interface 700 may display information associated with an item of content rendered on a display associated with a computing device (e.g., a plot synopsis of a movie).

As described above, navigational area 740 may be configured to receive user touch inputs including gestures and functionality associated with a computing device and/or an application may occur based on the received user touch inputs. Functionality associated with a computing device and/or an application may include functional provided in conjunction with a graphical user interface. FIGS. 9A-9D, FIG. 12, FIGS. 14A-14C, FIGS. 16A-16F, and FIGS. 18A-18B are conceptual diagrams illustrating examples of graphical user interfaces that may implement one or more techniques of this disclosure. As described in further detail below, navigational area 740 may be configured to receive user touch inputs including gestures, taps and click activations, and computing device 200 may cause functionality associated with the graphical user interfaces illustrated in FIGS. 9A-9D, FIG. 12, FIGS. 14A-14C, FIGS. 16A-16F, and FIGS. 18A-18B to occur, including transitioning from the respective graphical user interfaces. It should be noted that although the example graphical user interfaces illustrated in FIGS. 9A-9D, FIG. 12, FIGS. 14A-14C, FIGS. 16A-16F, and FIGS. 18A-18B are described with respect to user interface 700 and companion device 790, the graphical user interfaces may be generally applicable to other user interfaces and companion devices. FIGS. 19A-19E is a flowchart illustrating an example of enabling a user to select an item of content using the example graphical user interfaces illustrated in FIGS. 9A-9D, FIG. 12, FIGS. 14A-14C, FIGS. 16A-16F, and FIGS. 18A-18B.

FIGS. 9A-9D illustrate an example where a companion device may change an item of content presented on a display based on input received through a user interface. In some examples, the example graphical user interface illustrated in FIGS. 9A-9D may correspond to a television viewing application and, in some cases, the transition illustrated in FIGS. 9A-9D may generally be referred to as a channel change transition. FIG. 10 is a conceptual diagram further illustrating the transition illustrated in FIGS. 9A-9D and a corresponding example user input received by an example user interface. It should be noted that although the example transition illustrated in FIGS. 9A-9D is described with respect to user interface 700, in other examples, input received through other example users interfaces (e.g., user interface 500 and user interface 600) may cause the transition to occur.

Figure 9A:
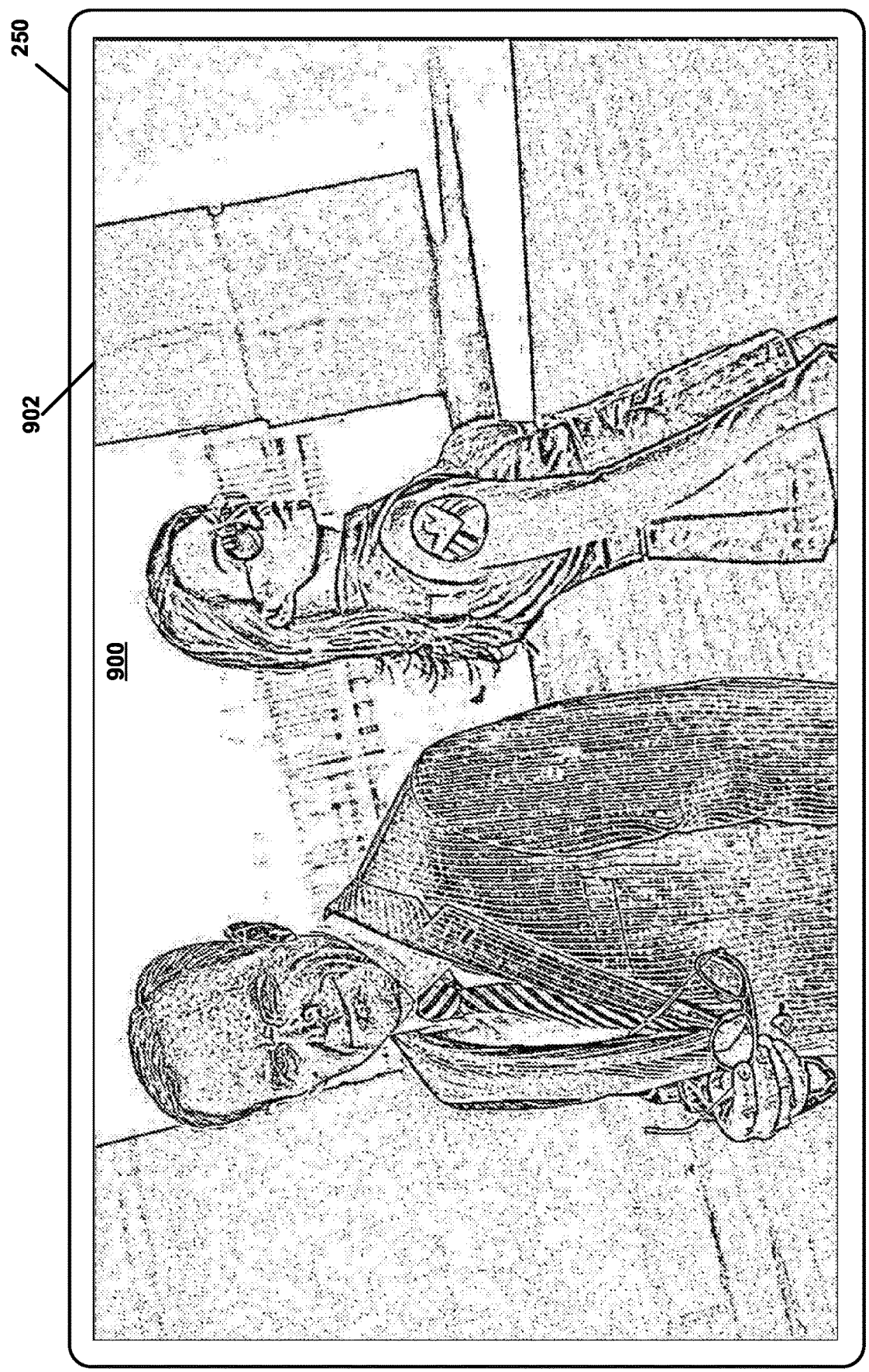
FIGS. 9A-9D are conceptual diagrams illustrating an example graphical user interface that may implement one or more techniques of this disclosure.
Figure 9B:
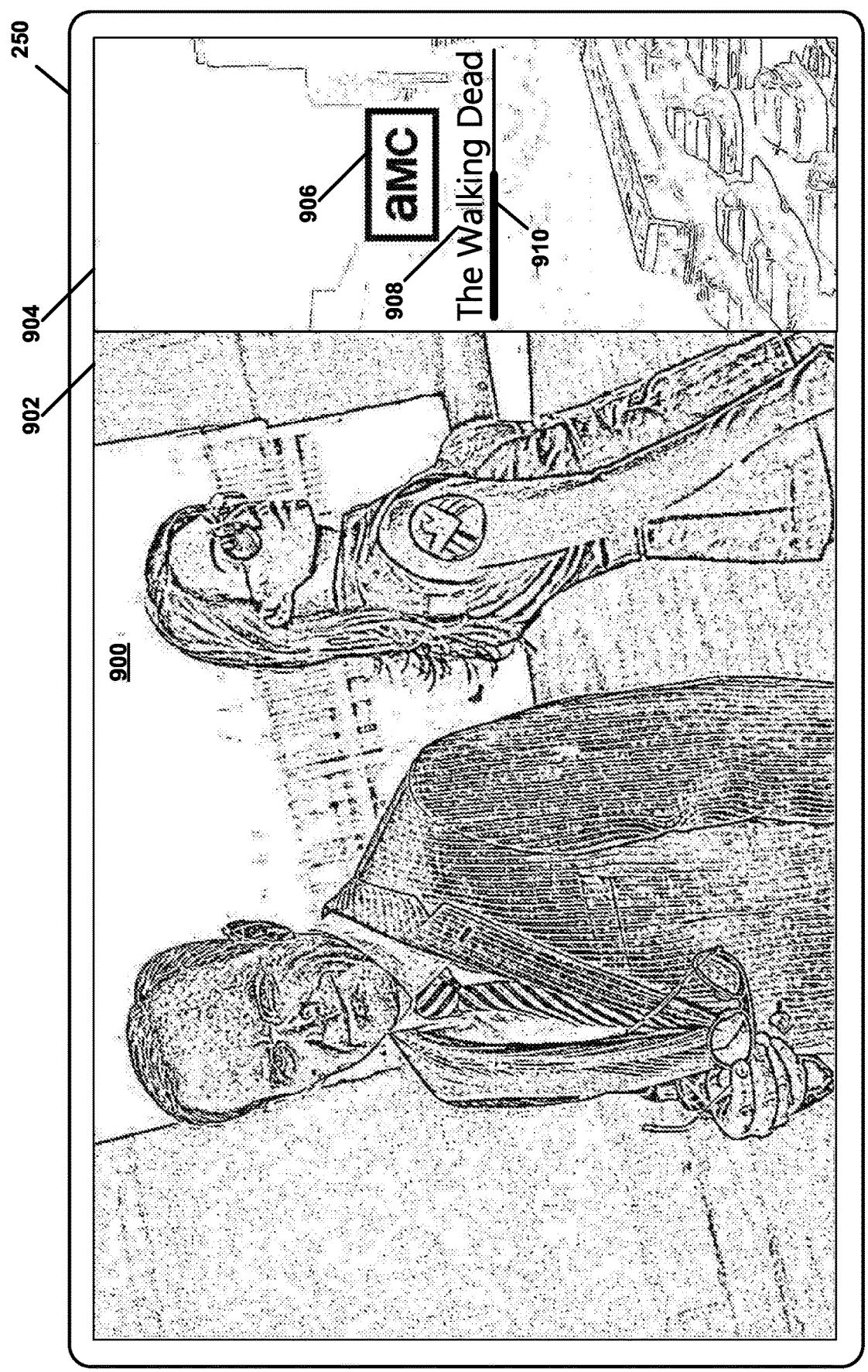
Figure 9C:
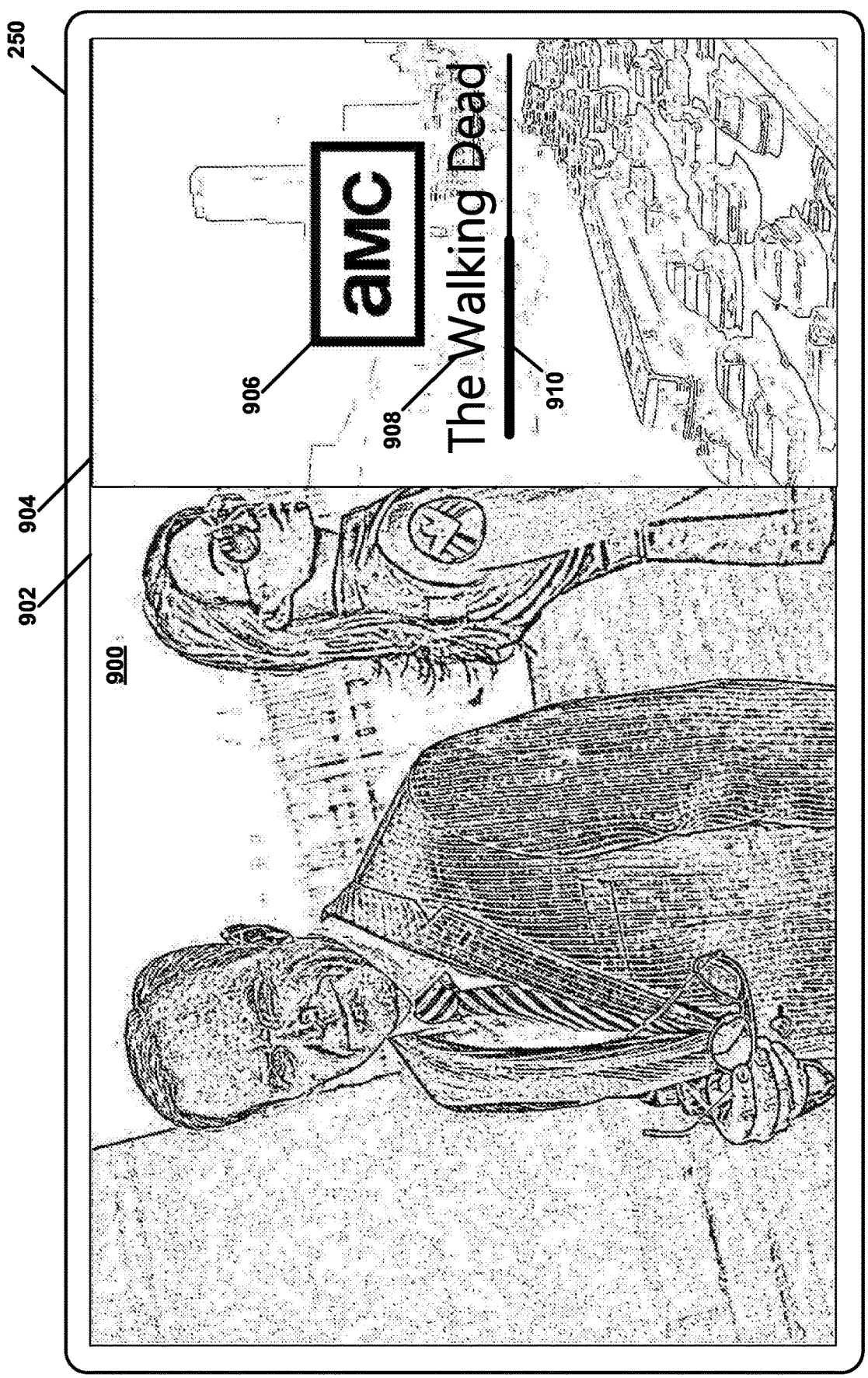
Figure 9D:
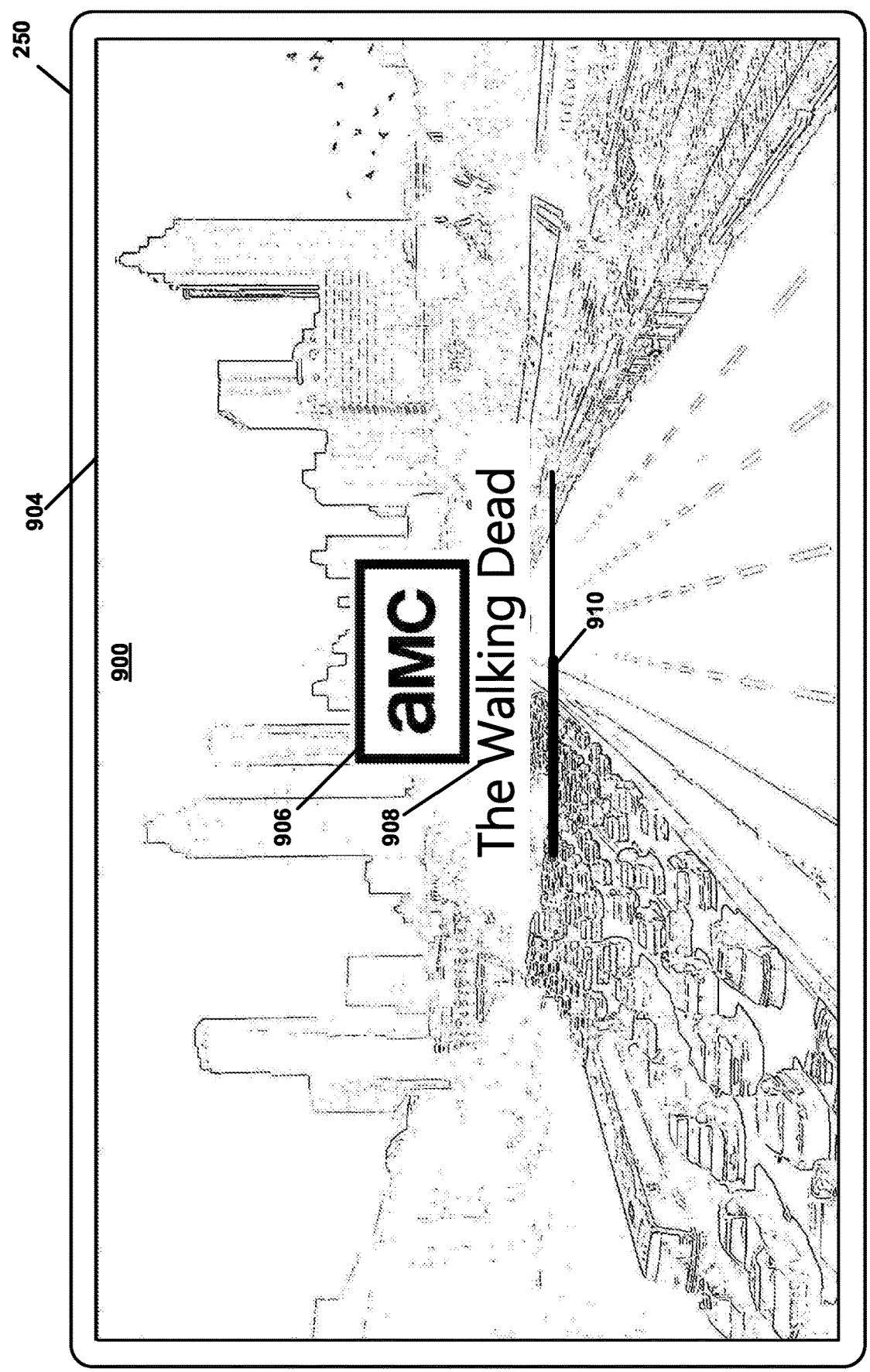

As illustrated in FIGS. 9A-9D graphical user interface 900 includes window 902, window 904, source identifier 906, item of content identifier 908, and progress bar 910. Window 902 includes a presentation area associated with a currently selected item of content (e.g., a television channel that a tuner of a computing device is currently tuned to). Window 904 includes a presentation area associated with a potential subsequently selected item of content (e.g., an adjacent television channel in a television channel listing). Referring to FIG. 9A, graphical user interface 900 displays a full screen video presentation for a currently selected item of content associated with window 902. Referring to FIG. 9D, graphical user interface 900 displays a full screen presentation for a subsequent selected item of content associated with window 904. FIGS. 9B and 9C illustrate a transition between graphical user interface 900 as illustrated in FIG. 9A and FIG. 9D.

As illustrated in FIG. 9B and FIG. 9C, graphical user interface 900 displays window 904 in such a manner that it appears to overlap window 902. As described below with respect to FIG. 10, the manner in which window 904 overlaps window 902 may be based on user input received through a user interface. With respect to the example where graphical user interface 900 corresponds to a television viewing application, when a user wishes to change a full screen video presentation from an item of content associated with window 902 to an item of content associated with window 904, a video presentation for an item of content associated with window 904 may not be immediately available. That is, for example, for an over-the-air or a cable television source there may be a delay with respect to a tuner (e.g., an ATSC or DVB tuner) acquiring a channel. Further, in the example where a television service includes a so-called streaming or an over-the-top (OTT) television service (e.g., HTTP Live Streaming), a delay may occur based on the time it takes for a computing device to establish a session with a host server and/or download media segment files. The example illustrated in FIGS. 9A-9D may illustrate an example where a video presentation for an item of content associated with window 904 is not immediately available. Further, the example illustrated in FIGS. 9A-9D may illustrate an example where a computing device tunes or attempts to access a stream upon a user completing a sufficient portion of a gesture.

Referring to the example illustrated in FIGS. 9B-9D window 904 displays an image associated with an item of content (i.e., an still image associated with The Walking Dead) or a video (e.g., a video of an event in progress) based on availability of video and/or computing resources and information that enables a user to identify an item of content associated with window. Source identifier 906 identifies a source associated with an item of content (e.g., a logo identifying a television network). An item of content identifier 908 includes text identifying an item of content. Progress bar 910 illustrates the progress of the presentation of an item of content (e.g., the current playback point of a television program). In one example, an image associated with an item of content may be referred to as an image plate and source identifier 906, item of content identifier 908, and progress bar 910 may be referred to as an information group. An image plate and an information group may collectively be referred to as graphics associated with an item of content.

As illustrated in FIG. 9B and FIG. 9C, window 904 is sized such that it spans the height of display 250 and each of source identifier 906, item of content identifier 908, and progress bar 910 are proportional in size to the area of window 904 on display 250. That is, each of source identifier 906, item of content identifier 908, and progress bar 910 increase in size as window 904 covers more of window 902. Further, as illustrated in FIG. 9D, each of source identifier 906, item of content identifier 908, and progress bar 910 increase to a maximum size and stop at the center of display whereas the image associated with the item of content may cover the full area of display 250. Such a transition may be visually appealing to a user of a computing device. As described in detail below, a graphical processing unit (e.g. graphics processing unit 230) may be configured to enable such transitions to occur based on user input received through a user interface. As further described in detail below, graphics associated with items of content may be cached based on the likelihood that a user will attempt to access a particular item of content at during a time period.

FIG. 10 illustrates an example where a user performs a horizontal inside swipe gesture, as described above with respect to FIG. 8A, in order to cause the transition illustrated in FIGS. 9A-9D to occur. In the example illustrated in FIG. 10, for each subsequent point in time, $Time_0$, $Time_1$, and $Time_2$, graphical user interface 900 as displayed on display 250 and a user gesture as received by navigational area 740 are illustrated. At $Time_0$, graphical user interface 900 displays a full-screen video presentation of the item of content associated with window 902 and a user initiates an inside swipe gesture by activating navigational area 740 within the area defined by protrusions 744. At $Time_1$ and $Time_2$, as the user slides a finger to the left on navigational area 740, window 904 displaying the image plate "slides" over window 902 and source identifier 906 increases in size. The movement of window 904 on display 250 may be synchronized with the movement of a user's finger on navigational area 740. That is, a relationship between the movement of a user's finger on navigational area 740 (i.e., touch event data) and position of window 904 and/or size of source identifier 906 is defined such that the window appears to move on display in conjunction with swipe gesture.

Referring again to FIG. 10, the gesture may be interpreted by a companion device and/or a computing device based on a starting point, transition distance, and a threshold. As described above, the starting point may be used to distinguish between an inside swipe gesture and an outside swipe gesture. The transition distance may correspond to a distance where motion of a user's finger causes a visual transition to occur. It should be noted that a transition distance may include a minimum distance required to initiate a transition Minimum distances may be used to distinguish gestures from inadvertent touch events. For example, a user's finger may be required to travel a distance of 15% of the width of navigational area 740 before window 904 appears on display 250. In the example illustrated in FIG. 10, the threshold may be used to determine whether, upon a user deactivating navigational area 740 (e.g., lifting a finger off of navigational area 740, i.e.,), graphical user interface 900 displays a full screen presentation of window 902 or a full screen presentation of window 904. That is, a user may cause a portion of window 904 to be displayed in order to identify and/or preview an item of content associated with window 904 (e.g., when video is available) and if a user does not wish to access the item of content associated with window 904, the user may lift the finger from navigational area 740 to cause the display to return to the full screen viewing mode of the currently selected item of content. As described below, the threshold may be based on equations defining window movement. In one example, window 904 may include a message indicating that the channel is currently at a commercial break. For example, computing device 200 may receive data or flags indicating that the channel is a commercial break. In some cases, causing a portion of window 904 to be displayed may be referred to as a peek view. In some examples, upon the user not exceeding the threshold and lifting a finger from navigational area 740, window 904 may rapidly move to the right (i.e., "snap back").

In some examples, upon the user exceeding the threshold and lifting a finger, window 904 may move to the left to cause graphical user interface 900 as illustrated in FIG. 9D to be displayed. In this case, in one example, graphical user interface 900 as illustrated in FIG. 9D will transition to a full screen video presentation (e.g., fade out from an image to a video presentation) once the video associated when the item of content is available (e.g., after tuning occurs or after a media segment is downloaded). It should be noted that in some examples, in order to conserve or optimize resources of a computing device, it may be desirable to initiate tuning based on the movement of a user's finger on navigational area 740. That is, in one example, resources of a computing device may be optimized by initiating tuning upon a user's finger passing or being within a predetermined distance of a threshold. Further, it should be noted that a threshold may be defined with respect to an absolute point on navigational area 740 (e.g., the center of navigation area 740), an absolute distance traveled by a user input (e.g., one centimeter from a starting point), a relative distance (e.g., 50% of the distance between a starting point and an edge of navigational area 740), and/or the speed of the motion of the user input. In one example, user interface 700 may be configured such that a user may initiate a channel change transition by activating navigational area 740 at any point within protrusions 744 and moving a finger a distance of approximately 10%-20% (e.g., 15%) of the width of navigational area 740 (i.e., the minimum distance). In this example, window 904 may be displayed based on the continued motion of the user's finger. Further, in this example the threshold may be a distance of approximately 35%-60% (e.g., 50%) of the width of navigational area 740.

A described above, a relationship between the movement of a user's finger on navigational area 740 and position of window 904 and/or size of source identifier 906 is defined. As further described above with respect to Table 1, a set of touch events may be interpreted as a motion event having a direction, a distance, and a speed. In one example, a companion device including interface 700 may send an indication to computing device 200 that a user has initiated a channel change transition (e.g., activated navigational area 740 at any point within protrusions 744 and moved a finger the minimum distance). The companion device may subsequently send touch event data to computing device 200. Computing device 200 and/or graphical processing unit 230 may be configured to move window 904 on display 250 and move and scale the size of an information group based on the received touch event data. In one example, the movement of window 904 on display 250 (e.g., how far window 904 moves to the left in the example of FIG. 10) may be based on the following equation:

$$\text{Window movement} = (a * \text{distance}_{ME}) \times (b * \text{speed}_{ME}),$$

where

Window movement corresponds to a distance on display (e.g., a number of pixels);

$\text{distance}_{ME}$ corresponds to a distance of a motion event;

$\text{speed}_{ME}$ corresponds to a speed of a motion event; and a and b are scaling factors.

In this manner, the movement of a window on display is relative to distance and speed of a swipe gesture. It should be noted that based on this equation, for a given swipe distance, the distance window 904 appears to move on display 250 is based on the speed of a swipe. That is, referring to FIG. 10, window 904 will move further to the left, if a use performs a relatively faster swipe. As described above, a threshold may be defined based on window movement. That is, for example, if a user provides an input that causes window 904 to move halfway across display 250, based on distance and speed of a swipe, a channel change transition may occur.

In some examples, computing device 200 and a companion device including user interface 700 may be configured such that a user may be able to set the sensitivity with respect to a channel change transition. That is, particular users may desire the ability to preview items of content and/or cause channel changes to occur more rapidly. In one example, computing device 200 may be configured such that a user may set a sensitivity setting to one of: high, medium, or low, where each setting provides a threshold that must be exceeded in order for a channel change transition to occur. In one example, each setting may be associated with respective values of scaling factors, a and b, described above (e.g., a high sensitivity provides the highest values of a and b). Further, in one example, a user may be able to explicitly set values associated with sensitivity of a channel change transition. In the example illustrated in FIG. 10, the motion of the user's finger to the left causes window 904 to appear at the right edge of display 250 and move to the left. In some examples, computing device 200 and a companion device including user interface 700 may be configured such that a user may be able to set how the movement of window 904 corresponds to the motion of the user's finger. For example, a user may wish to invert the movement of window 904 with respect to the motion of the user's finger. That is, the movement of the user's finger to the left may cause window 904 to appear at the left edge of display 250 and move to the right.

As described above, the example illustrated in FIGS. 9A-9D illustrates an example where video corresponding to an item of content associated with window 904 is not immediately available. In some examples, delays in accessing video content may be mitigated using so-called pre-tuning techniques. That is, for example, a television or set-top box accessing an over-the-air or a cable television source may include multiple tuners, where a first tuner is tuned to a current channel and additional tuners are tuned to channels a user is likely to tune to (e.g., adjacent channels in a channel listing). Further, in the example where a television service includes a streaming or OTT television service, a computing device may access multiple media streams simultaneously (e.g., streams associated with different television networks). It should be noted however that in some cases the availability of resources of a computing device may limit the effectiveness of pre-tuning techniques. For example, a computing device may have a limited number of available tuners and/or processing resources. Further, in the case of an OTT television service, the amount of available bandwidth may be limited such that additional media streams cannot be accessed without adversely impacting the quality of a primary media stream. Further, limitations with respect to the availability of computing device resources may become apparent in the case where a user wishes to change content in a rapid manner (i.e., rapid channel "surfing").

As described above with respect to FIG. 2, buffering associated with one media segment may propagate throughout the presentation of the event. Although buffering may be acceptable when an event is presented to a user, when a segment is associated with a pre-tuned media stream, buffering may cause a pre-tuned media stream to become out of sync with an event. In one example, computing device 200 may be configured to simulate playback of an item of content that a user is likely to access in order to maintain synchronization with an event. In some examples, this type of synchronization may be referred to as system time synchronization. As described above, an index file may provide timing information associated with each media segment included in an event. In one example, computing device 200 may retrieve an index file for an item of content that a user is likely to access and simulate playback of media segments listed in the index file. That is, computing device 200 may retrieve an index file and determine which media segment should be accessed upon a channel change based on a clock and an estimated bit rate. That is, instead of downloading media segments associated with an event and potentially introducing delay, computing device 200 may retrieve a more current, with respect to system time, media segment upon a user initiating, partially completing (e.g., being within a threshold), and/or completing a channel change transition by estimating which media segment should be played back at a particular system time. In one example, upon a user initiating, partially completing and/or completing a channel change transition, computing device 200 may download a media segment file corresponding to the media segment that should be played at the current system time. In one example, upon a user initiating, partially completing and/or completing a channel change transition computing device 200 may download a subsequent media segment file (i.e., the next media segment after the media segment that should be played at the current system time).

In one example, an item of content a user is likely to access may include adjacent television channels in a television channel listing. For example, if a currently tuned channel is channel number 100, computing device 200 may be configured to retrieve index files for channels 98, 99, 101, and 102 and simulate playback for one or more of these channels. Further, as described above, a user profile may include user behavior information and/or information regarding whether a user is left hand dominant or right hand dominant Behavior information may include information regarding how a user has previously caused channel changes to occur. For example, computing device 200 may determine that a particular user usually swipes to the left. In this case, channels associated with left swipes may be higher numbered channels and computing device 200 may prioritize adjacent higher numbered channels over adjacent lower numbered channels. For example, instead of retrieving index files for channels 98, 99, 101, and 102, computing device 200 may retrieve index files for channels 101, 102, 103, and 104 based on the determined user behavior. In a similar manner, higher numbered channels or lower numbered channels may be prioritized based on whether a user is left hand dominant or right hand dominant. For example, left hand dominant users may be more likely to perform swipes to the left and right hand dominant users may be more likely to perform swipes to the right. As described in further detail below, images and graphics associated with an item of content may be prioritized based on information included in a user profile. It should be noted that although the example illustrated in FIGS. 9A-9B is described with respect to adjacent channels in a listing, the techniques described with respect to FIGS. 9A-9D may be generally applicable to any type of ordered sets of items of content (e.g., switching from movies within a set of movies ordered alphabetically, etc.).

Figure 11:
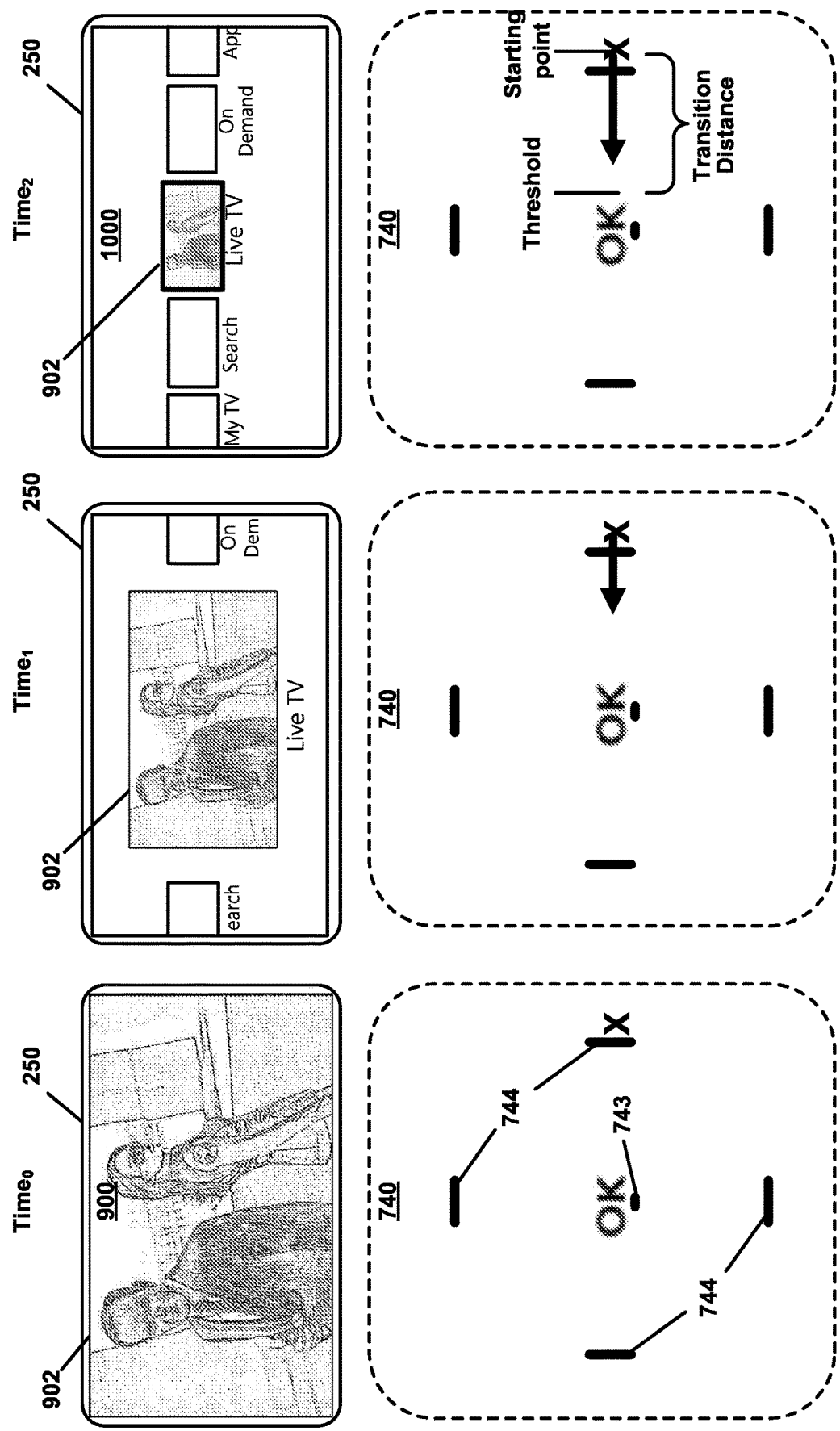
FIG. 11 is a conceptual diagram illustrating an example of a transition on a display device in response to user input that may be received by an example user interface according to one or more techniques of this disclosure.
Figure 18A:
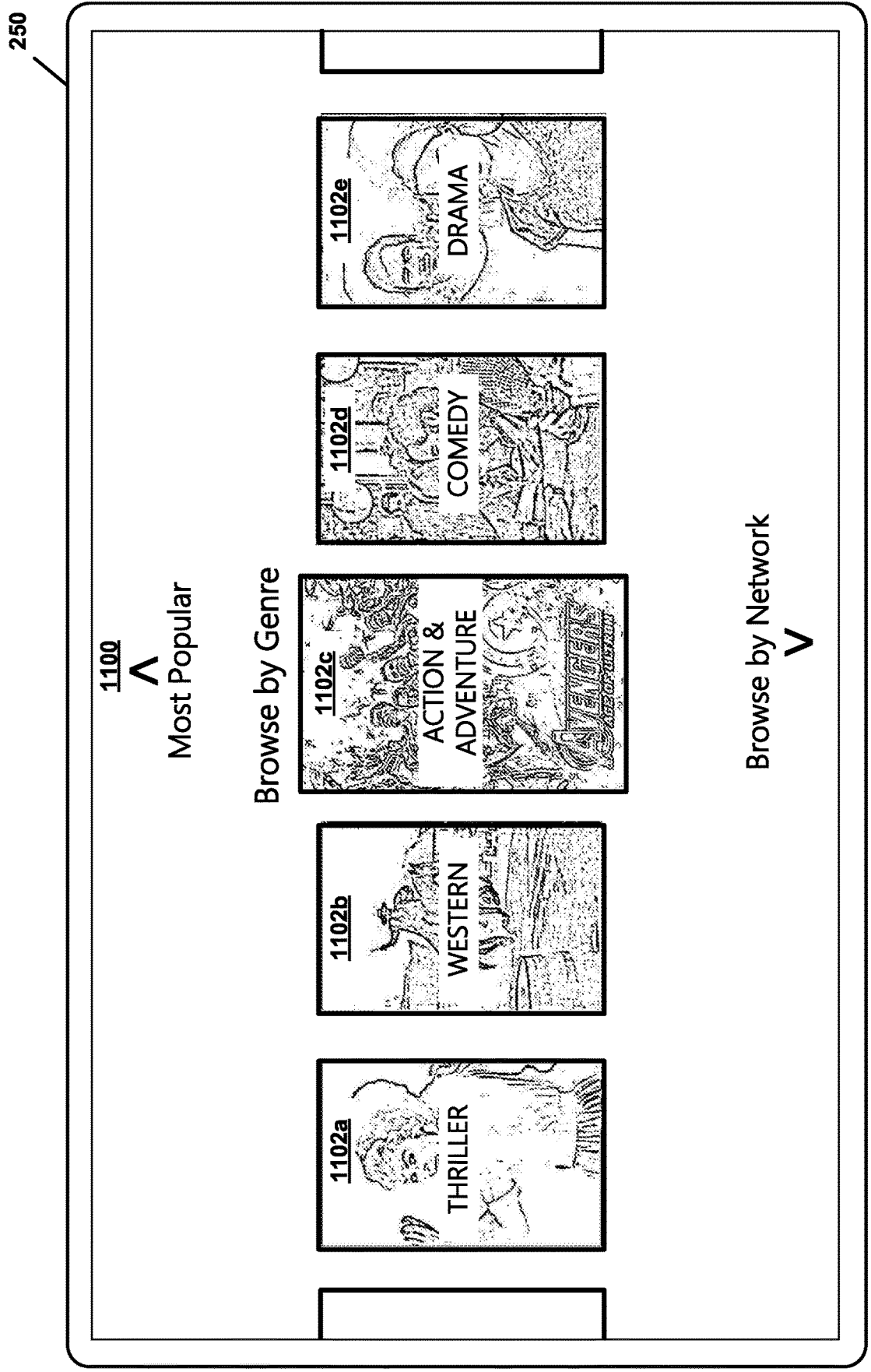
FIGS. 18A-18B are conceptual diagrams illustrating an example graphical user interface that may implement one or more techniques of this disclosure.

Referring again to FIG. 9A, in one example, in addition to providing an inside swipe gesture when window 902 is displayed in a full screen viewing mode on display 250, a user may provide other gestures that cause other functionality to occur. FIG. 11 illustrates an example where a user performs an outside swipe gesture, as described above with respect to FIG. 8B, when graphical user interface 900 as illustrated in FIG. 9A is presented on display 250. In the example illustrated in FIG. 11, upon a user completing an outside swipe gesture, graphical user interface 1100 as illustrated in FIG. 18A is presented on display 250. It should be noted that graphical user interface 900 and graphical user interface 1100 are associated with distinct types of media services and represent different applications, sources, and/or portals. That is, graphical user interface 900 may correspond to a user accessing items of content through a television service (e.g., an OTT television service) and graphical user interface 1100 may correspond to a user accessing item of content through an on demand service. Thus, computing device 200 may be configured to switch from one media service application to another media service application (or other type of application, e.g., teleconference application), upon a user performing an outside swipe gesture. In this manner, an outside swipe gesture may correspond to application switching and an inside swipe gesture may correspond to switching of selected items of content within an application (e.g., channel changing). As such, computing device 200 may be configured to enable a user to perform multi-level swipe gestures.

FIG. 11 illustrates an example transition from one application to another application based on a user performing an outside swipe gesture. In the example illustrated in FIG. 11, for each subsequent point in time, $Time_0$, $Time_1$, and $Time_2$, graphical user interface 900 and/or graphical user interface 1000 as displayed on display 250 and a user gesture as received by navigational area 740 are illustrated. At $Time_0$, graphical user interface 900 displays a full-screen video presentation of the item of content associated with window 902 and a user initiates an outside swipe gesture by activating navigational area 740 outside of the area defined by protrusions 744. At $Time_1$ and $Time_2$, as the user slides a finger to the left on navigational area 740, display 250 appears to zoom out about the center of window 902, such that window 902 is displayed as a window in graphical user interface 1000 and thereby reveling additional media service applications. In a manner similar to that described above with respect to FIG. 10, the zooming out of graphical user interface 900 to reveal graphical user interface 1000 may be synchronized with the movement of a user's finger on navigational area 740. In one example, the size of window 902 on display 250 (e.g., the zoom level) may be based on the following equation:

$$\text{Zoom level} = 100 - ((c * \text{distance}_{ME}) \times (d * \text{speed}_{ME})),$$

where
Zoom level corresponds to percentage with a maximum value of 100% corresponding to a full screen presentation of window 902 and a minimum value (e.g., 20-35%) corresponding to a full screen presentation of graphical user interface 1000;
$\text{distance}_{ME}$ corresponds to a distance of a motion event;
$\text{speed}_{ME}$ corresponds to a speed of a motion event speed; and
c and d are scaling factors.

Further, in a manner similar to that described above with respect to FIG. 10, graphical user interface 1100 may be presented on display 250 based on whether a gesture exceeds a threshold. That is, upon the user not exceeding the threshold and lifting a finger from navigational area 740, graphical user interface 900 may be displayed on display 250 (i.e., a fast zoom-in may occur) and upon the user exceeding the threshold and lifting a finger from navigational area 740, graphical user interface 1100 may be displayed on display 250. Further, in a manner similar to initiating tuning based on the movement of a user's finger on navigational area 740, described above, in order to conserve or optimize resources of a computing device the loading of an application may be based on the movement of a user's finger on navigational area 740. That is, in one example, computing device resources may be optimized by initiating the loading of an application upon a user exceeding a threshold.

Figure 12:
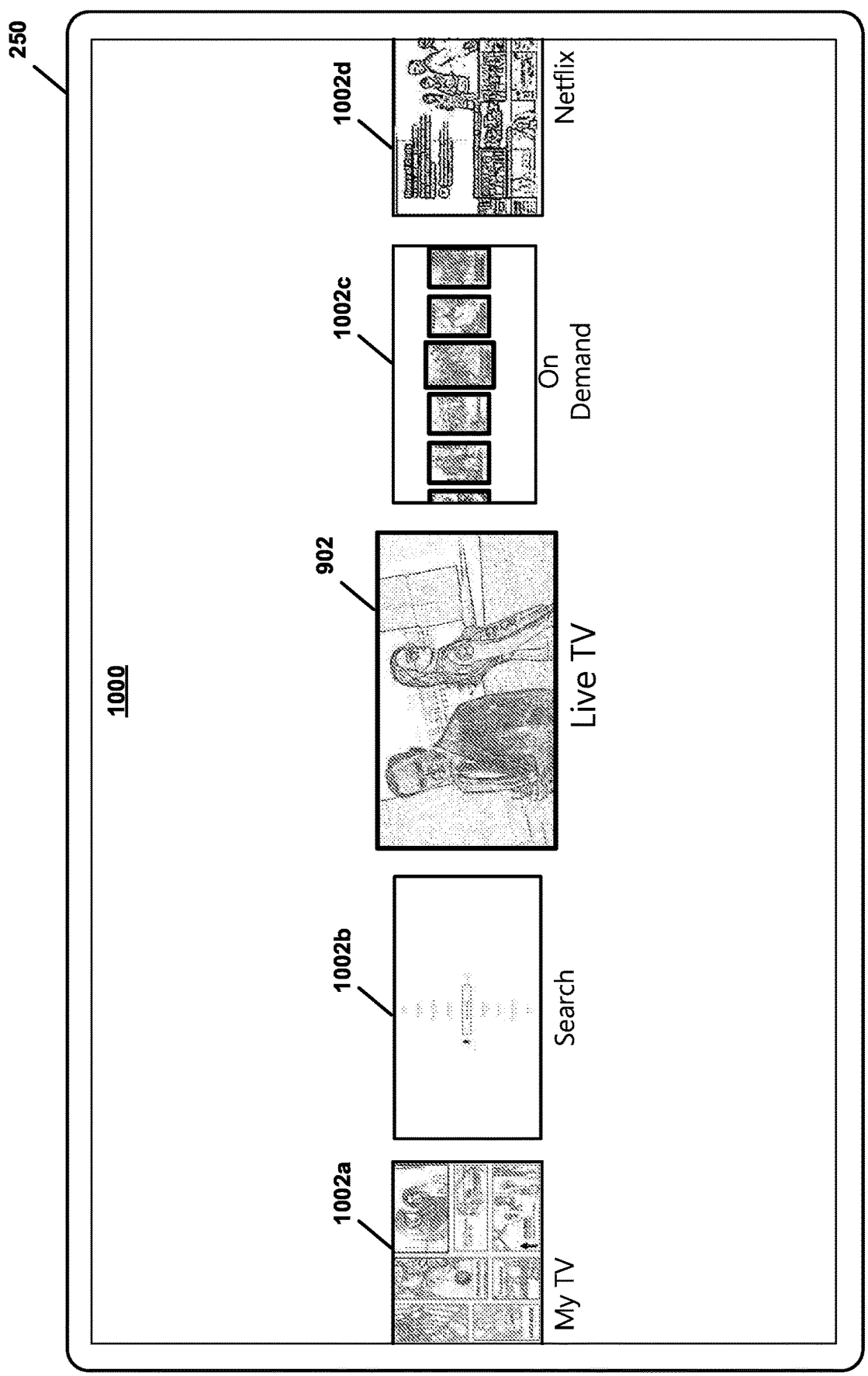
FIG. 12 is a conceptual diagram illustrating an example graphical user interface that may implement one or more techniques of this disclosure.
Figure 18B:
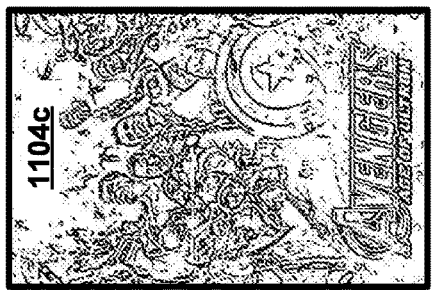

FIG. 12 illustrates graphical user interface 1000 in detail. As illustrated in FIG. 12, in addition to including window 902, graphical user interface 1000 includes windows 1002a-1002d, where each of windows 1002a-1002d may correspond to a respective media service application, other type of application, or portal. Each of windows 1002a-1002d includes an image or video associated with an application that enables a user to identify an application or portal corresponding to each window. In the example illustrated in FIG. 12, window 1002a corresponds to a personalized media service portal, window 1002b corresponds to a search portal, window 1002c corresponds to an on demand portal, and window 1002d corresponds to a media streaming service application (e.g., Netflix). It should be noted that in some examples, additional applications or portals may be available to a user. An example of a personalized media service portal is described in commonly assigned, currently pending U.S. patent application Ser. No. 14/465,043 filed Aug. 21, 2014, which is incorporated by reference in its entirety. An example of an on demand portal is illustrated in FIGS. 18A-18B. As described in further detail below, an application and/or a background image associated with an application may be loaded in a cache to enable a smooth transition (e.g., reduce potential user perceived lag) from graphical user interface 900 to graphical user interface 1000. For example, when a full screen video presentation associated with a television viewing application is displayed, processes associated with a media streaming application may occur in the background, such that the media streaming application remains in a state that reduces loading time, upon a user switching to the application.

Figure 13:
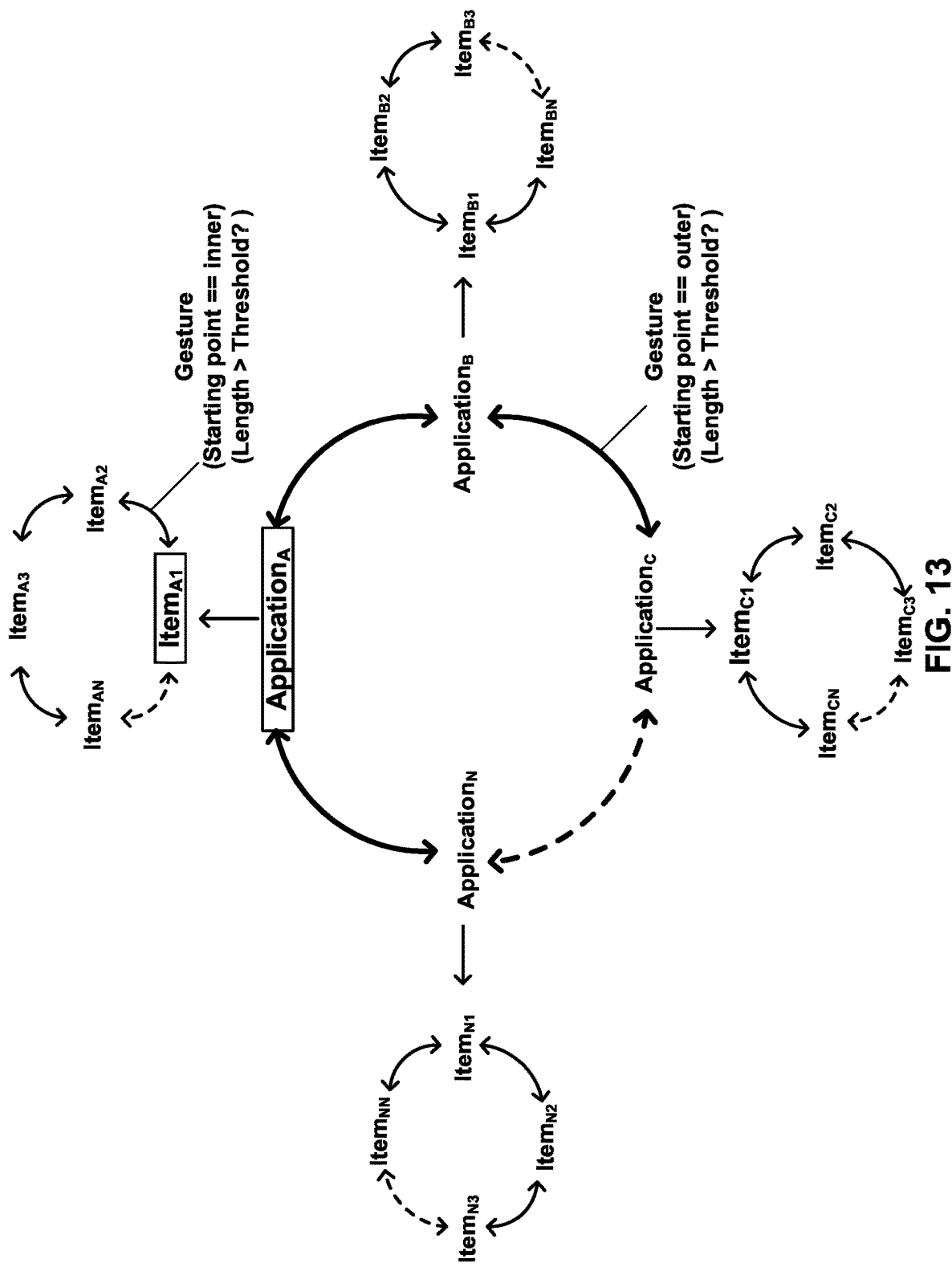
FIG. 13 is a conceptual diagram illustrating an example of multi-level gestures according to one or more techniques of this disclosure.

FIG. 13 is a conceptual diagram that generally illustrates inside/outside multi-level gestures. In the example illustrated in FIG. 13, a gesture is distinguish based on whether the starting point (e.g., the coordinates of an action down event) is within or outside of the area defined by protrusions 744. In the example illustrated in FIG. 13, if the starting point is outside of the area, the gesture corresponds to application switching, and if the gesture is inside of the area, the gesture corresponds to item of content switching of items associated with a selected application, where a switch may occurs upon a gesture exceeding a threshold. It should be noted that in other examples, other types of multi-level activations may be supported. For example, multi-level vertical swipes, diagonal swipes, inside/outside pinches, and the like may be supported. Further, as described in further detail below multi-level gestures may be enabled or disabled based on whether a particular graphical user interface associated with an application is displayed. That is, for example, in the case of a television service application, multi-level gestures may be enabled when a full screen video presentation is displayed and may be disabled when a programming guide or other graphical user interface is displayed. In this manner, a user may be able to navigate a programming guide or another graphic user interface without inadvertently switching applications. Further, in the case of an on demand content application, multi-level gestures may be disabled when a full screen video presentation is displayed and may be enabled when a graphical user interface is displayed. In this manner, a user may be able to view a full screen on demand video presentation interface without inadvertently switching applications.

Figure 14A:
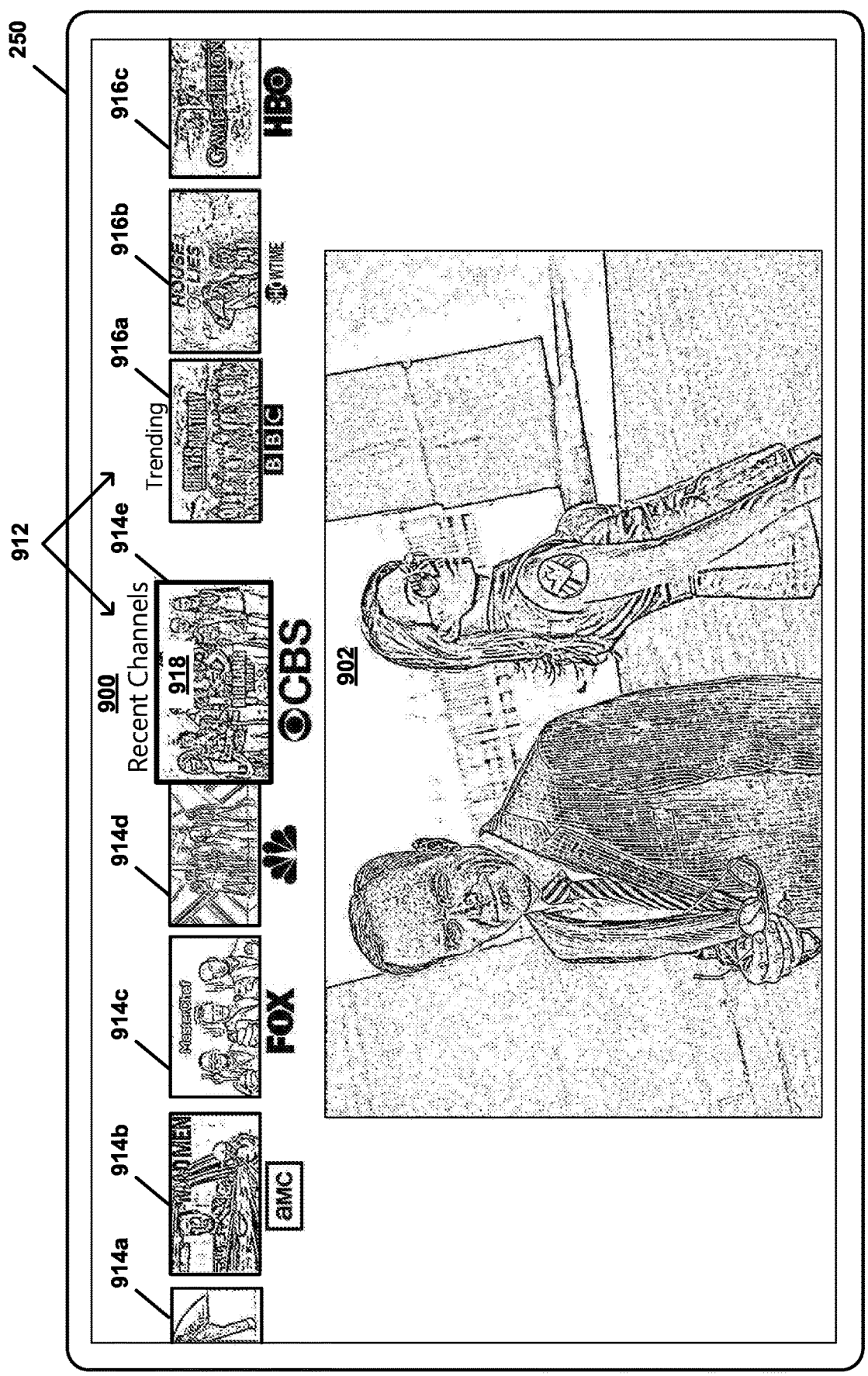
Figure 14B:
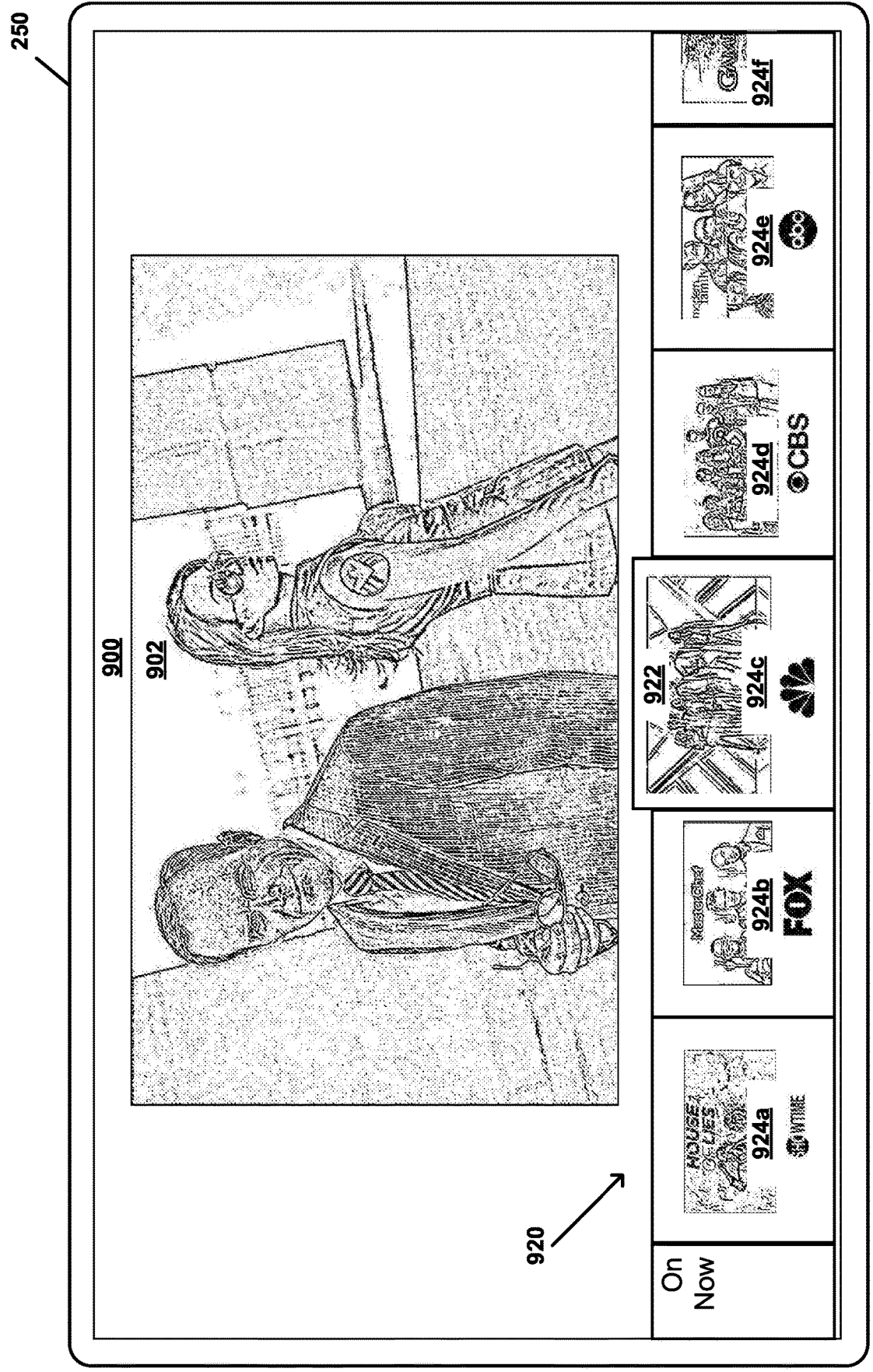
Figure 14C:
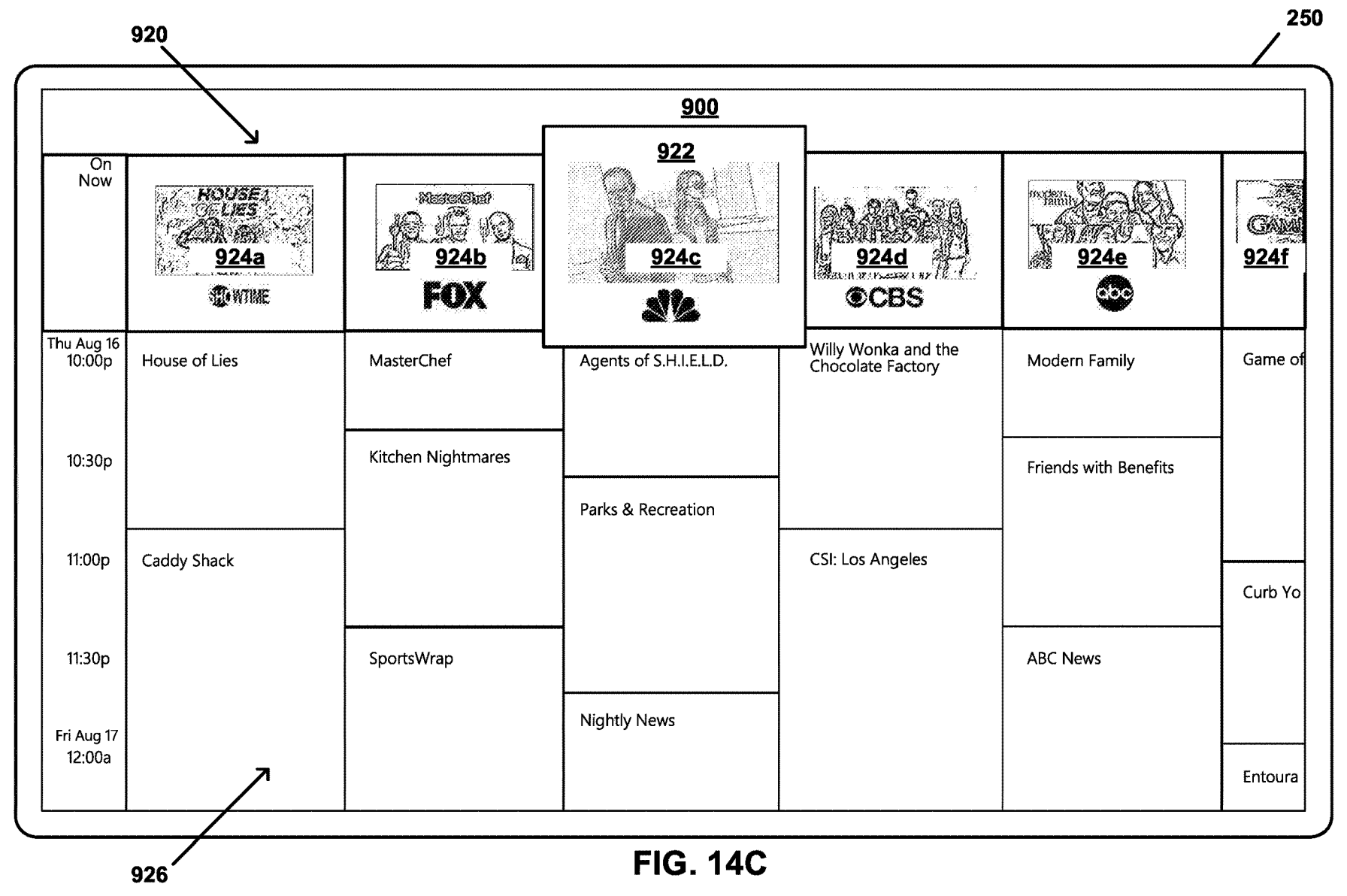
Figure 15:
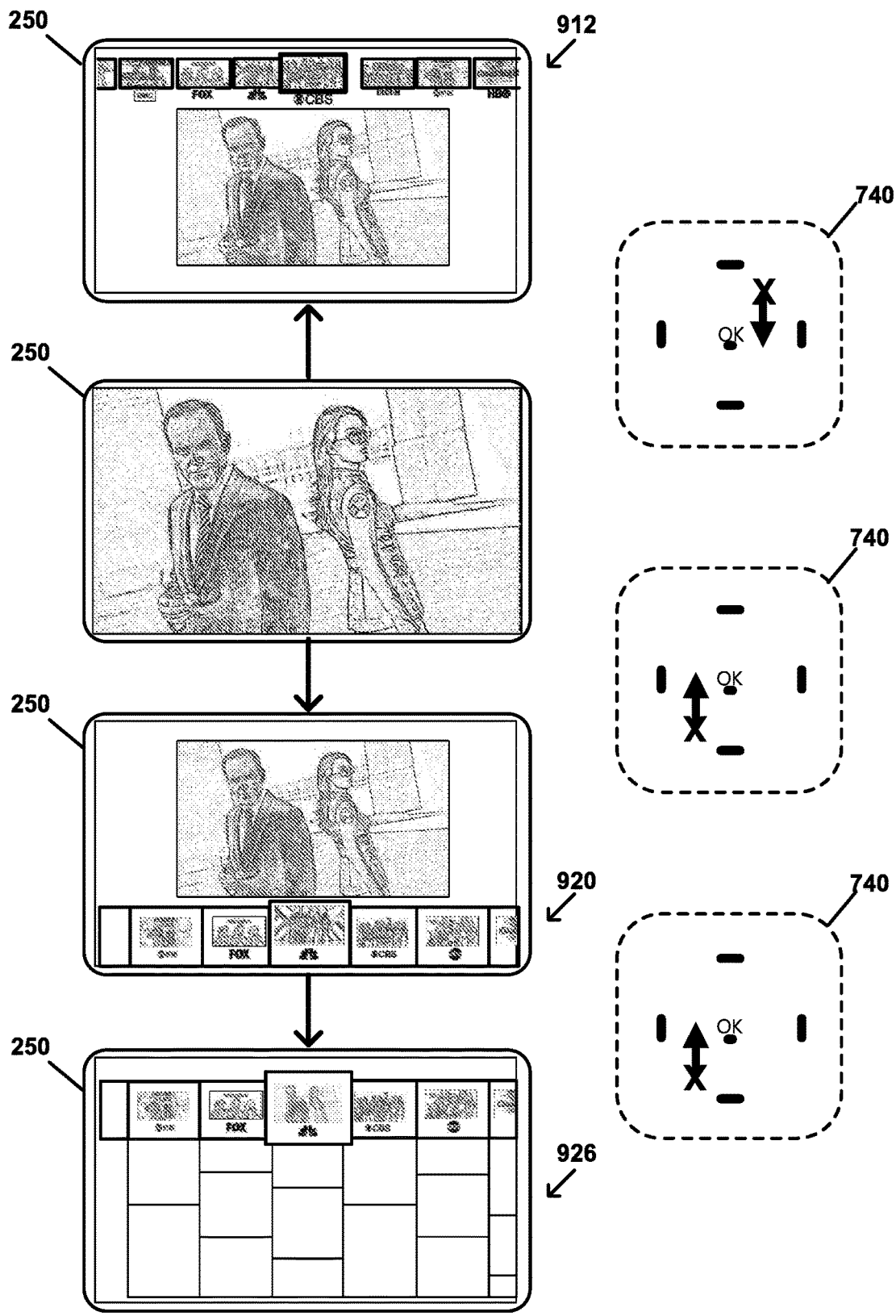
FIG. 15 is a conceptual diagram illustrating an example of transitions on a display device in response to user input that may be received by an example user interface according to one or more techniques of this disclosure.

In one example, in addition to enabling a user to perform horizontal inside swipe gestures and horizontal outside swipe gestures when window 902 is displayed in a full screen viewing mode on display 250 to cause functionality to occur, computing device 200 may be configured to enable a user to perform other activations, including providing additional gestures to touch interface 706, to cause additional functionality to occur. In one example, computing device 200 may be configured to enable a user may cause guides to be displayed by performing one or more additional types of gestures. FIGS. 14A-14C are conceptual diagrams illustrating examples where graphical user interface 900 displays one or more guides based on particular user activations. FIG. 15 is a conceptual diagram further illustrating the guides illustrated in FIGS. 14A-14C and corresponding example inputs received by an example user interface. As illustrated in FIGS. 14A-14C, graphical user interface 900 includes window 902, described above, dynamic guide 912, on now guide 920, and grid guide 926. Each of dynamic guide 912, on now guide 920, and grid guide 926 include tiles. Tiles may be similar to windows described above and may include visual indicators (e.g., video or an image) and textual information associated with an item of content that may enable a user to quickly identify an item of content and/or preview an item of content. Further, tiles may be associated with data associated with an item content (e.g., a tile may be associated with a crew member in a movie or a genre of a movie). As described in detail below, computing device 200 may be configured to enable a user to cause a function associated with a tile to occur by causing a title to become active (e.g., causing tile to be selected) and performing a particular activation. Further, it should be noted that in some examples, short-cut icon area 750, described above, may include application specific icons corresponding to tiles displayed on display 250 and a user may cause a function associated with a tile to occur by activating a corresponding icon displayed on short-cut icon area 750.

As illustrated in FIG. 15, when an item of content associated with window 902 is displayed in a full screen viewing mode, a user may perform a downward swiping gesture to cause dynamic guide 912 to be displayed. It should be noted that in the example illustrated in FIG. 15 the starting point of the downward swiping gesture is illustrated as inside of the upper protrusion on navigational area 740, in other examples, downward swipes having other starting points may cause dynamic guide 912 to be presented. In one example, a downward swipe initiated anywhere on navigational area 740 having a minimum distance may cause dynamic guide 912 to be displayed. In one example, in a manner similar to that described above with respect to FIGS. 9B-9C, the display of dynamic guide 912 may be based on a threshold. That is, for example, dynamic guide 912 may be partially displayed and may either snap back or be displayed as illustrated in FIG. 14A based on whether the distance traveled by a user's finger exceeds a threshold. In one example, a threshold may be a distance of approximately 15-20% of the length of navigational area 740. In the example illustrated in FIG. 14A, the size of window 902 is reduced compared to the size of window 902 as displayed in FIG. 9A and dynamic guide 912 is displayed in a non-overlapping manner with respect to window 902. It should be noted that in other examples, dynamic guide 912 may be displayed as overlapping a full screen presentation of window 902.

As illustrated in FIG. 14A, dynamic guide 912 includes tiles 914a-914e and tiles 916a-916c. Further, in the example of FIG. 14A, tile 914e is illustrated as an active tile 918. Tiles 914a-914e are associated with items of content that a user has recently accessed (e.g., recent previously tuned channels). It should be noted that recently accessed items of content may be associated with one or more distinct services (e.g., various types of media service). In one example, tiles 914a-914e may be chronologically ordered from right to left, (e.g., the item of content associated with tile 914e is the most recently accessed item of content, the item of content associated with tile 914d is the second most recently accessed item of content, and so on). In the case where each of the items of content associated with tiles 914a-914e include recently accessed television channels, a minimum channel access time (e.g., 5 seconds) may be used in order to add a channel to the group of recent channels. In one example, dynamic guide 912 may be configured to display a maximum number of tiles corresponding to items of content recently accessed by a user. For example, dynamic guide 912 may be configured to display up to five tiles corresponding to items of content previously accessed by a user. It should be noted that in some cases, a user may have recently accessed fewer items of content than the maximum number of tiles corresponding to recently accessed items of content that may be displayed. For example, recently accessed items of content may be defined according to a viewing session (e.g., recently accessed items of content may be reset on power up/down events). In this case, dynamic guide 912 may be configured to display additional tiles associated with trending items of content.

In the example illustrated in FIG. 14A, tiles 916a-916c are associated with trending items of content. In one example, trending items of content may include items of content currently available to a user that are popular with one or more users of a media service, a social network, a search service, or the like. For example, each of the respective items of content associated with tiles 916a-916d may be associated with a ranking value comprised of one or more of: the number of users currently accessing the item of content through a media service, the number of social media comments (e.g., tweets, posts, etc.) referencing the item of content within a past time interval, and the number of search queries related to the item of content within a past time interval. In one example, the ranking value may be referred to as a buzz value. An example of a buzz value is described in commonly assigned, currently pending U.S. patent application Ser. No. 14/260,677 filed Apr. 24, 2014, which is incorporated by reference in its entirety. Further, it should be noted that items of content associated with tiles 916a-916d may include items of content available on an on demand basis.

In the example illustrated in FIG. 14A based on the availability of tuning resources (e.g., number of tuners and/or number of media streams that can be simultaneously accessed), tiles 914a-914e and tiles 916a-916c may include an image plate associated with an item of content or a video presentation associated with an item content. In one example, active tile 918 may include a video presentation and the other tiles may include an image plate. In one example, a user may cause the active tile 918 to change by performing horizontal swipe gestures. In one example, inside/outside multi-level horizontal swipe gestures may be enabled when dynamic guide 912 is displayed. In this case, an inside horizontal swipe gesture may correspond to changing active tile 918 and an outside horizontal swipe gesture may correspond to application switching, as described above. In another example, inside/outside multi-level horizontal swipe gestures may be disabled when dynamic guide 912 is displayed. In this case, both inside horizontal swipe gestures and outside horizontal swipe gestures may correspond to changing active tile 918.

As described above, in the example where user interface 700 is implemented using computing device 790, in addition to a user providing input by performing gestures using navigational area 740, a user may perform a single click or a multiple click activation by causing switch 787 be activated. In one example, computing device 200 may be configured such that a user performing directional click activations causes a tile to become the active tile 918. For example, referring to FIG. 14A, upon a user performing three subsequent left click activations, tile 914b may become the active tile 918. Further, in one example, computing device 200 may be configured such that upon a user performing an OK single click activation, an item of content associated with active tile 918 may become associated with window 902. That is, a video presentation associated with an item of content associated with active tile 918 may become displayed in window 902. In one example, window 902 may remain the size illustrated in FIG. 14A, upon an OK single click activation. In another example, window 902 may be presented in a full screen viewing mode, as illustrated in FIG. 9A, upon an OK single click activation. In this manner, in the case of a television service, an OK single click activation, when dynamic guide 912 is displayed may correspond to a channel change function. Further, it should be noted that the item of content associated with window 902 prior to the OK single click activation may be added to a list recently accessed items of content and presented as a tile in dynamic guide 912.

In one example, in addition to an OK single click activation when dynamic guide 912 is displayed causing an item of content associated with active tile 918 to become associated with window 902, computing device 200 may be configured such that an OK double-click activation may cause a graphical user interface providing more information for an item of content associated with active tile 918 to be displayed. An example of a graphical user interface providing more information for an item of content is illustrated in FIGS. 16A-16F and in some examples may be referred to as a media card graphical user interface. It should be noted that in one example, an OK double-click activation may cause an item of content associated with active tile 918 to become associated with window 902 and an OK single click activation may cause a media card to be displayed. In one example, a user may be able to change the respective functionality associated with an OK single click activation and an OK double-click activation (e.g., by changing a setting using a menu graphical user interface). Further, it should be noted that in some examples in addition to, or as an alternative to click activations, taps on navigation area 740, including, for example, taps of OK button 742 may cause functions associated with active tile 918 to occur. In this manner, graphical user interface 900 as illustrated in FIG. 14A and user interface 700 may enable a user to select an item of content. In one example, when graphical user interface 900 as displayed in FIG. 14A is presented a user may cause graphical user interface 900 as displayed in FIG. 9A to be presented by performing a subsequent downward swipe, an upward swipe and/or another activation corresponding to an exit function (e.g., activating a corresponding virtual button).

Referring again to the example illustrated in FIG. 15, when an item of content associated with window 902 is displayed in a full screen viewing mode, a user may perform an upward swiping motion to cause on now guide 920 to be displayed. As further illustrated in FIG. 15, a subsequent upward swiping motion when on now guide 920 is displayed may cause grid guide 926 to be displayed. Each of on now guide 920 and grid guide 926 may correspond to items of content corresponding to events. That is, availability of items of content associated with on now guide 920 and grid guide 926 may be based on a time and date (e.g., items of content may correspond to an over-the-air broadcast or the like). It should be noted that in one example, a single upward swipe exceeding a threshold may cause grid guide 926 to be displayed. In one example, an upward swipe having a distance of approximately 15-20% of the length of navigational area 740 may cause on now guide 920 to be displayed and an upward swipe having a distance of approximately 50% of the length of navigational area 740 may cause on grid guide 926 to be displayed. It should be noted that in a manner similar to that described above with respect to dynamic guide 912, the display of on now guide 920 and/or grid guide 926 may be based on a threshold. That is, for example, on now guide 920 may be partially displayed and may either snap back or be displayed as illustrated in FIG. 14B based on whether the movement of a user's finger exceeds a threshold.

As illustrated in FIG. 14B, on now guide 920 includes tiles 924a-924f, where tile 924c is an active tile 922. Further, as illustrated in FIG. 14C, when grid guide 926 is displayed, on now guide 920 is included as a row of grid guide 926. Tiles 924a-924f may be similar to tiles 914a-914e described above. Further, active tile 922 may be similar to active tile 918 described above. That is, a user may perform horizontal swipe gestures and/or directional click activations to cause active tile 922 to change and may further perform activations, e.g., OK click activations as described above, to cause functions associated with active tile 922 to occur. Further, it should be noted that in one example, a user may perform vertical swipe gestures to cause items of content other than items of content associated with tiles in on now guide to become selected. For example, referring to FIG. 14C, in one example, a user may perform an upward swipe gesture to cause items of content associated with 11:00 PM to be associated with tiles 924a-924f. That is, a user may scroll with respect to grid guide 926. Further, in one example, a user may perform diagonal swipes to scroll through channels and times simultaneously.

In one example, horizontal swipe gestures when on now guide 920 is displayed may be distinguished based on the speed at which a user performs a swipe, where the speed may be determined by motion events. For example, a relatively slow swipe may cause the distance the user moves a finger along navigational area 740 to correspond to a linear change in the active tile 922 and a relatively fast swipe may cause the distance the user moves a finger along navigational area 740 to correspond to an exponential change in the active tile 922. For example, a slow left horizontal swipe may cause one of tiles 924a-924b to become the active tile 922 for a swipe having a distance of 0% to 50% of the width of navigational area 740 and a fast left horizontal swipe having a distance of 0% to 50% of the width of navigation area 740 may correspond to a selection of one of any number of items of contents (e.g., 20-100 items of content). For example, if tile 924c is associated with channel 120 in a television listing, a fast left horizontal swipe may enable a user to cause channel 70 to become the active tile. As described in further detail below, images associated with items of content may be cached based on the likelihood that a user will perform a gesture that will cause a tile to be displayed. In this manner, graphical user interface 900 as illustrated in FIGS. 14B-14C and user interface 700 may enable a user to browse for item of content having a presentation time. It should be noted that in one example, active tile 922 may remain in a center position, e.g., the position illustrated in FIG. 14C, as a user performs swipes to navigate grid guide 926.

As described above, with respect to dynamic guide 912, upon a user performing respective OK click activations or the like, an item of content associated with active tile 918 may be presented in window 902 or a corresponding media card graphical user interface may be presented Similar functions may be performed for an item of content associated with active tile 922, upon a user performing click activations or the like. FIGS. 17A-17B are conceptual diagrams illustrating the graphical user interfaces illustrated in FIGS. 16A-16F and corresponding example inputs received by an example user interface. As illustrated in FIGS. 16A-16F, in additional to including tiles 924*b*-924*d*, graphical user interface 950 includes active tile 952, description information 960, review information 962, watch icon 964, record icon 966, more icon 968, tiles 970*a*-970*e*, tiles 972*a*-972*g*, tiles 974*a*-974*g*, tiles 976*a*-976*g*, crew member information 980, add as favorite icon 982, and auto record icon 984. The example illustrated in FIGS. 16A-16F represents an example where a user performs a continuous upward swipe gesture and/or multiple subsequent upward swipe gestures using navigational area 740, thereby causing graphical user interface 950 to scroll vertically. It should be noted that in other examples other types of scroll operation activations may be used (e.g., activation of navigation arrow buttons 531 or arrow soft keys). As illustrated in FIGS. 16A-16F, as graphical user interface 950 scrolls, respective tiles or icons may become active. That is, tile 924*c* is active in FIG. 16A, watch icon 964 is active in FIG. 16B, tile 970*c* is active in FIG. 16C, tile 972*d* is active in FIG. 16D, tile 974*d* is active in FIG. 16E, and add as favorite icon 982 is active in FIG. 16F. Upon a user performing an OK single click activation or an OK multi-click activation, as described above, or another activation (e.g., taps of the OK button 742, activations of select button 532, etc.) a function corresponding to an active icon may occur or a presentation corresponding to an item of content associated with an active tile may occur. Further, when an icon or tile within a particular row is active, a user may cause the active tile 952 to change by performing horizontal swipe gestures. In one example, inside/outside multi-level horizontal swipe gestures may be enabled when graphical user interface 950 is displayed. In another example, inside/outside multi-level horizontal swipe gestures may be disabled when graphical user interface 950 is displayed.

As illustrated in FIGS. 16A-16F and FIG. 17A, the size of tiles in graphical user interface 950 changes based on the position of the tiles with respect to the vertical center of display 250. In one example, in a manner similar to that described above with respect to FIG. 10 and FIG. 11, the movement of tiles and the changing of size of tiles may be synchronized with the movement of a user's finger on navigational area 740. Further, a particular row of tiles may snap to the vertical center of display 250 based on the movement of the user's finger exceeding a threshold. In this manner, a user may preview items of content associated with a row of tiles adjacent to a currently selected row of tiles before causing the adjacent row of tiles to move to the vertical center of display 250.

Figure 16A:
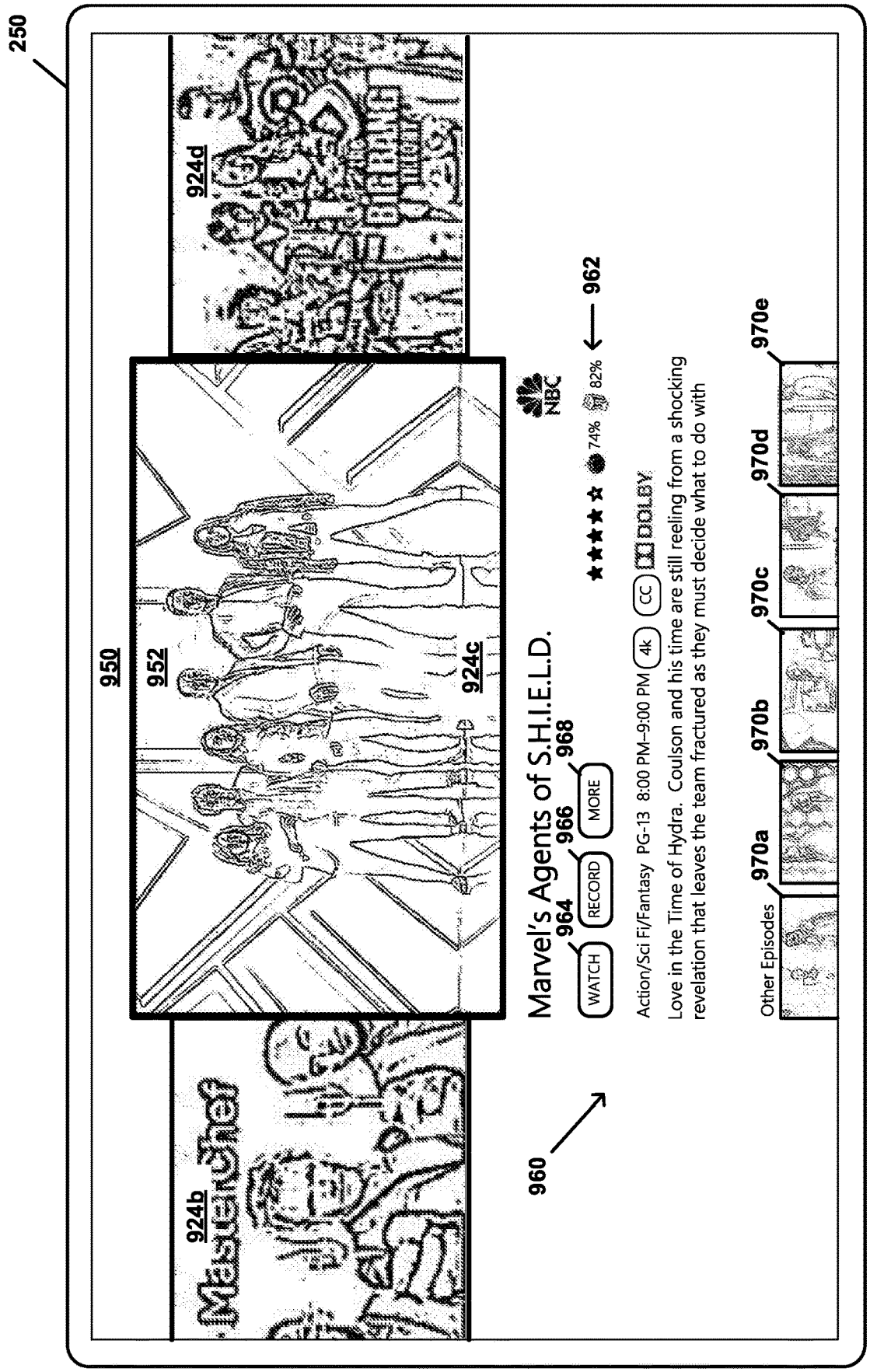
Figure 17A:
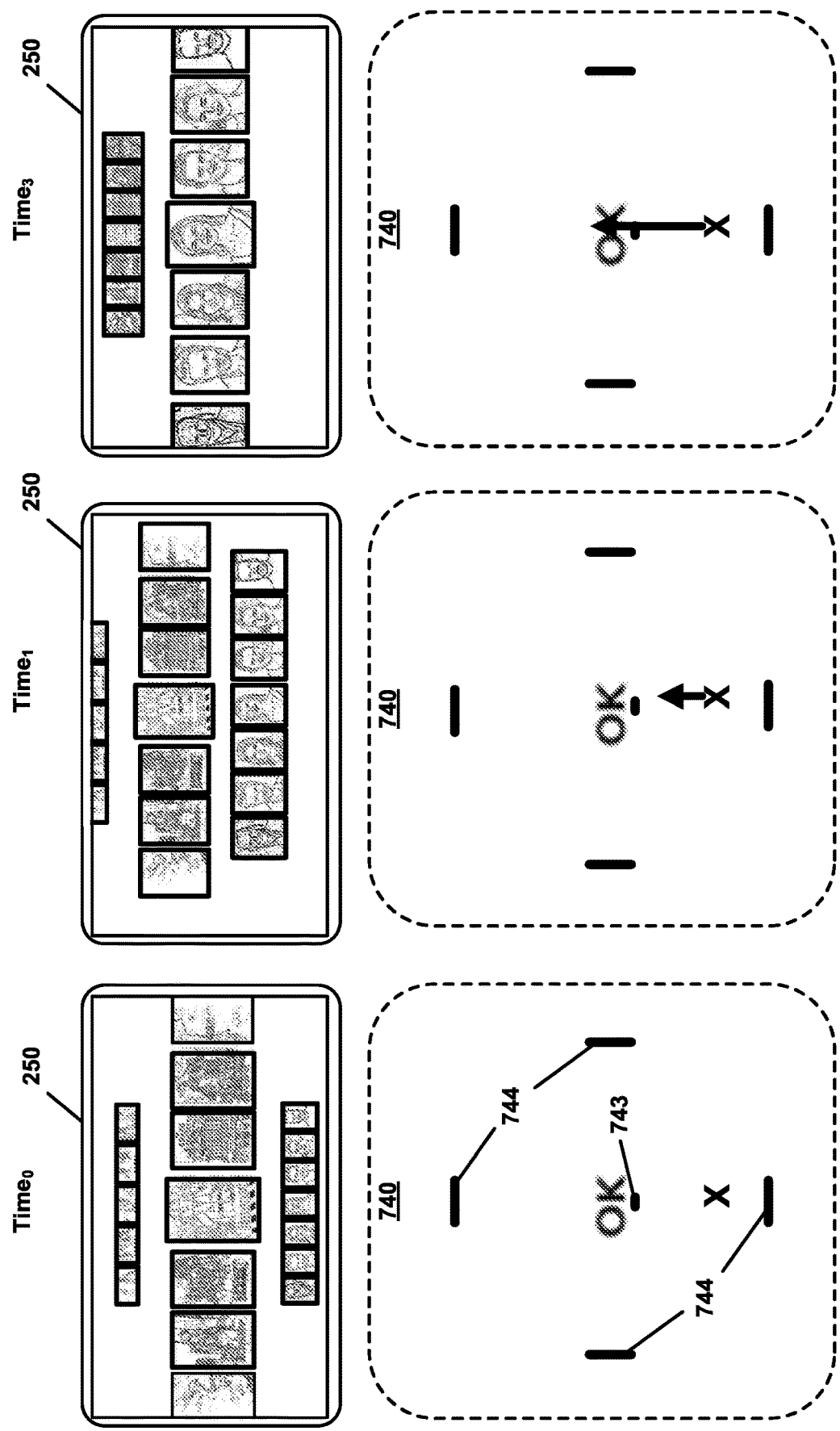
FIGS. 17A-17B are conceptual diagrams illustrating an example of a transition on a display device in response to user input that may be received by an example user interface according to one or more techniques of this disclosure.
Figure 17B:
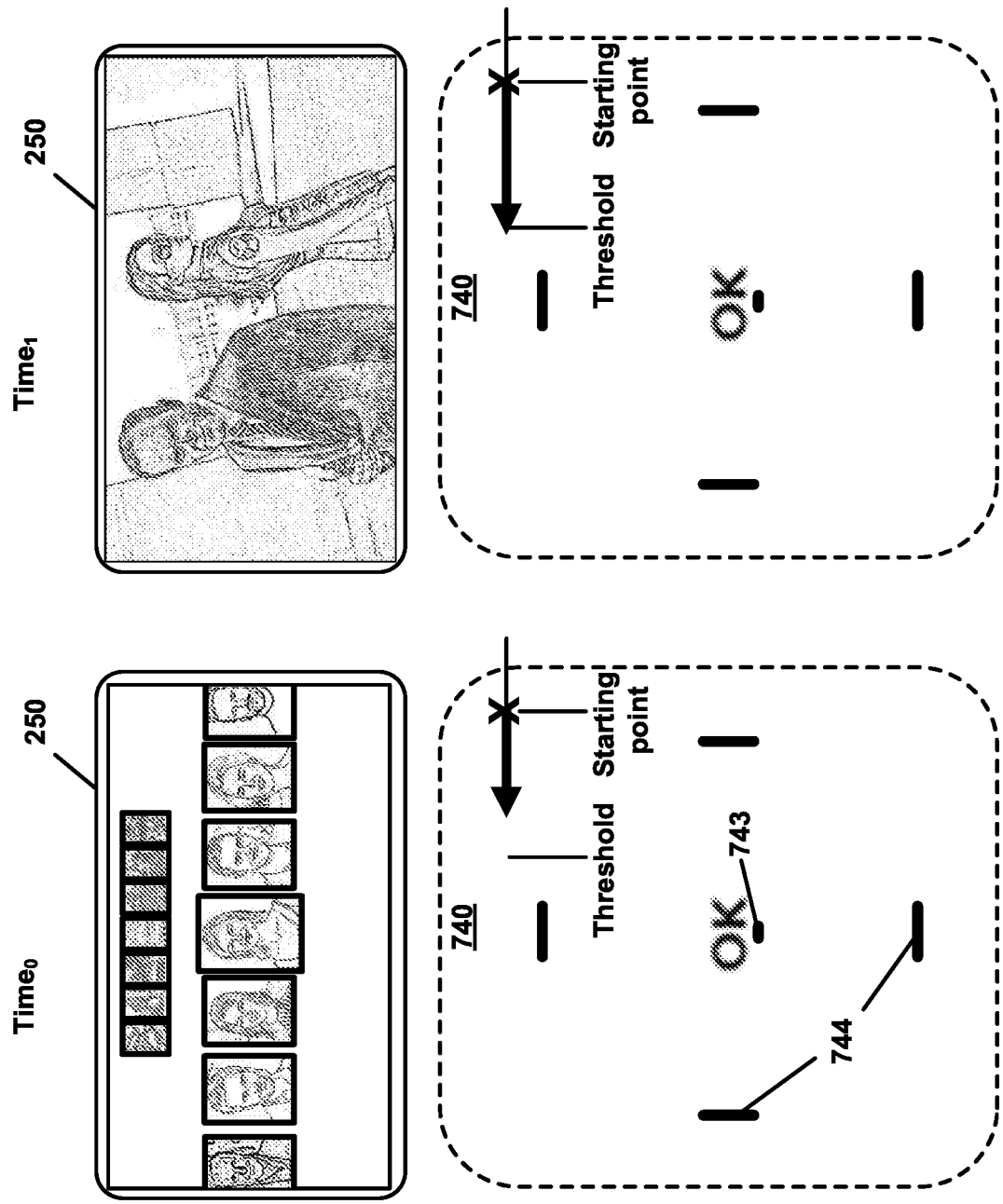

Referring to FIG. 16A, description information 960 and review information 962 correspond to the item of content associated with tile 924*c* (i.e., Marvel's Agents of the S.H.I.E.L.D.). Description information 960 provides information that enables a user to determine whether an item of content is of interest. In the example illustrated in FIG. 16A description information 960 includes a plot synopsis, genre information, content rating, content presentation time, content video and audio information, and captioning service information. Review information 962 includes information regarding the subjective quality of the item of content. In the example illustrated in FIG. 16A, review information 960 includes a number of stars on a five star scale, which may be based on feedback provided by users of a media service, and reviews provided from webpage content distribution sites (e.g., from the Rotten Tomatoes web site and the Flixster website). In other examples, review information 960 may include review information from other sources. In one example, computing device 200 may be configured to enable a user to select the sources of review information that will be included in graphical user interface 950 (e.g., by changing a setting using a menu graphical user interface). In the example illustrated in FIG. 16A, tile 924*c* is an active tile 952. In one example, computing device 200 may be configured such that upon a user performing an OK single click activation, the item of content associated with tile 924*c* is presented in a full screen viewing mode. In a manner similar to that described above with respect to FIG. 14C, a user may perform fast or slow horizontal swipe gestures in order to cause another tile to become the selected tile.

Figure 16B:
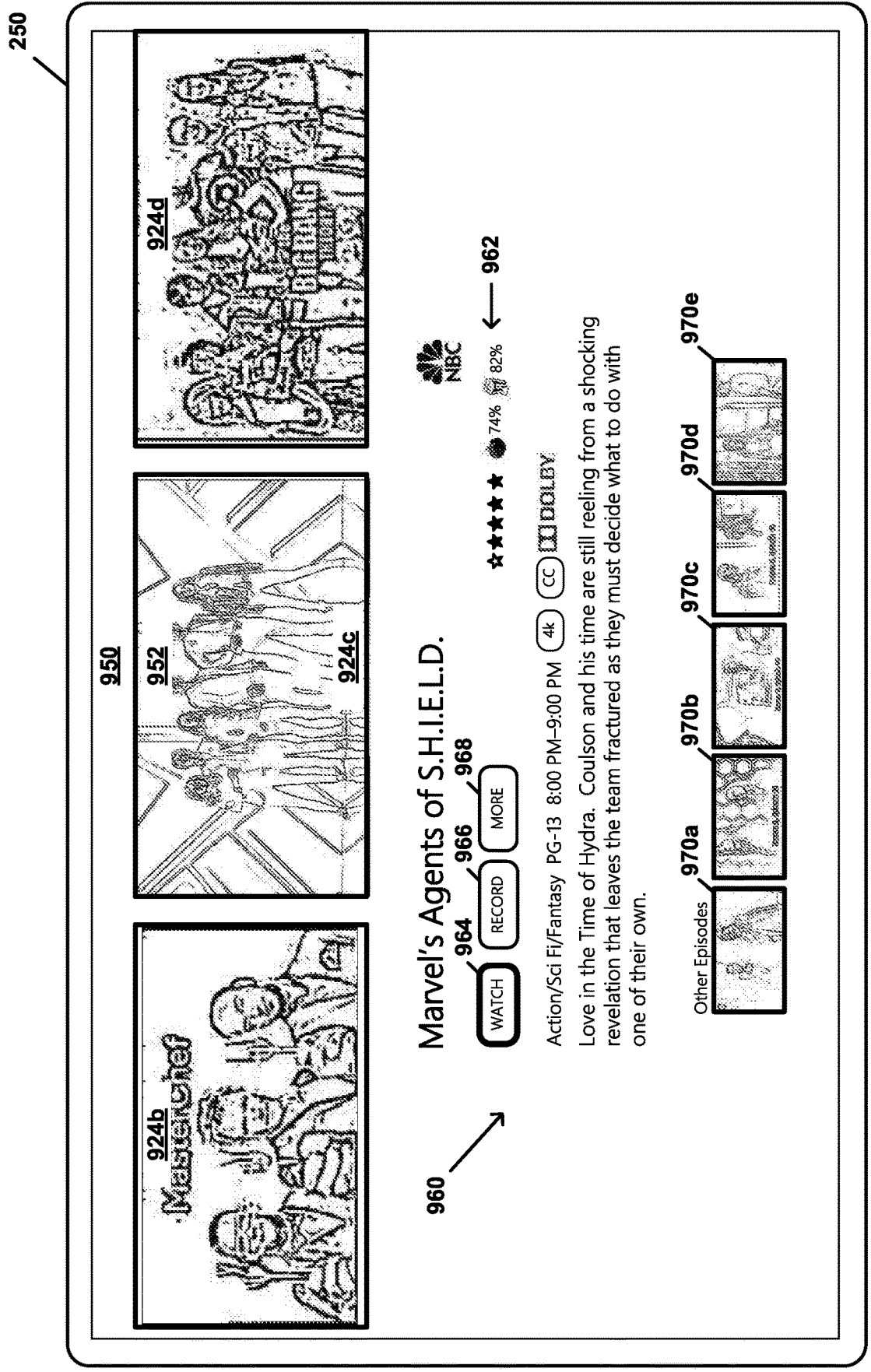

In the example illustrated in FIG. 16B watch icon 964 is active. In one example, when watch icon 964 is active, upon a user performing an OK single click activation, the item of content associated with tile 924*c* may be presented in a full screen viewing mode. In one example, a user may perform horizontal swipe gestures in order to cause record icon 966 or more icon 968 to become active. Further, in one example, a user may perform directional click activations in order to cause record icon 966 or more icon 968 to become active. Record icon 966 may be configured to enable a user to cause an item of content associated with tile 924*c* to be stored to a storage device (e.g., a disk drive of a PVR), upon activation. In one example, an intermediate graphical user interface the enables a user to change and/or confirm recording settings may be presented. More icon 968 may be configured to cause additional information associated with an item of content associated with tile 924*c* to be presented on display 250, upon activation. In one example, additional information may include information available from a webpage content distribution site. For example, a web site associated with the item of content associated with tile 924*c* may be retrieved and presented.

Figure 16C:
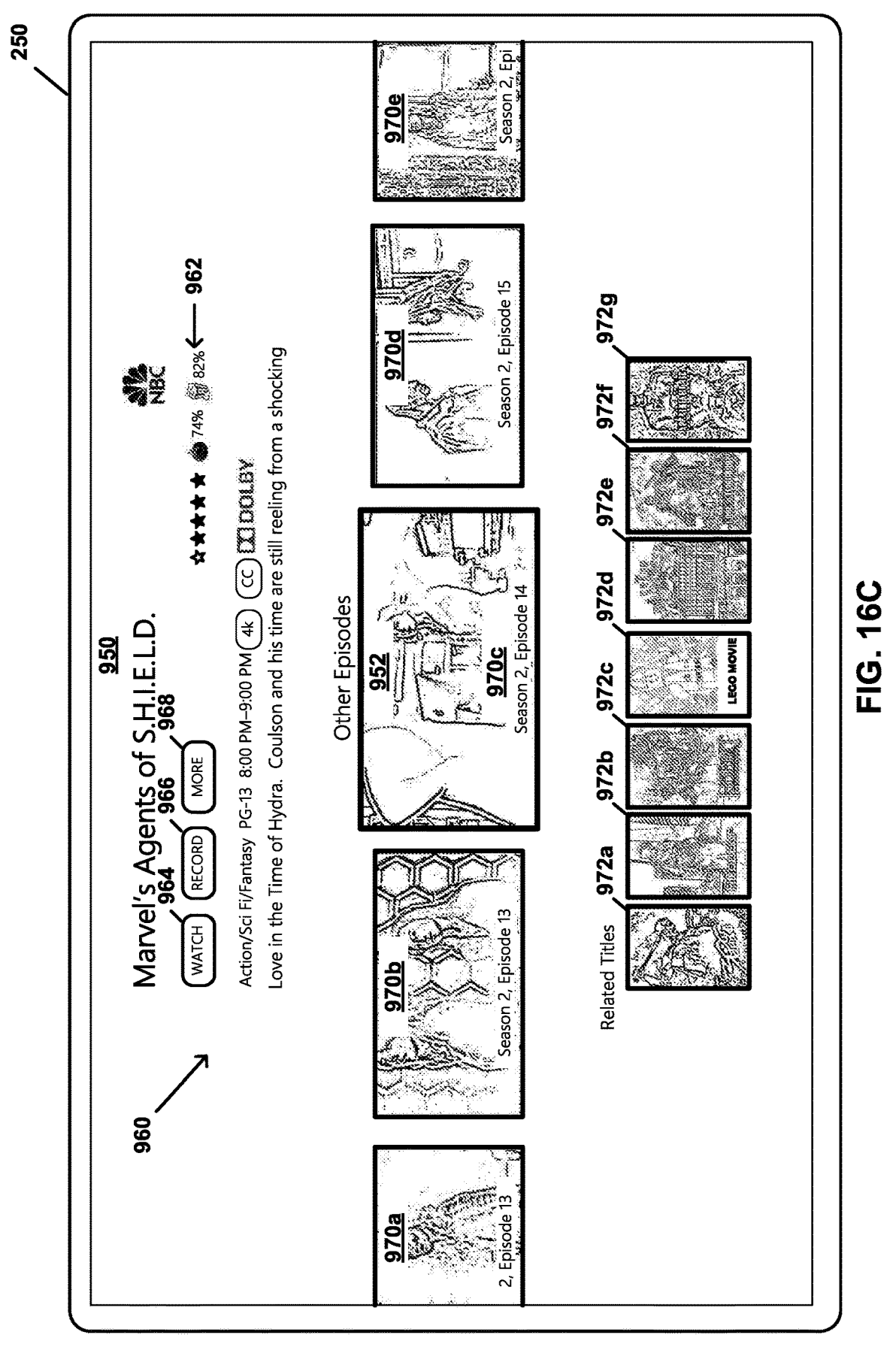
Figure 16D:
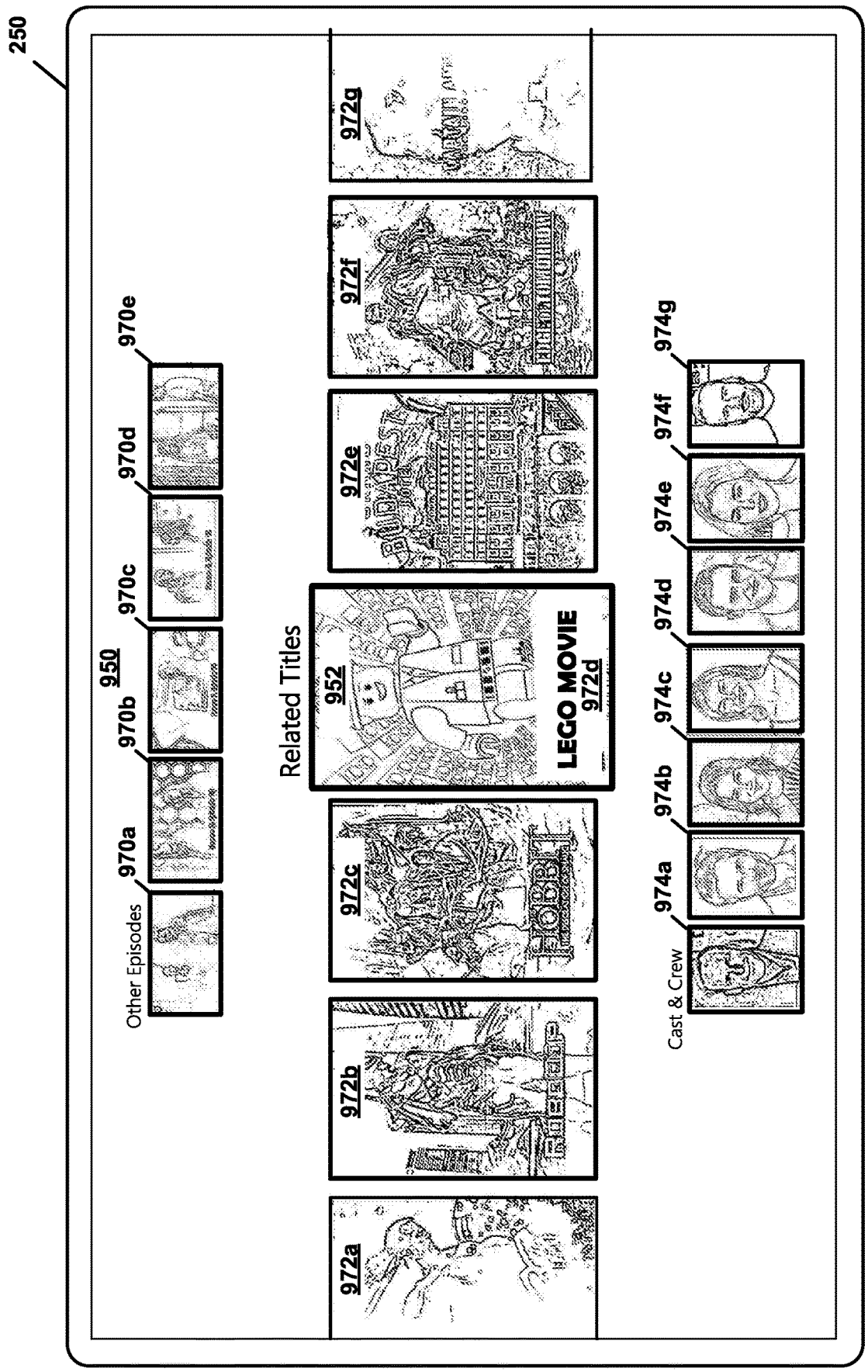
Figure 16E:
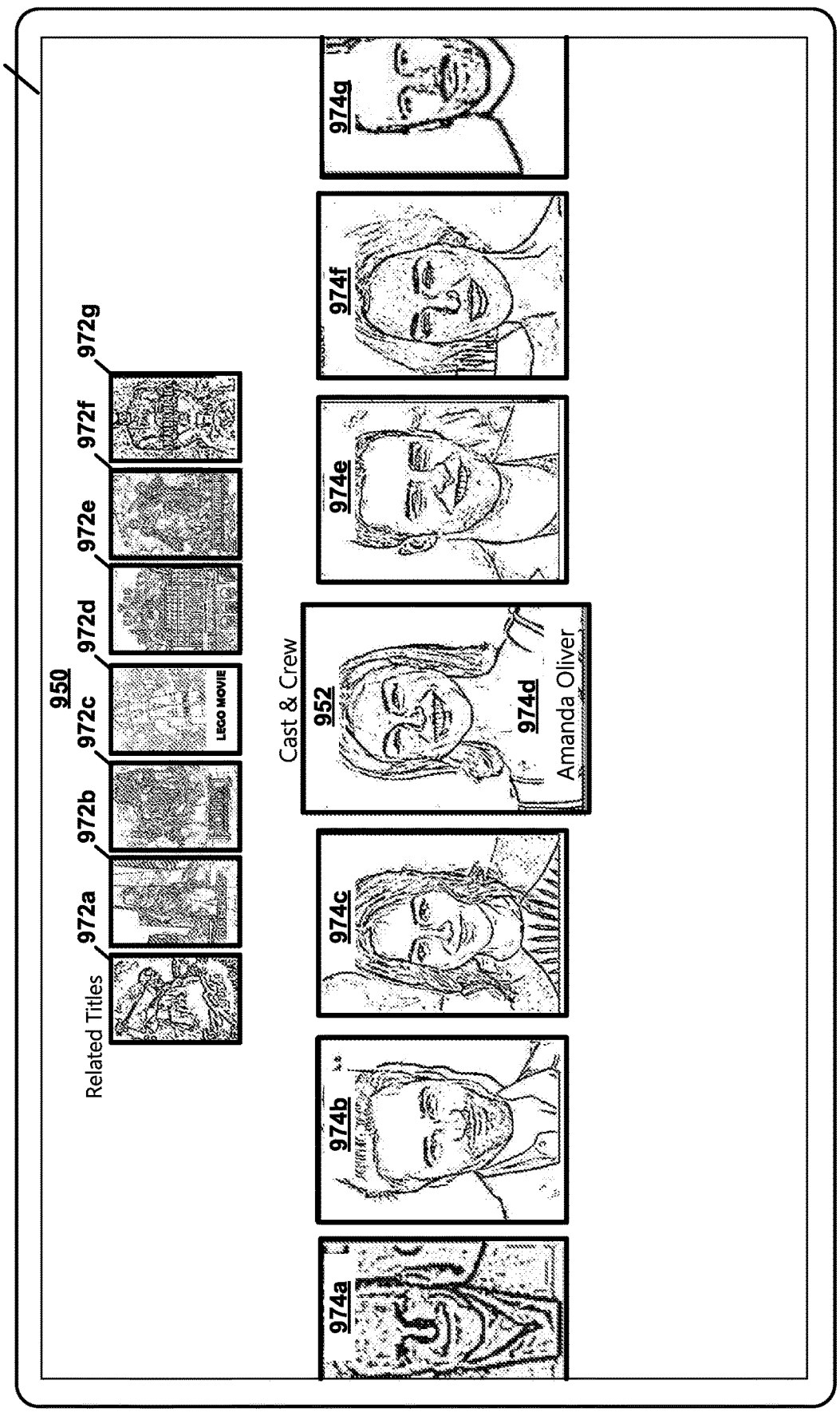

Referring to FIGS. 16A-16D, items of content associated with tiles 970*a*-970*e* represent other episodes of a television series associated with tile 924*c*. That is, for example, tile 924*c* may represent an episode that is currently available through an over-the-air transmission and tiles 970*a*-970*e* may represent previously aired or to be aired episodes. In the example illustrated in FIG. 16C, tile 970*c* is an active tile 952. In one example, computing device 200 may be configured such that upon a user performing an OK single click activation, or the like, the item of content associated with tile 970*c* may be presented in a full screen viewing mode. In a manner similar to that described above with respect to FIG. 16B, a user may perform a horizontal swipe gestures in order to cause another one of tiles 970-970*e* to become the selected tile 952. It should be noted that in the case where an episode represents an episode to be aired at a future date (e.g., next week's episode), upon a user performing an OK single click activation, or the like, a graphical user interface including additional information about the particular episode may be displayed. Referring to FIGS. 16C-16E, tiles 972a-972g may be similar to tiles 970a-970e. In the example illustrated in FIGS. 16C-16E, tiles 972a-972g represent items of content that are related to the item of content associated with tile 924. For example, items of content associated with tiles 972a-972g may be of a similar type of genre to the item of content associated with tile 924. One or more algorithms may be used to define similar types of items of content. Tiles 972a-972g may be activated in a manner similar to the activation of tiles 970-970e described above. That is, for example, upon a user performing an OK click activation, or the like, the item of content associated with tile 972d may be presented in a full screen viewing mode or a graphical user interface including additional information may be displayed.

Referring to FIGS. 16D-16F, tiles 974a-974g represent cast and crew members associated with the item of content associated with tile 924. Tiles 974a-974g may be activated in a manner similar to the activation of tiles 970a-970e described above. In the example illustrated in FIG. 16E, tile 974d is the selected tile 952. In one example, upon a user performing an OK single click activation, or the like, additional information associated with the crew member associated with tile 974d to be presented on display 250. In one example, information available from a webpage content distribution site may be retrieved and presented, e.g., a website associated with the crew member may be retrieved and presented.

In the example illustrated in FIG. 16F, add as favorite icon 982 is active. In one example, when add as favorite icon 982 is active, upon a user performing an OK single click activation, items of content associated with the crew member associated with tile 974d may be presented to a user. For example, items of content associated with favorite crew members may be highlighted in grid guide 926 or may be presented to a user through one or more other graphical user interfaces (e.g., pop-up notifications, etc.). Further, in one example, favorite crew members may be stored as part of a user profile. Further, a user may perform horizontal swipe gestures, or directional click activations, in one example, in order to cause auto record icon 984 to become active. Auto record icon 984 may be configured to enable a user to cause items of content associated with the crew member to be stored to a storage device, upon activation. As further illustrated in FIG. 16F, crew member information 980 may be displayed (e.g., biographical information). In this manner, graphical user interface 950 as illustrated in FIGS. 16A-16F and user interface 700 may enable a user view additional information associated with a particular item of content and may enable a user to find additional items of content associated with the particular item of content.

As described above, graphical user interface 950 may be displayed upon a user causing on now guide 920 or grid guide 926 to be presented when a full screen view mode is displayed and further performing an activation of an active tile in a guide. In some cases a user may wish to return to the full screen viewing mode when graphical user interface 950 is displayed. FIG. 17B illustrates an example of a specific gesture that a user may perform in order to cause display 250 to return to a full screen viewing mode. In some instances, the gesture illustrated in FIG. 17B may cause functionality similar to functionality associated with activation of exit button 537 to occur and as such in some cases may be referred to as an exit gesture. In the example illustrated in FIG. 17B, a left horizontal swipe gesture having a starting point of outside of the upper protrusion and right protrusion on navigational area 740 is illustrated. In one example, a left horizontal swipe gesture having a starting point of outside of the upper protrusion and right protrusion on navigational area 740 having a distance of approximately 15-20% of the length of navigational area 740 may cause a full screen viewing mode to be displayed. It should be noted that in other examples, other starting points and directions (e.g., diagonal swipes) may be correspond to an exit gesture.

As described above with respect to FIG. 11, when graphical user interface 900 as illustrated in FIG. 9A is presented on display 250, a user may perform an outside swipe gesture in order to cause an application to switch from a television viewing application to an on demand portal. FIGS. 18A-18B illustrate an example graphical user interface associated with an on demand portal. In the example illustrated in FIGS. 18A-18B, graphical user interface 1100 includes tiles 1102a-1102e, tiles 1104a-1104e, and rating information 1106. In the example illustrated in FIGS. 18A-18B, tiles 1102a-1102e are associated with categories of items of content, which may include genres, and the like, and tiles 1104a-1104e are associated with items of content within a category.

Referring to FIG. 18A, the tile located in the center of graphical user interface 1100 is an active tile. In a manner similar to that described above with respect to graphical user interface 900 and graphical user interface 950, a user may cause one of tiles 1102a-1102e to become active by performing a relatively fast horizontal swipe gesture or a relatively slow horizontal swipe gesture. It should be noted that additional tiles associated with genre may be displayed on display 250 in response to a horizontal swipe gesture. For example, there may be dozens of available genres and graphical user interface 1100 may display five tiles associated with genre at a time. Further, in a manner similar to that described above with respect to FIGS. 16A-16F, a user may perform upward swipe gestures and downward swipe gestures in order to cause a row of tiles to be positioned at the vertical center of display 250. In the example illustrated in FIG. 18A, upon a user performing a downward swipe gesture, a row of tiles associated with popular items of content may be positioned at the vertical center of display. In one example, popular items of content may be based on a ranking value in a manner similar to trending items of content being associated with a ranking value as described above. Further, in the example illustrated in FIG. 18A, upon a user performing an upward swipe gesture, a row of tiles associated with television network categories may be positioned at the vertical center of display. In this manner, graphical user interface 1100 enables a user to browse categories of items of content as well as items of content using horizontal swipe gestures and vertical swipe gestures.

Computing device 200 may be configured such that upon a user performing an OK click activation, or the like, as described above, when one of tiles 1102a-1102e is active, or another tile associated with a category is active, corresponding tiles associated with items of content within a genre category are displayed. Graphical user interface 1100 as displayed in FIG. 18B represents an example where a user performs an OK click activation, or the like, when tile 1102c is active. That is, items of content associated with tiles 1104a-1104e are within the Action & Adventure genre. A user may cause one of tiles 1104a-1104e (or tiles not currently displayed) to become active by performing horizontal swipe gestures. When a tile is active, rating information 1106 corresponding to the item of content associated with the active tile is displayed. Rating information 1106 may be similar to rating information 962 described above. Further, tiles 1104a-1104e may be activated in a manner similar to the activation of tiles 970a-970e described above.

That is, for example, upon a user performing an OK click activation, or the like, the item of content associated with tile 1104c may be presented in a full screen viewing mode or a graphical user interface including additional information may be displayed. In one example, a graphical user interface that enables a user to purchase access to an item of content may be displayed.

As illustrated in FIG. 18B "Back to Genres" is displayed at the top of graphical user interface 1100 and "Browse by Network" is displayed at the bottom of graphical user interface 1100. In this manner, in one example, upon a user performing a downward swipe gesture, graphical user interface 1100 as illustrated in FIG. 18A may be displayed and upon a user performing an upward swipe gesture, graphical user interface 1100 may display a row of tiles associated with television networks at the center vertical position. That is, upward and downward swipe gestures may enable a user to return to category browsing. In this manner, graphical user interface 1100 and navigational area 740 may be configured to enable a user to browser and select item of content available on an on demand basis using swipe gestures and click activations.

As described above, with respect to FIGS. 9A-18B, when an item of content is displayed in a full screen viewing mode, a user may perform inside horizontal swipe gestures, outside horizontal swipe gestures, downward swipe gestures, and upward swipe gestures using navigational area 740 and a computing device receiving each particular gesture may cause different graphical user interfaces to be displayed that enable a user to browse and select items of content available through one or more diverse application, sources, and/or portals using click activations. Thus, computing device 200, user interface 700, and the graphical user interfaces described with respect to FIGS. 9A-18B are configured to enable a user to browse and select items of content available through one or more diverse application, sources, and/or portals using gestures and click activations.

Referring to FIGS. 19A-19E, flowchart 1900 illustrates an example of how graphical user interfaces described herein may be presented on a display. It should be noted that although flowchart 1900 is described with respect to computing device 200 and user interface 700, the techniques described with respect to flowchart 1900 may be performed using any and all combinations of components of computing devices and user interfaces. Further, it should be noted that flowchart 1900 illustrates one example of how graphical user interfaces described herein may be presented on a display and does not include all possible user inputs that may be provided in combination with the graphical user interfaces and user interfaces described herein and as such flowchart 1900 should not be construed to limit the techniques described herein. Further, as described above, interpreting whether touch events correspond to a motion event and whether motion events correspond to a gesture may be determined by a computing device and/or a companion device. Thus, techniques described with respect to FIGS. 19A-19E may be generally applicable regardless of how processing (e.g., touch event handling) is distributed between a computing device and a companion device.

Figure 19A:
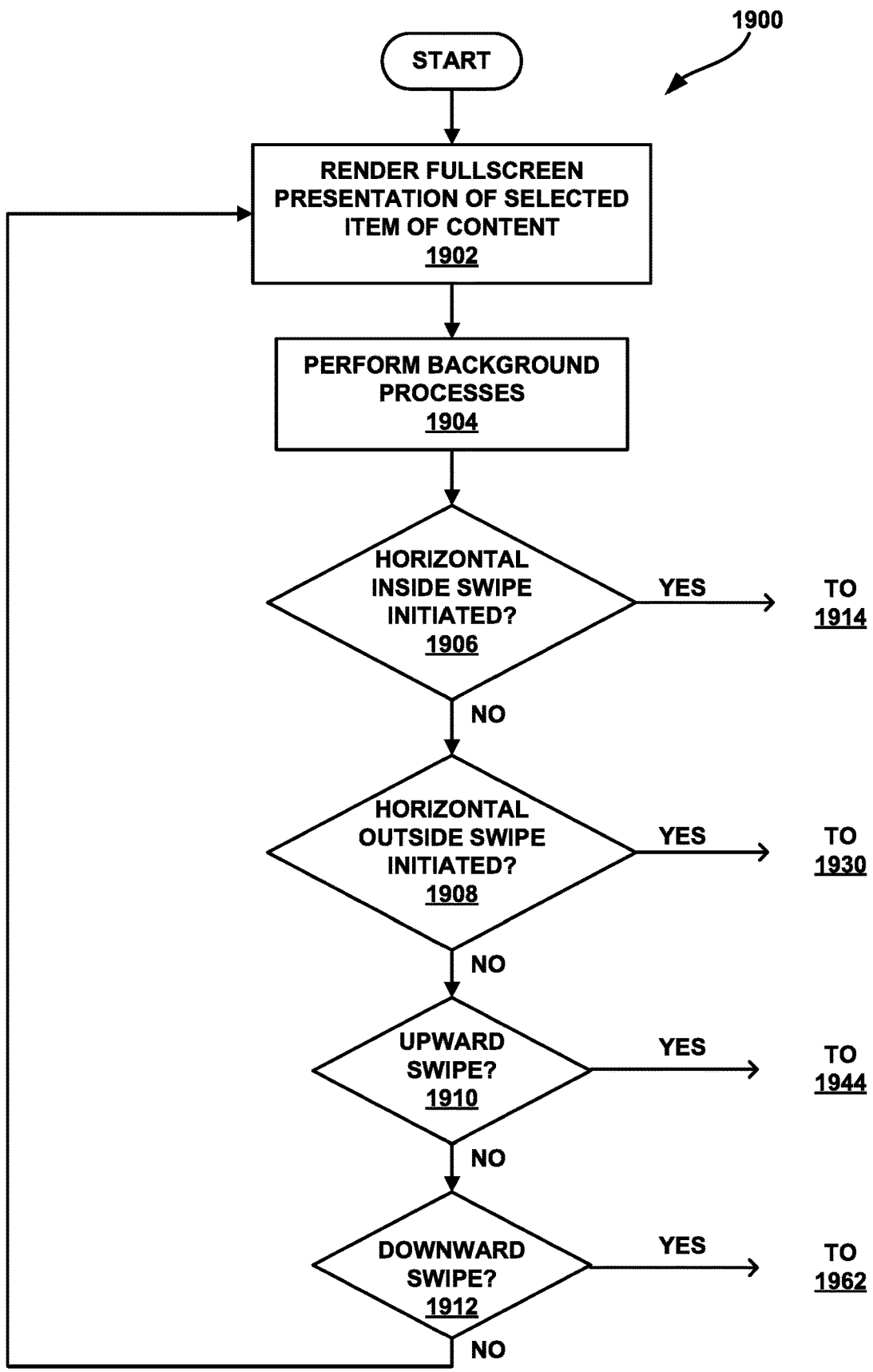
FIGS. 19A-19E is a flowchart illustrating an example method of selecting items of content according to one or more techniques of this disclosure.

Referring to FIG. 19A, computing device 200 renders a full screen presentation of a selected item of content (1902). An example of a rendering of a full screen presentation of an item of content is illustrated in FIG. 9A. In addition to rendering a full screen presentation, computing device 200 performs background processes (1904). Background processes may include, at least, any process used to optimize CPU and/or GPU usage and/or reduce any delay perceived by a user interacting with graphical user interfaces. For example, as described above, computing device 200 may be configured to perform pre-tuning techniques, including simulating playback of an item of content that a user is likely to access, in order to reduce the time required to render a full screen video presentation for an item of content and/or maintain synchronization with an event. Further, as described above, when a full screen video presentation associated with a television viewing application is displayed, processes associated with other applications, including media streaming applications, may occur, such that the media streaming application remains in a state that reduces loading time, upon a user switching to the application (e.g., a user performing an outside swipe gesture). Further, as described above, images associated with items of content may be loaded from a portion of system memory 204 to another portion of system memory 204 (e.g., from a hard disk drive to a cache) based on user behavior in order to reduce the time required to render the images on a display.

Figure 20:
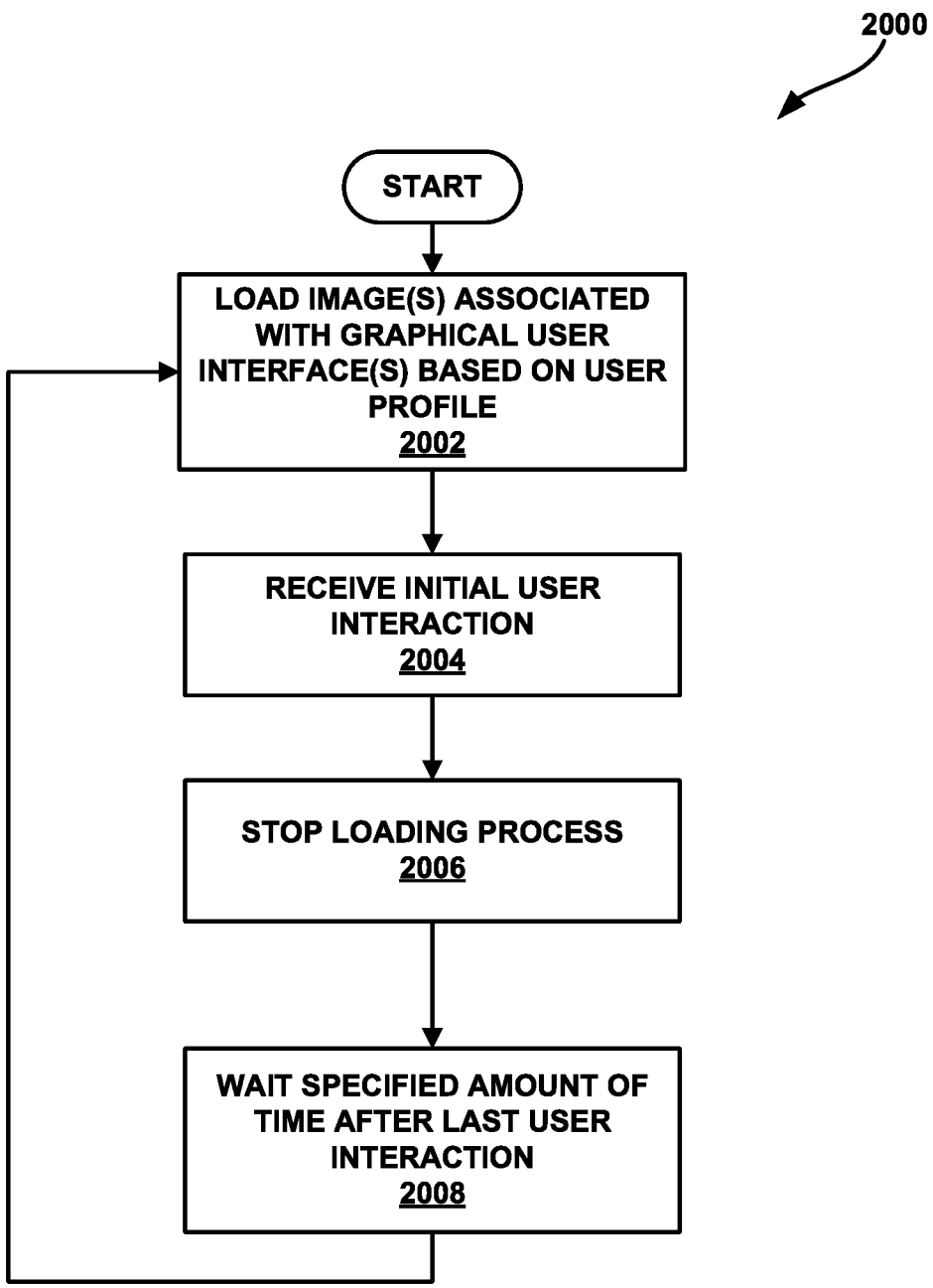
FIG. 20 is a flowchart illustrating an example of a background process according to one or more techniques of this disclosure.

FIG. 20 represents an example of one of a plurality of background processes that may be performed by computing device 200. FIG. 20 illustrates an example of loading images based on user behavior. Flowchart 2000 illustrates an example of loading images associated with a graphical user interface from a portion of system memory 204 to a cache. Loading images to a cache, in some examples, may be referred to as pre-loading. Referring to FIG. 20, computing device 200 loads zero or more images associated with one or more graphical user interfaces based on a user profile (2002). That is, for example, computing device 200 may load zero or more images associated with one or more of each of the graphical user interfaces described above with respect to FIGS. 9A-18B based on user profile information. It should be noted that in some examples, loading images may include formatting images and/or storing images as a hidden element (e.g., a <div> element in HTML) so that they may be cloned or attached to another element. Formatting images and storing images as hidden elements may reduce the amount of time required to render an image on a display.

In one example, computing device 200 may pre-load images based on the likelihood a user will perform one of an inside horizontal swipe gesture, an outside horizontal swipe gesture, a downward swipe gesture, or an upward swipe gesture. The likelihood of a user performing a particular gesture may be based on behavior information included in a user profile. For example, computing device 200 may determine that a particular user is more likely to perform channel change transitions before accessing a grid guide based on past behavior of the user. It should be noted that loading images based on a user profile may include loading a subset of available images to a cache and, in some cases prioritizing the loading of the subset of images. For example, computing device 200 may load image plates and information groups for ten channels adjacent to a currently selected channel and images associated with tiles of a dynamic guide. Each of the images may be prioritized such that they are loaded in a particular order. For example, image plates and information groups for five channels adjacent to the currently selected channel (e.g., five higher numbered channels) may be prioritized over images associated with a dynamic guide, and images associated with a dynamic guide may be prioritized over image plates and information groups for the other five channels adjacent to the currently selected channel (e.g., five lower numbered channels). For example, as described above, left hand dominant users may be more likely to perform swipes to the left and thus more likely to tune to higher numbered channels.

Referring to FIG. 20, computing device 200 receives an initial user interaction (2004), e.g., a touch event, a motion event, or a gesture. Upon receiving the initial user interaction, computing device 200 stops the loading process (2006). It should be noted that an initial user interaction may be received prior to a loading process being completed. For example, computing device 200 may receive an initial user interaction before being able to load all of the image plates and information groups for ten channels adjacent to a currently selected channel (e.g., 3 of 10 image plates and information groups may be loaded when an initial user interaction is received). Stopping the loading process, upon receiving an initial user interaction, may optimize computing resources of computing device 200 and in some cases may be necessary to achieve an acceptable level of performance. For example, in the event an initial user interaction corresponds to switching from a television viewing application to an on demand media streaming application, it may be more efficient to allocate CPU resources to loading and rendering graphics associated with the on demand media streaming application rather than continuing to load images associated with the television application to a cache. In this manner, the manner in which images are prioritized may change based on user interactions.

Referring again to FIG. 20, after a last user interaction is received, computing device 200 waits a specified amount of time (2008) before returning to the image loading process. For example, computing device 200 may wait approximately two seconds before pre-loading any additional images. Waiting a specified amount of time may conserve computing resources. Further, because the manner in which images are prioritized may change based on user interactions, it may be more efficient to wait after a particular user interaction before loading images. That is, computing device 200 may wait until a relatively stable state before loading images. For example, in the case where pre-loading stops when graphical user interface 900 as illustrated in FIG. 9A is displayed and a user provides interactions that subsequently cause graphical user interface 950 to be displayed, it may be efficient to resume pre-loading after it is determined that a user is likely to continue browsing items of content while graphical user interface 950 is displayed. In this manner, computing device 200 may be configured to dynamically pre-load images based on user behavior. It should be noted that the process illustrated in FIG. 20 may be performed in parallel with the process illustrated in FIGS. 19A-19E.

Figure 19B:
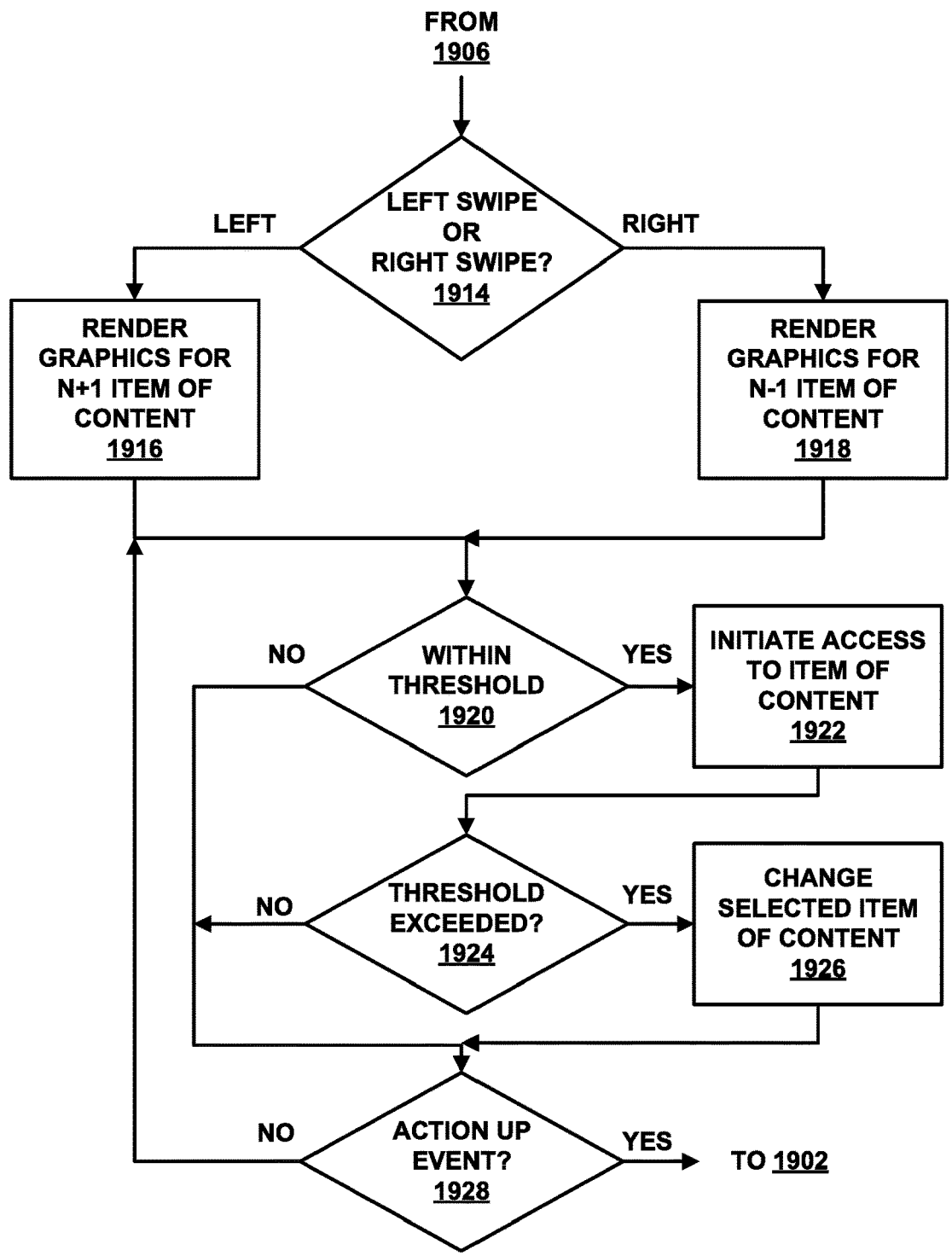
Figure 19C:
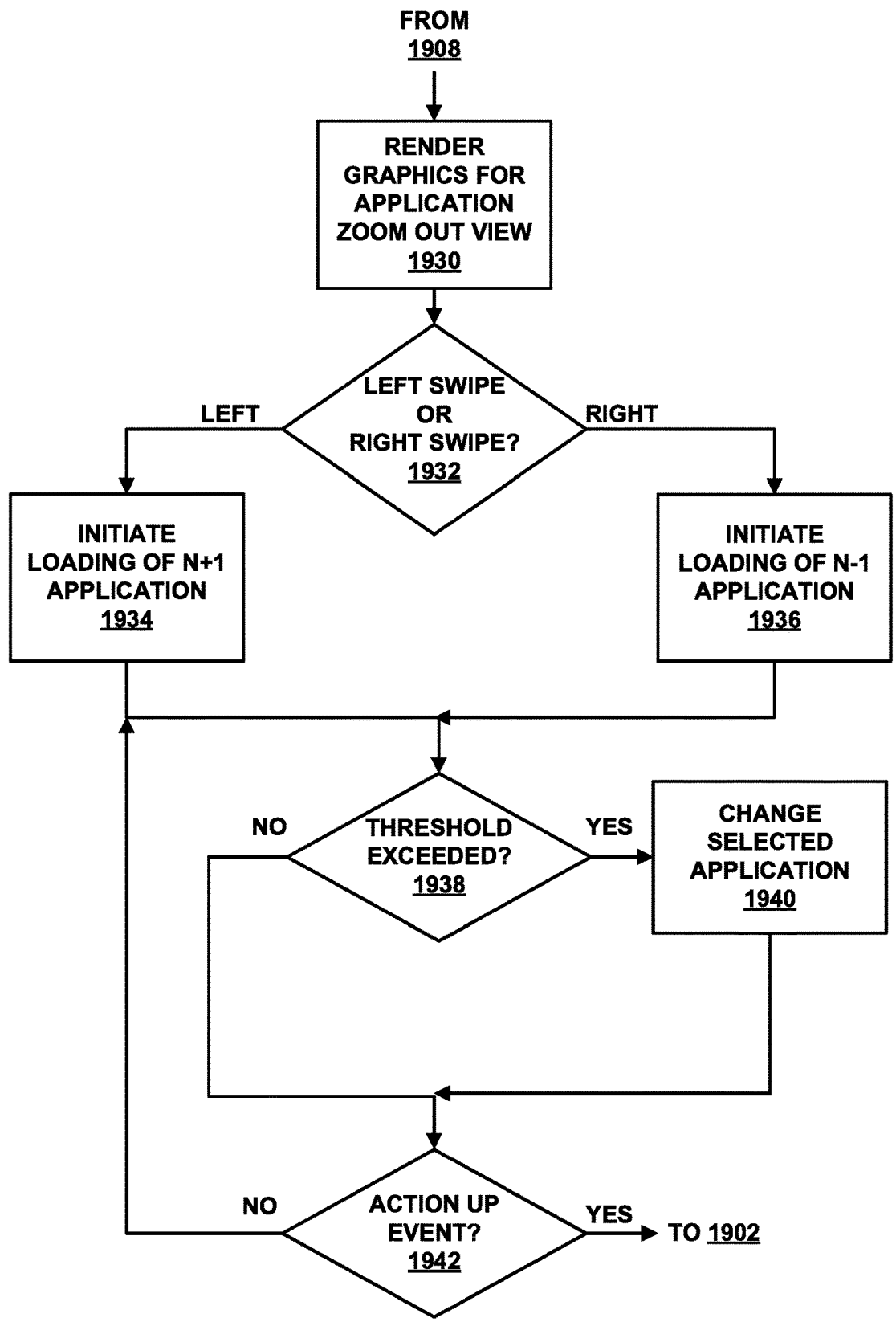
Figure 19D:
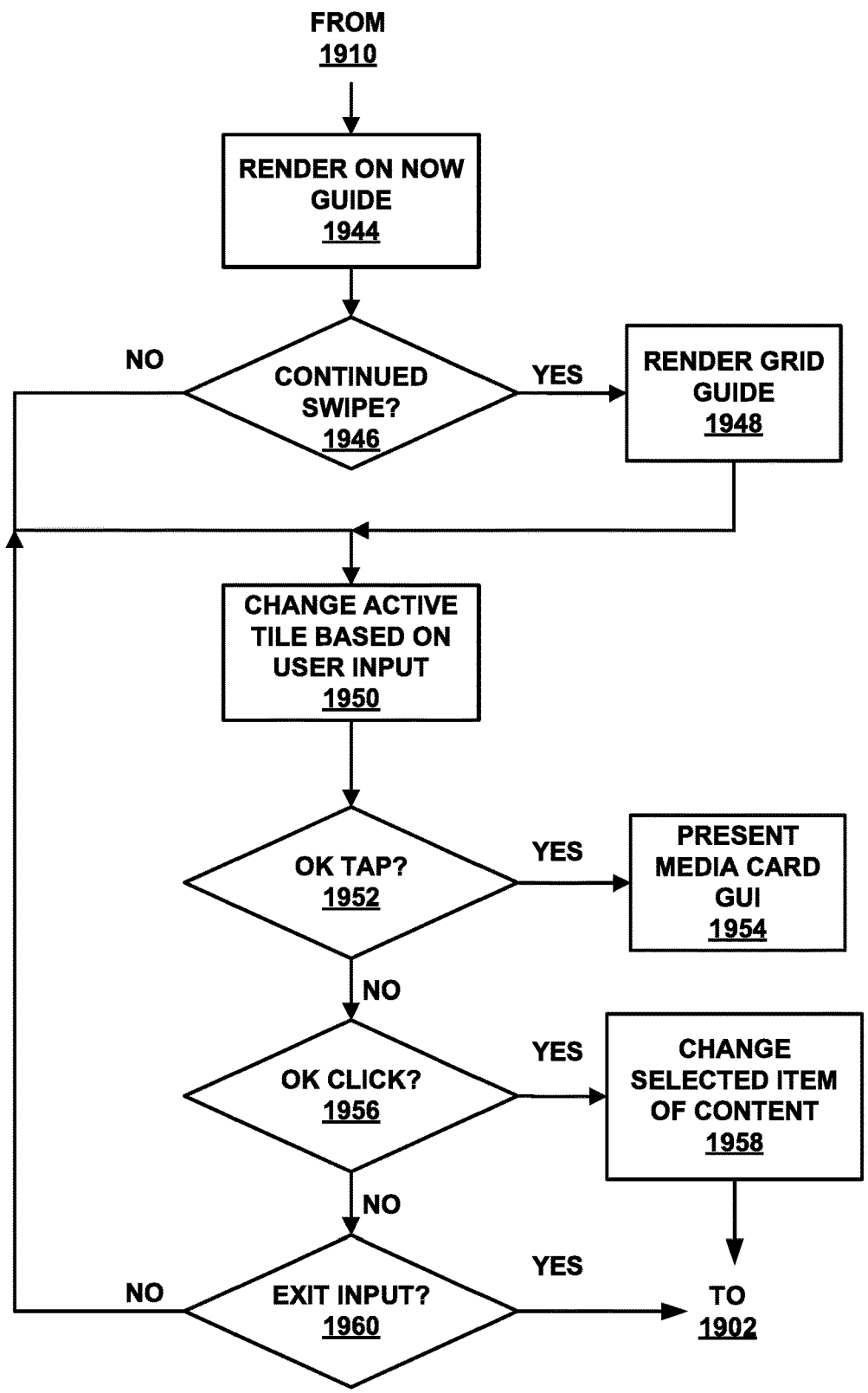
Figure 19E:
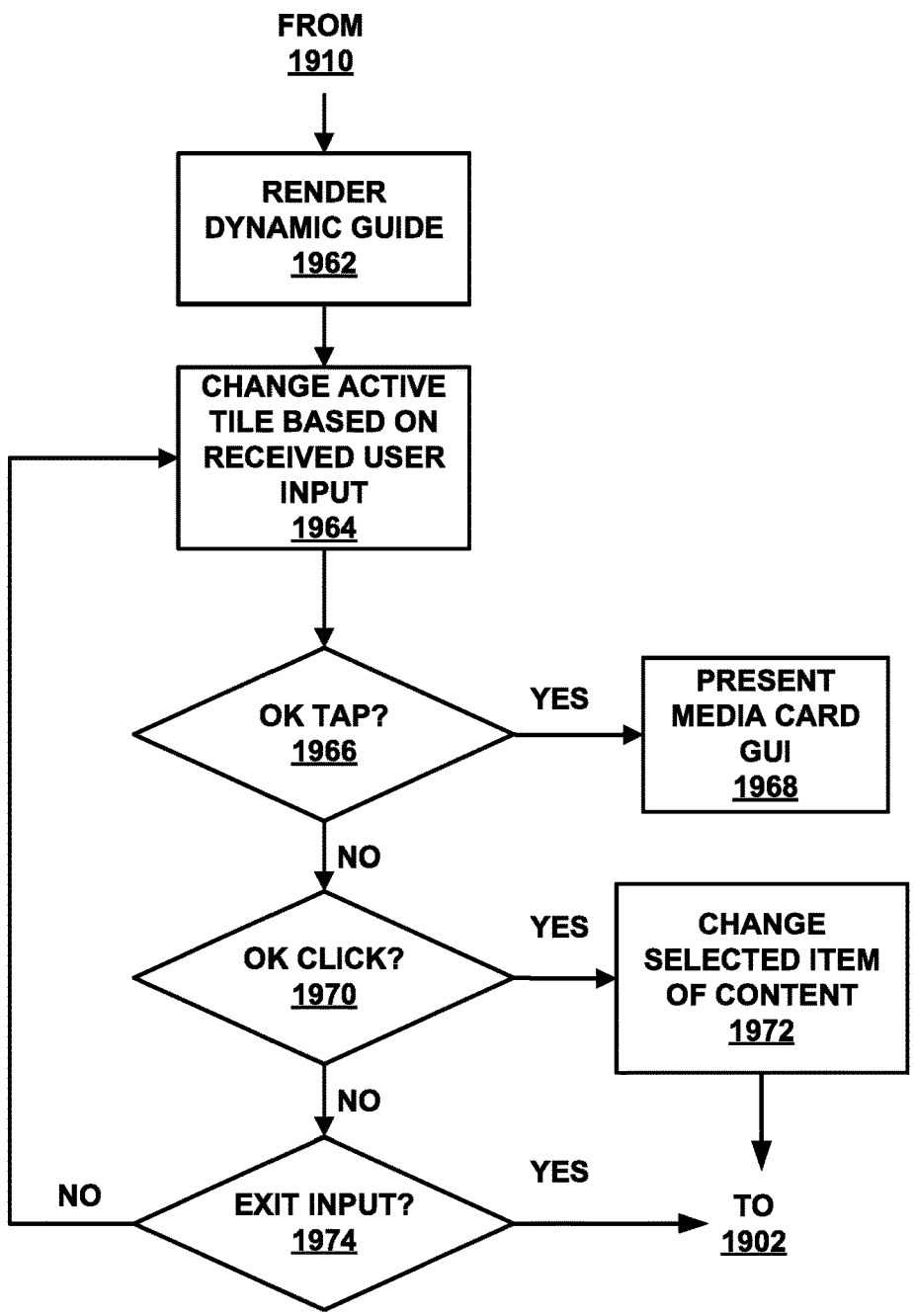

Referring again to FIG. 19A, computing device 200 determines whether a horizontal inside swipe is initiated (1906). An example of a horizontal inside swipe is illustrated in FIG. 8A. In one example, computing device 200 may determine that a horizontal inside swipe is initiated based on touch event data received from a companion device and whether touch event data indicates that movement of a user's finger exceed a minimum distance. An example of a process that may occur upon determining that a horizontal inside swipe is initiated is illustrated in FIG. 19B. Computing device 200 determines whether a horizontal outside swipe is initiated (1908). An example of a horizontal inside swipe is illustrated in FIG. 8B. In one example, computing device 200 may determine that a horizontal outside swipe is initiated based on touch event data received from a companion device. An example of a process that may occur upon determining that a horizontal outside swipe is initiated is illustrated in FIG. 19C. Computing device 200 determines whether an upward swipe is initiated (1910). An example of a process that may occur upon determining that upward swipe is initiated is illustrated in FIG. 19D. Computing device 200 determines whether a downward swipe is initiated (1912). An example of a process may that occur upon determining that a downward swipe is initiated is illustrated in FIG. 19E. In this manner, as illustrated in FIG. 19A, computing device 200 renders a full screen presentation and performs background processes while determining whether a particular user input has been received by a user interface. Based on whether particular user inputs are received the full screen presentation and background processes may be updated. The process illustrated in FIG. 19A may continue throughout a viewing session (e.g., while a user is accessing television programming through a television application).

As described above, a horizontal inside swipe may correspond to channel change transition. Upon determining that a horizontal inside swipe is initiated, (i.e., a channel change transition is initiated in the example illustrated in FIG. 19B), computing device 200 determines whether the swipe is a left swipe or a right swipe (1914). Upon determining that a left swipe occurs, computing device 200 renders graphics for a higher numbered television channel (1916). For example, referring to FIG. 9B, the item of content associated with window 902 may correspond to channel number N and the item of content associated with window 904 may correspond to channel number N+1. Upon determining that a right swipe occurs, computing device 200 renders graphics for a lower numbered television channel (1918). For either a left or right swipe, computing device 200 determines whether a user continues a swipe gesture such that the gesture is within a threshold (1920). Upon determining that a gesture is within a threshold, computing device 200 initiates access to an item of content (1922). Examples of initiating access to an item of content based on a gesture being within a threshold are described above with respect to FIG. 10. Computing device 200 further determines whether a threshold is exceeded (1924). Upon determining that a threshold is exceeded, computing device 200 changes a selected item of content (1926). Examples of changing a selected item of content based on a gesture exceeding a threshold are described above with respect to FIG. 10. Computing device 250 determines whether an action up event occurs (1928). That is, computing device 250 determines whether a user completes a swipe gesture. Upon an action up event occurring, computing device 200 renders a full screen presentation of a selected item of content. The selected item of content may include a new item of content based on whether the horizontal inside swipe gesture exceeded a threshold.

As described above, a horizontal outside swipe may correspond to an application switching transition. Upon determining that a horizontal outside swipe is initiated (i.e., an application switching transition is initiated in the example illustrated in FIG. 19C), computing device 200 renders graphics for an application zoom out view (1930). An example of graphics that may be rendered for an application zoom out view are illustrated in FIG. 12. Computing device 200 determines whether the swipe is a left swipe or a right swipe (1932). Upon determining that a left swipe occurs, computing device 200 initiates loading of an N+1 application (1934). Upon determining that a right swipe occurs, computing device 200 initiates loading of an N−1 application (1936). It should be noted that N+1 and N−1 are relative numbers with respect to a currently selected application N. For example, referring to FIG. 12, the application associated with window 902 may be the N application, the application associated with window 1002c may be the N+1 application, and the application associated with window 1002b may be the N−1 application. Computing device 200 determines whether a threshold is exceeded (1938). Upon determining that a threshold is exceeded, computing device 200 changes a selected application (1940). Examples of changing a selected application based on a gesture exceeding a threshold are described above with respect to FIG. 11. Computing device determines whether an action up event occurs (1942). Upon an action up event occurring, computing device 200 renders a full screen presentation of a selected item of content. The selected item of content may include a new application based on whether the horizontal outside swipe gesture exceeded a threshold.

As described above, an upward swipe may correspond to presentation of an on now guide and/or a grid guide. Upon determining that an upward swipe is initiated (i.e., presentation of an on now guide and/or a grid guide is initiated in the example illustrated in FIG. 19D), computing device 200 renders an on now guide (1944). An example of an on now guide is illustrated in FIG. 14B. Computing device 200 further determines whether the upward swipe is a continued upward swipe (1946). Upon determining that the upward swipe is a continued upward swipe, computing device 200 renders a grid guide (1948). An example of a grid guide is illustrated in FIG. 14C. As described above with respect to FIG. 14B and FIG. 14C, guides may include an active tile, which may be changed based on user input. Computing device 200 changes an active tile based on received user input (1950). As further, described above with respect to FIG. 14B and FIG. 14C, while a tile is active one or more user activations may be received. Computing device 200 determines whether an OK tap activation occurs (1952). Upon determining that an OK tap activation occurs, computing device 200 presents a media card graphical user interface (1954). An example of a media card graphical user interface is illustrated in FIGS. 16A-16F. Computing device 200 determines whether an OK click activation occurs (1956). An example of an OK click activation is described above with respect to FIG. 8C. Upon determining that an OK click activation occurs, computing device 200 changes the selected item of content (1958). Computing device 200 determines whether an exit input is received (1960). An example of an exit input is described above with respect to FIG. 17B. As illustrated in FIG. 19D, upon determining, that an OK click activation occurs or an exit input is received, computing device 200 renders a full screen presentation of a selected item of content. The selected item of content may include a new item of content based on whether an OK click activation occurred.

As described above, a downward swipe may correspond to presentation of a dynamic guide. Upon determining that a downward swipe is initiated (i.e., presentation a dynamic guide is initiated in the example illustrated in FIG. 19E), computing device 200 renders a dynamic guide (1962). An example of a dynamic guide is described above with respect to FIG. 14A. As described above with respect to FIG. 14A, dynamic guides may include an active tile, which may be changed based on user input. Computing device 200 changes an active tile based on received user input (1964). Computing device 200 determines whether an OK tap activation occurs (1966). Upon determining that an OK tap activation occurs, computing device 200 presents a media card graphical user interface (1968). Computing device 200 determines whether an OK click activation occurs (1970). Upon determining that an OK click activation occurs, computing device 200 changes the selected item of content (1972). Computing device 200 determines whether an exit input is received (1974). As illustrated in FIG. 19E, upon determining, that an OK click activation occurs or an exit input is received, computing device 200 renders a full screen presentation of a selected item of content. The selected item of content may include a new item of content based on whether an OK click activation occurred. In this manner computing device 200 represents an example of a computing device configured to enable transitions between items of content.

As described herein, in one example, a method of facilitating access to items of content comprises causing a video presentation for a selected item of content to be rendered on a display, determining whether touch event data corresponds to a particular gesture, causing a guide to be presented on the display, upon determining that the touch event data corresponds to a vertical swipe gesture, and causing a transition from the selected item of content to another item of content, upon determining that the touch event data corresponds to a horizontal swipe gesture. In one example, causing a video presentation for a selected item of content to be rendered on the display includes causing a full screen video presentation for the selected item of content to be rendered on the display, and causing a guide to be presented on the display includes causing a reduced size video presentation and one or more tiles to be rendered on the display. In one example, each of the one or more tiles includes visual indicators associated with respective items of content. In one example, one of the one or more tiles is an active tile, and the method further comprises changing the selected item of content to an item of content associated with the active tile, upon determining that a particular activation occurs. In one example, the particular activation includes a click activation. In one example, causing a guide to be presented on the display includes causing a dynamic guide to be presented on the display, upon determining that the received touch event data corresponds to a vertical swipe gesture having a first direction and causing an on now guide to be presented on the display, upon determining that the received touch event data corresponds to a vertical swipe gesture having a direction opposing the first direction. In one example, causing a dynamic guide to be presented on the display includes causing one or more tiles to be rendered on the display, wherein each of the one or more tiles includes visual indicators associated with respective trending items of content. In one example, causing an on now guide to be presented on the display includes causing one or more tiles to be rendered on the display, wherein each of the one or more tiles includes visual indicators associated with respective event based items of content. In one example, causing a transition from the selected item of content to another item of content includes initiating a change from the selected item of content to an adjacent item of content within an ordered set of items of content. In one example, the ordered set of items of content includes a channel listing and wherein initiating a change from the selected item of content to an adjacent item of content includes initiating a change to a lower numbered channel, upon determining that the received touch event data corresponds to a horizontal swipe gesture having a first direction, and initiating a change to a higher numbered channel, upon determining that the received touch event data corresponds to a horizontal swipe gesture having a direction opposing the first direction. In one example, causing a transition from the selected item of content to another item of content includes causing a window associated with an adjacent item of content within an ordered set of items of content to be rendered on the display. In one example, the window is sized such it spans the height of the display and includes an image plate and an information group. In one example, the method further comprises prioritizing images within a subset of images, wherein the subset includes one or more images from a set of images associated with a guide and one or more images from a set of images associated with a transition from the selected item of content to another item of content. In one example, prioritizing images within the subset of images includes prioritizing images based on user profile information. In one example, user profile information includes information indicating the likelihood of a particular gesture being performed.

As described herein, in one example, a device for facilitating access to items of content comprises an interface configured to enable communication with a companion device, and one or more processors configured to cause a video presentation for a selected item of content to be rendered on a display, determine whether touch event data received from a companion device corresponds to a particular gesture, cause a guide to be presented on the display, upon determining that the received touch event data corresponds to a vertical swipe gesture, and cause a transition from the selected item of content to another item of content, upon determining that the received touch event data corresponds to a horizontal swipe gesture. In one example, causing a guide to be presented on the display includes causing one or more tiles to be rendered on the display, wherein each of the one or more tiles includes visual indicators associated with respective items of content, and wherein one of the one or more tiles is an active tile. In one example, the one or more processors are further configured to receive a click activation from the companion device and change the selected item of content to an item of content associated with the active tile, upon receiving the click activation. In one example, the one or more processors are further configured to receive a directional click activation from the companion device and change the active tile, upon receiving the directional click activation. In one example, the one or more processors are further configured to send an indication of tiles rendered on the display to the companion device, and change the selected item of content to an item of content upon receiving touch event data from the companion device that corresponds to activation of an icon associated with a tile.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A companion device to remotely control a main display comprising:
   a memory;
   a touch screen comprising a top surface, a display viewable through the top surface, and one or more interactive elements on a portion of the top surface of the touch screen; and
   a processor coupled to the memory, the processor comprising instructions that when executed configure the processor to:
      receive user input associated with the one or more interactive elements of the touch screen, the one or more interactive elements defining a predefined area of the touch screen;
      determine whether a starting point of the user input is inside of the predefined area of the touch screen defined by the one or more interactive elements or outside of the predefined area of the touch screen defined by the one or more interactive elements;
      determine a distance of the user input and a direction of the user input;
      determine first event data when the starting point of the user input is inside of the predefined area of the touch screen defined by the one or more interactive elements and based on the determined distance and the determined direction of the user input, the first event data being associated with a first control function;
      determine second event data when the starting point of the user input is outside of the predefined area of the touch screen defined by the one or more interactive elements and based on the determined distance and the determined direction of the user input, the second event data being associated with a second control function and being based on the distance and the direction used to determine the first event data when the starting point of the user input is inside of the predefined area of the touch screen defined by the one or more interactive elements, the first control function being different from the second control function; and
      provide the first event data or the second event data for controlling content presented on the main display.

2. The companion device of claim 1, wherein the user input is a gesture using the one or more interactive elements.

3. The companion device of claim 1, wherein to determine at least one of the first event data and the second event data comprises filtering user input to calculate average coordinate values of multiple sample touches, wherein at least one of the first event data and the second event data comprises a reduced set of touch coordinate values to be processed by a computing device associated with the main display.

4. The companion device of claim 1, wherein the display of the touch screen provides dynamic text or images associated with a context of the main display.

5. The companion device of claim 1, wherein the one or more interactive elements comprise one or more protrusions extending from the top surface.

6. The companion device of claim 5, wherein the one or more protrusions are pressure sensitive, and wherein at least one of the first event data and the second event data is determined based on an amount of pressure applied to the one or more interactive elements.

7. The companion device of claim 1, wherein the one or more interactive elements comprise one or more indentations in the top surface.

8. The companion device of claim 1, wherein the display of the touch screen is a flexible display device.

9. The companion device of claim 1, wherein the display of the touch screen does not present video content.

10. The companion device of claim 1, wherein the top surface is coupled to an assembly, and wherein depressing the top surface into the assembly activates at least one switch.

11. The companion device of claim 10, wherein the user input comprises selecting at least one of the interactive elements and activating at least one switch, wherein activating the at least one switch changes at least one of the first event data and the second event data.

12. The companion device of claim 1, wherein the processor comprises instructions that when executed configure the processor to provide feedback via the companion device based on at least one of the first event data or the second event data, wherein the feedback is at least one of visual, audio, and haptic output by the companion device.

13. The companion device of claim 1, wherein in response to providing the first event data or the second event data, the processor is further configured to receive a confirmation message confirming whether the first event data or the second event data is accepted to control the main display.

14. The companion device of claim 1, wherein the first event data or the second event data indicates a selection event.

15. A method of facilitating control of a main display with a companion device comprising:
   receiving user input via a touch screen of a companion device, wherein the touch screen comprises a top surface, a display viewable through the top surface, and one or more interactive elements defining a predefined area on a portion of the top surface of the touch screen, wherein the user input is associated with the one or more interactive elements of the touch screen;
   determining whether a starting point of the user input is inside of the predefined area of the touch screen defined by the one or more interactive elements or outside of the predefined area of the touch screen defined by the one or more interactive elements;
   determining a distance of the user input and a direction of the user input;
   determining first event data when the starting point of the user input is inside of the predefined area of the touch screen defined by the one or more interactive elements and based on the determined distance and the determined direction of the user input, the first event data being associated with a first control function;
   determining second event data when the starting point of the user input is outside of the predefined area of the touch screen defined by the one or more interactive elements and based on the determined distance and the determined direction of the user input, the second event data being associated with a second control function and being based on the distance and the direction used to determine the first event data when the starting point of the user input is inside of the predefined area of the touch screen defined by the one or more interactive elements, the first control function being different from the second control function; and providing the first event data or the second event data for controlling content presented on the main display.

16. The method of claim 15, wherein the display of the companion device does not present video content; and wherein, in response determining that the second event data corresponds to a swipe gesture initiated outside of the predefined area of the touch screen defined by the one or more interactive elements, the second event data causes the main display to transition between a television service application and at least one of a media streaming service application and a content guide service.

17. A non-transitory computer readable medium comprising instructions that when executed by a processing device, cause the processing device to:
receive user input via a touch screen of a companion device, wherein the touch screen comprises a top surface, a display viewable through the top surface, and one or more interactive elements defining a predefined area on a portion of the top surface of the touch screen, wherein the user input is associated with the one or more interactive elements of the touch screen;
determine whether a starting point of the user input is inside of the predefined area of the touch screen defined by the one or more interactive elements or outside of the predefined area of the touch screen defined by the one or more interactive elements;
determine a distance of the user input and a direction of the user input;
determine first event data when the starting point of the user input is inside of the predefined area of the touch screen defined by the one or more interactive elements and based on the determined distance and the determined direction of the user input, the first event data being associated with a first control function;
determine second event data when the starting point of the user input is outside of the predefined area of the touch screen defined by the one or more interactive elements and based on the determined distance and the determined direction of the user input, the second event data being associated with a second control function and being based on the distance and the direction used to determine the first event data when the starting point of the user input is inside of the one or more interactive elements, the first control function being different from the second control function; and
provide the first event data or the second event data for controlling content presented on a main display.

18. The non-transitory computer readable medium of claim 17, wherein the interactive elements comprise one or more protrusions extending from the top surface, wherein the one or more protrusions are pressure sensitive, and wherein at least one of the first event data or the second event data is determined based on an amount of pressure applied to the one or more interactive elements.

19. The companion device of claim 1, wherein a speed of movement of the content presented on the main display is based on a speed of movement of the user input.

20. The method of claim 15, wherein a speed of movement of the content presented on the main display is based on a speed of movement of the user input.

* * * * *